US012801822B2

(12) United States Patent
Oriordan et al.

(10) Patent No.: US 12,801,822 B2
(45) Date of Patent: Nov. 17, 2026

(54) USING MACHINE TRAINED NETWORK DURING ROUTING TO MODIFY LOCATIONS OF VIAS IN AN IC DESIGN

(71) Applicant: D2S, Inc., San Jose, CA (US)

(72) Inventors: Donald Oriordan, Sunnyvale, CA (US); Akira Fujimura, Saratoga, CA (US); George Janac, Saratoga, CA (US)

(73) Assignee: D2S, INC., San Jose, CA (US)

( * ) Notice: Subject to any disclaimer, the term of this patent is extended or adjusted under 35 U.S.C. 154(b) by 716 days.

(21) Appl. No.: 18/142,494

(22) Filed: May 2, 2023

(65) Prior Publication Data

US 2023/0351088 A1 Nov. 2, 2023

Related U.S. Application Data

(60) Provisional application No. 63/337,547, filed on May 2, 2022.

(51) Int. Cl.
*G06F 30/394* (2020.01)
*G03F 1/36* (2012.01)
(Continued)

(52) U.S. Cl.
CPC .............. *G06F 30/394* (2020.01); *G03F 1/36* (2013.01); *G06F 30/392* (2020.01);
(Continued)

(58) Field of Classification Search
CPC .. G06F 30/394; G06F 30/392; G06F 30/3953; G06F 30/398; G06F 2119/18; G06F 30/27; G03F 1/36
See application file for complete search history.

(56) References Cited

U.S. PATENT DOCUMENTS 5,187,671 A 2/1993 Cobb
5,808,330 A 9/1998 Rostoker et al.
(Continued)

FOREIGN PATENT DOCUMENTS

CN 107438842 A 12/2017
CN 111758072 A 10/2020
(Continued)

OTHER PUBLICATIONS

Ajayi, Tutu, et al., "OpenROAD: Toward a Self-Driving, Open-Source Digital Layout Implementation Tool Chain," Proceedings of Government Microcircuit Applications and Critical Technology Conference, Jan. 1, 2019, 6 pages, National Science Foundation, retrieved from https://vlsicad.ucsd.edu/Publications/Conferences/370/c370.pdf.

(Continued)

*Primary Examiner* — Nha T Nguyen
(74) *Attorney, Agent, or Firm* — ADELI LLP

(57) ABSTRACT

Some embodiments use a machine-trained network during routing to provide the router with sufficient information to improve the quality of routes generated by a router. This machine-trained network in some embodiments is referred to as the "digital twin" of a lengthy design and/or manufacturing process that produces the design of an IC layout and/or manufactures an IC based on a designed IC layout. The digital twin in some embodiments provides information regarding parasitics, regarding redundant vias for insertion or regarding complexity of subsequent manufacturing processes used to manufacture an IC based on the IC design layout.

18 Claims, 36 Drawing Sheets

(51) Int. Cl.
*G06F 30/392* (2020.01)
*G06F 30/3953* (2020.01)
*G06F 30/398* (2020.01)
*G06F 119/18* (2020.01)

(52) U.S. Cl.
CPC ........ *G06F 30/3953* (2020.01); *G06F 30/398* (2020.01); *G06F 2119/18* (2020.01)

(56) References Cited

U.S. PATENT DOCUMENTS

| | | | | |
|---|---|---|---|---|
| 6,407,434 | B1 | 6/2002 | Rostoker et al. | |
| 6,480,990 | B1 | 11/2002 | Sharp et al. | |
| 6,829,757 | B1 | 12/2004 | Teig et al. | |
| 6,877,146 | B1 | 4/2005 | Teig et al. | |
| 6,928,633 | B1 | 8/2005 | Teig et al. | |
| 7,017,137 | B2 | 3/2006 | Wadland et al. | |
| 7,096,449 | B1 | 8/2006 | Teig et al. | |
| 7,107,564 | B1 | 9/2006 | Teig et al. | |
| 7,117,468 | B1 | 10/2006 | Teig et al. | |
| 7,269,817 | B2 | 9/2007 | Heng et al. | |
| 7,310,793 | B1 | 12/2007 | Teig et al. | |
| 7,441,220 | B2 | 10/2008 | Hetzel et al. | |
| 7,526,748 | B2 | 4/2009 | Kotani et al. | |
| 7,698,676 | B1 | 4/2010 | Qian | |
| 7,754,401 | B2 | 7/2010 | Fujimura et al. | |
| 7,784,010 | B1 | 8/2010 | Balsdon et al. | |
| 8,473,875 | B2 | 6/2013 | Fujimura et al. | |
| 8,789,005 | B1 * | 7/2014 | Umino | G06F 30/398 716/135 |
| 8,818,072 | B2 | 8/2014 | Ong et al. | |
| 8,898,606 | B1 | 11/2014 | Abou Ghaida et al. | |
| 10,012,900 | B2 | 7/2018 | Kim et al. | |
| 10,346,740 | B2 | 7/2019 | Zhang et al. | |
| 10,444,629 | B2 | 10/2019 | Zable | |
| 10,520,830 | B2 | 12/2019 | Kicken et al. | |
| 10,628,546 | B1 | 4/2020 | Colwell et al. | |
| 10,670,973 | B2 | 6/2020 | Zou et al. | |
| 10,678,142 | B2 | 6/2020 | Jheng et al. | |
| 10,783,292 | B1 | 9/2020 | Clewes et al. | |
| 10,923,318 | B2 | 2/2021 | Gledhill et al. | |
| 10,949,595 | B2 | 3/2021 | Tsutsui et al. | |
| 11,043,359 | B2 | 6/2021 | Nakamura et al. | |
| 11,132,489 | B1 | 9/2021 | Liu et al. | |
| 11,636,388 | B1 | 4/2023 | Chan et al. | |
| 11,645,440 | B1 | 5/2023 | Bustany et al. | |
| 11,836,435 | B1 | 12/2023 | Kang et al. | |
| 2004/0210863 | A1 | 10/2004 | Culp et al. | |
| 2005/0132306 | A1 | 6/2005 | Smith et al. | |
| 2005/0138593 | A1 | 6/2005 | Okumura | |
| 2005/0229134 | A1 | 10/2005 | Hetzel et al. | |
| 2005/0251771 | A1 | 11/2005 | Robles | |
| 2006/0066417 | A1 | 3/2006 | Yamanaga et al. | |
| 2006/0190911 | A1 | 8/2006 | Stivers | |
| 2007/0234246 | A1 | 10/2007 | Sinha et al. | |
| 2007/0245286 | A1 | 10/2007 | Ueda | |
| 2008/0005704 | A1 | 1/2008 | Miloslavsky et al. | |
| 2008/0028352 | A1 | 1/2008 | Birch et al. | |
| 2008/0109766 | A1 | 5/2008 | Song et al. | |
| 2008/0115099 | A1 | 5/2008 | Patra | |
| 2009/0307642 | A1 | 12/2009 | Lai et al. | |
| 2011/0089345 | A1 | 4/2011 | Komagata et al. | |
| 2011/0239181 | A1 | 9/2011 | Uchino | |
| 2012/0094219 | A1 | 4/2012 | Fujimura et al. | |
| 2012/0151422 | A1 | 6/2012 | White et al. | |
| 2013/0022929 | A1 | 1/2013 | Komagata et al. | |
| 2013/0031524 | A1 | 1/2013 | He et al. | |
| 2013/0159943 | A1 | 6/2013 | Agarwal et al. | |
| 2013/0159948 | A1 * | 6/2013 | Agarwal | G06F 30/398 716/112 |
| 2013/0283216 | A1 | 10/2013 | Pearman et al. | |
| 2013/0283218 | A1 | 10/2013 | Fujimura et al. | |
| 2015/0040091 | A1 * | 2/2015 | Hamouda | G06F 30/39 716/119 |
| 2016/0125120 | A1 | 5/2016 | Yu et al. | |
| 2016/0328511 | A1 | 11/2016 | Ning et al. | |
| 2017/0185711 | A1 | 6/2017 | Fujiwara | |
| 2017/0194126 | A1 | 7/2017 | Bhaskar et al. | |
| 2017/0357911 | A1 | 12/2017 | Liu et al. | |
| 2018/0067900 | A1 | 3/2018 | Mos et al. | |
| 2018/0196911 | A1 | 7/2018 | Chang et al. | |
| 2019/0114381 | A1 | 4/2019 | Lin et al. | |
| 2019/0146355 | A1 | 5/2019 | Jheng et al. | |
| 2019/0197213 | A1 | 6/2019 | Ungar | |
| 2019/0206041 | A1 | 7/2019 | Fang et al. | |
| 2019/0303526 | A1 | 10/2019 | Wang et al. | |
| 2019/0370431 | A1 | 12/2019 | Sha et al. | |
| 2019/0377849 | A1 | 12/2019 | Sha et al. | |
| 2019/0385300 | A1 | 12/2019 | Baidya et al. | |
| 2020/0051781 | A1 | 2/2020 | Fujimura et al. | |
| 2020/0065453 | A1 | 2/2020 | Kim et al. | |
| 2020/0134131 | A1 | 4/2020 | Tien et al. | |
| 2020/0159884 | A1 * | 5/2020 | Kim | G06F 30/394 |
| 2020/0184137 | A1 | 6/2020 | Tsutsui et al. | |
| 2020/0364394 | A1 | 11/2020 | Yu et al. | |
| 2020/0380089 | A1 | 12/2020 | Gheith et al. | |
| 2020/0380362 | A1 | 12/2020 | Cao et al. | |
| 2020/0387660 | A1 | 12/2020 | Cecil | |
| 2021/0048741 | A1 | 2/2021 | Lugg et al. | |
| 2021/0181620 | A1 | 6/2021 | Poonawala et al. | |
| 2021/0216697 | A1 | 7/2021 | Brink et al. | |
| 2021/0279878 | A1 | 9/2021 | Adler et al. | |
| 2021/0397172 | A1 | 12/2021 | Slachter et al. | |
| 2022/0027546 | A1 | 1/2022 | Ren et al. | |
| 2022/0035237 | A1 | 2/2022 | Lee et al. | |
| 2022/0050381 | A1 | 2/2022 | Biswas et al. | |
| 2022/0128899 | A1 | 4/2022 | Fujimura et al. | |
| 2022/0147682 | A1 | 5/2022 | Koumura | |
| 2022/0187713 | A1 | 6/2022 | Middlebrooks et al. | |
| 2022/0299881 | A1 | 9/2022 | Zheng et al. | |
| 2022/0335197 | A1 | 10/2022 | Hsu et al. | |
| 2022/0350951 | A1 | 11/2022 | Tong et al. | |
| 2023/0024684 | A1 | 1/2023 | Fujimura et al. | |
| 2023/0027655 | A1 | 1/2023 | Fujimura et al. | |
| 2023/0032510 | A1 | 2/2023 | Fujimura et al. | |
| 2023/0092665 | A1 | 3/2023 | Fujimura et al. | |
| 2023/0107556 | A1 | 4/2023 | Tao et al. | |
| 2023/0153505 | A1 | 5/2023 | Chang et al. | |
| 2023/0168660 | A1 | 6/2023 | Oriordan et al. | |
| 2023/0169245 | A1 | 6/2023 | Oriordan et al. | |
| 2023/0169246 | A1 | 6/2023 | Oriordan et al. | |
| 2023/0169247 | A1 | 6/2023 | Oriordan et al. | |
| 2023/0186009 | A1 | 6/2023 | Fujimura et al. | |
| 2023/0205972 | A1 | 6/2023 | Oriordan et al. | |
| 2023/0214571 | A1 | 7/2023 | Apte et al. | |
| 2023/0229836 | A1 | 7/2023 | Oriordan et al. | |
| 2023/0229840 | A1 | 7/2023 | Oriordan et al. | |
| 2023/0229844 | A1 | 7/2023 | Oriordan et al. | |
| 2023/0267265 | A1 | 8/2023 | Oriordan | |
| 2023/0274065 | A1 | 8/2023 | Fujimura | |
| 2023/0274066 | A1 | 8/2023 | Fujimura | |
| 2023/0274067 | A1 | 8/2023 | Fujimura | |
| 2023/0274068 | A1 | 8/2023 | Fujimura | |
| 2023/0274069 | A1 | 8/2023 | Fujimura | |
| 2023/0274070 | A1 | 8/2023 | Fujimura | |
| 2023/0274071 | A1 | 8/2023 | Fujimura | |
| 2023/0281374 | A1 | 9/2023 | Fujimura | |
| 2023/0282635 | A1 | 9/2023 | Fujimura | |
| 2023/0297756 | A1 | 9/2023 | Ruic | |
| 2023/0306177 | A1 | 9/2023 | Fujimura | |
| 2023/0315966 | A1 | 10/2023 | Lanzillo et al. | |
| 2023/0351087 | A1 | 11/2023 | Oriordan et al. | |
| 2023/0351089 | A1 | 11/2023 | Oriordan et al. | |
| 2023/0359804 | A1 | 11/2023 | Oriordan | |
| 2023/0385513 | A1 | 11/2023 | Oriordan et al. | |
| 2023/0385514 | A1 | 11/2023 | Oriordan et al. | |
| 2023/0385521 | A1 | 11/2023 | Chuang et al. | |
| 2024/0119214 | A1 | 4/2024 | Oriordan et al. | |
| 2024/0288764 | A1 | 8/2024 | Hamouda | |

(56) References Cited

U.S. PATENT DOCUMENTS

| | | | | |
|---|---|---|---|---|
| 2024/0296273 | A1 | 9/2024 | Yang et al. | |
| 2026/0057911 | A1* | 2/2026 | Hsieh | G11C 5/06 |

FOREIGN PATENT DOCUMENTS

| | | | |
|---|---|---|---|
| CN | 113168085 | A | 7/2021 |
| CN | 113168115 | A | 7/2021 |
| EP | 3951496 | A1 | 2/2022 |
| JP | 2007536581 | A | 12/2007 |
| JP | 2012181298 | A | 9/2012 |
| JP | 2019114295 | A | 7/2019 |
| JP | 2021509208 | A | 3/2021 |
| KR | 102170578 | B1 | 10/2020 |
| KR | 20210010897 | A | 1/2021 |
| KR | 102377411 | B1 | 3/2022 |
| KR | 20260035214 | A | 3/2026 |
| TW | I710763 | B | 11/2020 |
| TW | 202113501 | A | 4/2021 |
| TW | 202121050 | A | 6/2021 |
| WO | 2018125220 | A1 | 7/2018 |
| WO | 2020193095 | A1 | 10/2020 |
| WO | 2021041963 | A1 | 3/2021 |
| WO | 2021043936 | A1 | 3/2021 |
| WO | 2022086825 | A1 | 4/2022 |

OTHER PUBLICATIONS

Ao, Jianchang, et. al., "Delay-Driven Layer Assignment in Global Routing under Multi-tier Interconnect Structure," ISPD '13: Proceedings of the 2013 ACM International Symposium on Physical Design, Mar. 2013, 7 pages, ACM, retrieved from https://dl.acm.org/doi/10.1145/2451916.2451942.

Author Unknown, "D2S Enables "Stitchless" Full-Chip Inverse Lithography Technology in a Single Day for the Multi-Beam Era," Press Release, Sep. 16, 2019, 3 pages, D2S, Inc., San Jose, California, USA.

Author Unknown, "D2S Unveils Industry's First Mask-Wafer Double Simulation Platform," Press Release, Sep. 20, 2011, 3 pages, D2S, Inc., San Jose, California, USA.

Author Unknown, "Deep reinforcement learning, " Wikipedia, Sep. 21, 2020, 2 pages, Wikipedia.com.

Author Unknown, "Design rule checking," Wikipedia, May 27, 2020, 4 pages, Wikipedia.com.

Author Unknown, "Jaccard index," Wikipedia, Sep. 6, 2020, 9 pages, Wikipedia.com.

Author Unknown, "Marching squares," Wikipedia, Dec. 30, 2019, 9 pages, Wikipedia.com.

Author Unknown, "Multiple patterning," Wikipedia, Oct. 10, 2020, 22 pages, Wikipedia.com.

Author Unknown, "Optical proximity correction," Wikipedia, Apr. 28, 2019, 5 pages, Wikipedia.com.

Author Unknown, "Rasterisation," Wikipedia, Aug. 21, 2020, 4 pages, Wikipedia.com.

Author Unknown, "TrueMask® DS," Exact Date Unknown but Before May 2020, 3 pages, D2S, Inc., retrieved from https://design2silicon.com/products/truemask-ds/.

Author Unknown, "TrueMask® ILT Backgrounder Stitchless Full-Chip ILT in a Day," Backgrounder, Sep. 2019, 6 pages, D2S, Inc., San Jose, California, USA.

Author Unknown, "TrueMask® ILT," Exact Date Unknown but Before May 2020, 7 pages, D2S, Inc., retrieved from https://design2silicon.com/products/truemask-ilt/.

Cecil, Thomas, et al., "Establishing Fast, Practical, Full-Chip ILT Flows Using Machine Learning," SPIE Proceedings 11327, Optical Microlithography XXXIII, Mar. 23, 2020, 19 pages, vol. 1132706, SPIE, San Jose, California, USA.

Chen, Kun-Yuan, et al., "Full-Chip Application of Machine Learning SRAFs on DRAM Case Using Auto Pattern Selection," SPIE Proceedings 10961, Optical Microlithography XXXII, Oct. 10, 2019, 13 pages, vol. 1096108, SPIE, San Jose, California, USA.

Chen, Tai-Chen, "Multilevel Full-Chip Gridless Routing With Applications to Optical-Proximity Correction," Jun. 2007, 13 pages, IEEE, retrieved from http://cc.ee.ntu.edu.tw/~ywchang/Papers/tcad07-mgr.pdf.

Ibtehaz, Nabil, et. al., "MultiResUNet: Rethinking the U-Net Architecture for Multimodal Biomedical Image Segmentation," Feb. 11, 2019, 25 pages, retrieved from https://arxiv.org/pdf/1902.04049.pdf.

Jia, Ningning, et al., "Machine Learning for Inverse Lithography: using stochastic gradient descent for robust photomask synthesis," Journal of Optics, Apr. 1, 2010, 9 pages, vol. 12, IOP Publishing, retrieved from https://www.eee.hku.hk/optima/pub/journal/1004_JO.pdf.

Kwan, Joe, et al., "Applying Machine Learning Techniques to Accelerate Advanced Process Yield Ramp," Jan. 5, 2021, 29 pages, Siemens Digital Industries Software, Munich, Germany.

Lee, Kuang-Yao, et al., "Post-Routing Redundant via Insertion for Yield/Reliability Improvement," ASP-DAC 2006: 11th Asia and South Pacific Design Automation Conference, Jan. 24-27, 2006, 6 pages, IEEE, Yokohama, Japan.

Lin, Yibo, et al., "Machine Learning for Yield Learning and Optimization," 2018 IEEE International Test Conference (ITC), Oct. 29-Nov. 1, 2018, 10 pages, IEEE, Phoenix, AZ, USA.

Liu, Peng, "Mask Synthesis Using Machine Learning Software and Hardware Platforms," SPIE Proceedings 11327, Optical Microlithography XXXIII, Mar. 23, 2020, 17 pages, vol. 1132707, SPIE, San Jose, California, USA.

Mitchell, Robin, "IMEC Demonstrates Buried Power Rails in FinFET CMOS," Mar. 17, 2021, 6 pages, EPM, retrieved from https://www.electropages.com/blog/2021/03/imec-demonstrates-buried-power-rails-finfet-cmos.

Mitra, Joydeep, et al., "RADAR: RET-Aware Detailed Routing Using Fast Lithography Simulations," DAC '05: 42nd annual Design Automation Conference, Jun. 13-17, 2005, 6 pages, IEEE, retrieved from https://citeseerx.ist.psu.edu/viewdoc/download?doi=10.1.1.103.2367&rep=rep1&type=pdf.

Naik, Mehul, "Challenges to Interconnect Scaling at 3nm and Beyond," Applied Materials, Jun. 14, 2021, 9 pages, Applied Materials, Inc., retrieved from https://www.appliedmaterials.com/us/en/blog/blog-posts/challenges-to-interconnect-scaling-at-3nm-and-beyond.html.

Pang, Linyong (Leo), et al., "Study of Mask and Wafer Co-design That Utilizes a New Extreme SIMD Approach to Computing in Memory Manufacturing: Full-Chip Curvilinear ILT in a Day," SPIE Proceedings 11148, Photomask Technology 2019, Oct. 3, 2019, 16 pages, vol. 111480U, SPIE, retrieved from https://design2silicon.com/wp-content/uploads/2019/11/2019-BACUS-Full-Chip-Curvilinear-ILT-091219s-003.pdf.

Pang, Linyong, "Inverse Lithography Technology: 30 years from concept to practical, full-chip reality," Journal of Micro/Nanopatterning, Materials, and Metrology, Aug. 31, 2021, 49 pages, vol. 20(3), SPIE, retrieved from https://www.spiedigitallibrary.org/journals/journal-of-micro-nanopatterning-materials-and-metrology/volume-20/issue-03/030901/Inverse-lithography-technology--30-years-from-concept-to-practical/10.1117/1.JMM.20.3.030901.full.

Pang, Linyong, et al., "How GPU-Accelerated Simulation Enables Applied Deep Learning for Masks and Wafers," Photomask Japan 2019: XXVI Symposium on Photomask and Next-Generation Lithography Mask Technology, Apr. 16-18, 2019, 10 pages, SPIE, Yokohama, Japan.

Pang, Linyong, et al., "Making Digital Twins using the Deep Learning Kit (DLK)," Photomask Technology 2019, Sep. 15-19, 2019, 13 pages, SPIE, Monterey, California, USA.

Pradipta, Geraldo, et al., "A Machine Learning Based Parasitic Extraction Tool," Oct. 31, 2019, 3 pages, University of Minnesota, Minneapolis, Minnesota, USA.

Prasad, Divya, "Can we Bury our Scaling Problems with Buried Power Rails and Back-side Power Delivery?," Mar. 5, 2020, 8 pages, Arm Limited, retrieved from https://community.arm.com/arm-research/b/articles/posts/can-we-bury-our-scaling-problems-with-buried-power-rails-and-back-side-power-delivery.

(56) References Cited

OTHER PUBLICATIONS

Ren, Haoxing (Mark), "Machine Learning and Deep Learning Applications in Design Automation and Practical Issues," DAC '19: 56th Annual Design Automation Conference 2019, Jun. 2-6, 2019, 55 pages, Association for Computing Machinery, Las Vegas, Nevada, USA.
Ronneberger, Olaf, et. al., "U-Net: Convolutional Networks for Biomedical Image Segmentation," May 18, 2015, 8 pages, retrieved from https://arxiv.org/pdf/1505.04597.pdf.
Shi, Xuelong, et al., "Physics based feature Vector Design: a Critical Step Towards Machine Learning based Inverse Lithography," SPIE Proceedings 11327, Optical Microlithography XXXIII, Mar. 23, 2020, 8 pages, vol. 113270A, SPIE, San Jose, California, USA.
Sole, Marc Pons, "Layout Regularity for Design and Manufacturability," Doctoral Thesis, Jul. 8, 2012, 185 pages, Technical University of Catalonia, Barcelona, Spain.
Sperling, Ed, "Design Rule Complexity Rising," Semiconductor Engineering—Deep Insights for the Tech Industry, Apr. 19, 2018, 16 pages, SMG, retrieved from https://semiengineering.com/design-rule-complexity-rising/.
Teig, Steven L., "The X architecture: not your father's diagonal wiring," SLIP '02: Proceedings of the 2002 international workshop on System-level interconnect prediction, Apr. 6, 2002, 5 pages, ACM, retrieved from https://dl.acm.org/doi/10.1145/505348.505355.
Wang, Shibing, et al., "Efficient Full-Chip SRAF Placement Using Machine Learning for Best Accuracy and Improved Consistency," SPIE Proceedings 10587, Optical Microlithography XXXI, Mar. 20, 2018, 10 pages, vol. 105870N, SPIE, San Jose, California, USA.
Wang, Shibing, et al., "Machine Learning Assisted SRAF Placement for Full Chip," SPIE Proceedings 10451, Photomask Technology 2017, Oct. 16, 2017, 8 pages, vol. 104510D, SPIE, Monterey, California, USA.
Yang, Dingcheng, et al., "CNN-Cap: Effective Convolutional Neural Network Based Capacitance Models for Full-Chip Parasitic Extraction," Jul. 14, 2021, 9 pages, retrieved from https://arxiv.org/pdf/2107.06511.pdf.
Cheng, Ruoyu, et al., "On Joint Learning for Solving Placement and Routing in Chip Design", 35th Conference on Neural Information Processing Systems (NeurIPS 2021), Dec. 26, 2021, 12 pages.
Dai, Wayne Wei-Ming, "Rubber band routing and dynamic data representation," 1990 IEEE International Conference on Computer-Aided Design, Nov. 11-15, 1990, 4 pages, IEEE, Santa Clara, California, USA.
Dounde, Amit, et al., "A Study of Curvilinear Routing in IN5 Standard Cells: Challenges and Opportunities," Photomask Technology 2019, Sep. 26, 2019, p. 48, SPIE.
Goldie, Anna, et al., "Placement Optimization with Deep Reinforcement Learning," ISPD '20: Proceedings of the 2020 International Symposium on Physical Design, Mar. 30, 2020, pp. 3-7.
Huang, Li-Da, et al., "Optical Proximity Correction (OPC)—Friendly Maze Routing", DAC04: Proceedings of the 41st Annual Design Automation Conference, Jun. 7-11, 2004, San Diego, CA.
Li, Yaguang, et al., "A Customized Graph Neural Network Model for Guiding Analog IC Placement," ICCAD '20: Proceedings of the 39th International Conference on Computer-Aided Design, Dec. 17, 2020, pp. 1-9.
Liao, Haiguang, et al., "A Deep Reinforcement Learning Approach for Global Routing," Journal of Mechanical Design, Oct. 1, 2019, 12 pages.
Lopera, Daniela Sánchez, et al., "A Survey of Graph Neural Networks for Electronic Design Automation," 2021 ACME IEEE 3rd Workshop on Machine Learning for CAD (MLCAD), Aug. 30-Sep. 3, 2021, 6 pages, IEEE.
Lu, Yi-Chen, "VLSI Placement Optimization using Graph Neural Networks," 34th Conference on Neural Information Processing Systems (NeurIPS 2020), Dec. 6-12, 2020, 5 pages.
Shao, Hao-Chiang, et. al., "From IC Layout to Die Photograph: A CNN-Based Data-Driven Approach" IEEE Transactions on Computer-Aided Design of Integrated Circuits and Systems, vol. 40, No. 5, May 2021, pp. 957-970, IEEE.
Staepelaere, David Joseph, "Geometric Transformations for a Rubber-band Sketch," Master's Thesis, Sep. 1992, 71 pages, University of California at Santa Cruz, Santa Cruz, CA.
Yan, Junchi, "Towards Machine Learning for Placement and Routing in Chip Design: a Methodological Overview", published at https://arxiv.org/abs/2202.13564, Feb. 28, 2022, 9 pages.

* cited by examiner

The three basic DRC checks

1705

Capacitance Table

| | | |
|---|---|---|
| tleft (1) | tniddle (2) | tright (3) |
| mleft (4) | self (5) | mright (6) |
| bleft (7) | bniddle (8) | bright (9) |

USING MACHINE TRAINED NETWORK DURING ROUTING TO MODIFY LOCATIONS OF VIAS IN AN IC DESIGN

CROSS REFERENCE TO RELATED APPLICATIONS

The present application is related to the following applications having a similar specification and figures: U.S. patent application Ser. No. 18/142,482, filed May 2, 2023; U.S. patent application Ser. No. 18/142,483, filed May 2, 2023; U.S. patent application Ser. No. 18/142,488, filed May 2, 2023; U.S. patent application Ser. No. 18/142,498, filed May 2, 2023; and U.S. patent application Ser. No. 18/142,501, filed May 2, 2023.

BACKGROUND

An integrated circuit ("IC") is a device that includes many electronic components, such as transistors, resistors, diodes, etc. These components are often defined on a semiconductor substrate and interconnected with metal wiring and vias to form multiple circuit components, such as gates, cells, memory units, arithmetic units, controllers, decoders, etc. An IC typically includes multiple layers of wiring and vias that interconnect its electronic and circuit components.

Design engineers design ICs by transforming logical or circuit descriptions of the IC components into geometric descriptions, called layouts. IC layouts typically include (1) geometric representations of electronic or circuit IC components (called circuit modules) with pins, and (2) geometric representations of wiring (called interconnect lines below) that connect the pins of the circuit modules. A net is typically defined as a collection of pins that need to be connected. To create layouts, design engineers typically use electronic design automation ("EDA") applications. These applications provide sets of computer-based tools for creating, editing, and analyzing IC design layouts.

Fabrication foundries manufacture ICs based on these IC design layouts. To fabricate an IC after designing of the IC layout is completed, lithographic masks are created based on the IC layout so that the masks contain various geometries that when used in lithographic processes produce the various geometries of the IC layout on a semiconductor wafer. The produced geometries represent the elements (such as IC components, interconnect lines, via pads, etc.) of the IC.

Even when the IC design layouts are otherwise valid, fabs cannot always reliably manufacture ICs unless the IC design layouts effectively account for capabilities, settings and variances of the manufacturing processes employed by the fabs. When IC design layouts are completed without taking into account these manufacturing constraints, the IC design layouts at times need to be modified after they are completed and sent over to the fabs.

Wire routing, commonly called simply routing, is a critical step in the design of printed circuit boards (PCBs) and integrated circuits (ICs). It builds on a preceding step, called placement, which determines the location of each active element of an IC or component on a PCB. After placement, the routing step adds interconnects in the design layout that are needed to properly connect the placed components while obeying all design rules for the IC. Together, the placement and routing steps of IC design are known as place and route.

Routers are typically given some pre-existing polygons comprising pins (also called terminals) on cells, and optionally some pre-existing wiring called pre-routes. Each such polygons is typically associated with a net, usually by name or number. The router has to create geometries such that all terminals assigned to the same net are connected, no terminals assigned to different nets are connected, and all design rules are obeyed. A router can fail by not connecting terminals that should be connected (an open), by mistakenly connecting two terminals that should not be connected (a short), or by creating a design rule violation.

In addition, to correctly connect the nets, routers are expected to make sure the design meets timing. Some of the biggest challenges in chip scaling involve contacts and interconnects. Since interconnects become more compact at each process node, this has an adverse effect on RC delay (and hence timing, max operating frequency, etc.) in IC designs. Transistor devices have traditionally scaled well, e.g., with the translation from planar to FinFET devices. However, the contacts and interconnects have shrunk as the devices have shrunk, which leads to significant increase in both resistance and capacitance. Foundries have been able to reduce the contribution to RC delay from resistance somewhat by increasing the aspect ratio (effectively, the height) of the interconnect—with a resulting increase in coupling capacitance—but resistance has become an increasingly difficult problem to solve. The resistance problem is further confounded by misalignment issues when manufacturing multiple-layer designs. Both resistance and capacitance combine to impact circuit timing and signal integrity, which negatively impacts a router's ability to deliver a good solution.

As process geometries have shrunk, routers have faced additional challenges in the areas of signal integrity, manufacturability, and reliability. In particular, crosstalk issues are a primary concern in the area of signal integrity, and these have arisen primarily due to increases in coupling capacitances, which in turn have been driven by increases in the aspect ratios of wires, combined with decreases in the lateral distances between them.

In terms of manufacturability, Optical Proximity Correction (OPC) has become a primary concern, with routers needing to become OPC aware in order to avoid creating problems for downstream OPC tools. OPC adds or subtracts patterns to a mask to enhance the layout resolution and improve the printability or transfer of the mask patterns to wafer. Chemical Metal Polishing (CMP) has also become a large manufacturability issue to which routers need to be aware. CMP strives to achieve layout uniformity and chip planarization to achieve a good manufacturing yield.

Variability in manufacturing, which also increases as process nodes get smaller, further negatively impacts a router's ability to deliver a good solution that is robust in the face of manufacturing variations. Reliability issues face circuits during manufacture, or after they have been manufactured, and also need to be accounted for during routing. Routers need to minimize or eliminate antenna effects in order to protect against dielectric breakdown, and redundant-via insertion has also become commonplace as one way to mitigate against via failures that occur due to a variety of reasons, including random defects, cut misalignments during manufacturing, and thermal-stress or electromigration issues afterwards.

All of these issues combine to make the task of routing ever more difficult. There is clearly a need to have routers be aware of more and more of these kinds of details, and to have better models/awareness of the issues, in order to allow the routers to achieve the best solutions.

BRIEF DESCRIPTION OF FIGURES

The novel features of the invention are set forth in the appended claims. However, for purposes of explanation, several embodiments of the invention are set forth in the following figures.

DETAILED DESCRIPTION

In the following detailed description of the invention, numerous details, examples, and embodiments of the invention are set forth and described. However, it will be clear and apparent to one skilled in the art that the invention is not limited to the embodiments set forth and that the invention may be practiced without some of the specific details and examples discussed.

Some embodiments use a machine-trained network (e.g., a neural network or other machine-trained network) during routing to provide the router with sufficient information to improve the quality of routes generated by a router. This machine-trained network in some embodiments is referred to as the "digital twin" of a lengthy design and/or manufacturing process that produces the design of an IC layout and/or manufactures an IC based on a designed IC layout. The term "digital twin" connotes that the machine-trained network (MTN) is a digital approximation of this lengthy design and/or manufacturing process, and produces approximations of the results that would be obtained had the design and/or manufacturing process been performed on the current IC layout to finish the IC design and/or manufacture the IC.

When predicting the manufactured shape of the IC layout, the digital twin in some embodiments predicts the shape of the components produced on the IC at a subsequent stage in the manufacturing process. This subsequent stage can be different in different embodiments. For instance, in some embodiments, this subsequent stage is a wafer simulation stage that produces the component shapes on a simulated manufactured wafer, while in other embodiments it is the actual IC manufacturing stage that produces the actual components on a manufactured IC. The term digital twin can also be used to reflect the predicted manufactured shapes. Whether the term refers to the overall design and/or manufacturing process, or the manufactured object/shape, will be clear from the context.

Figure 1:
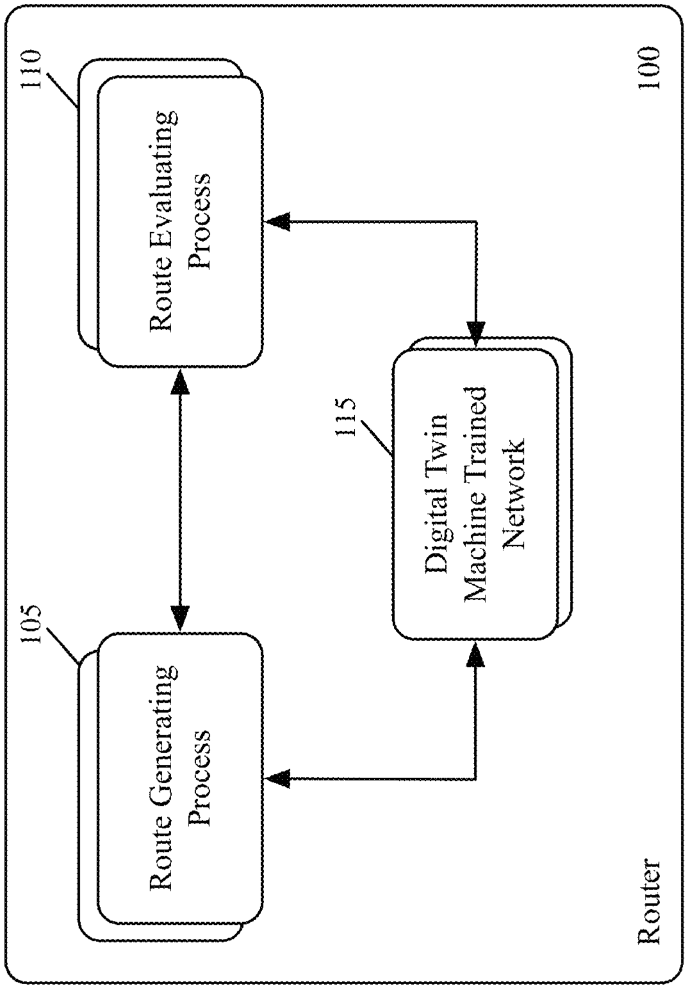
FIG. 1 illustrates an example of a router in some embodiments that uses one or more digital twin machine-trained networks to generate routes and/or to evaluate the generated routes.

FIG. 1 illustrates that a router 100 in some embodiments uses one or more digital twin machine-trained networks to generate routes and/or to evaluate the generated routes. Specifically, the router 100 is shown to include one or more route generation processes 105, one or more route evaluation processes 110 and one or more machine-trained networks 115 that are digital twins of one or more design and/or manufacturing processes.

Each route generation process 105 generates one or more routes in an IC design layout, while each route evaluation process 110 evaluates one or more routes generated by one or more route generation processes to ensure that the generated routes satisfy a set of design constraints while optimizing (e.g., maximizing or minimizing) an objective function. The design constraints in some embodiments place bounds on the solutions that are explored for optimizing objective functions. IC design layouts typically include (1) geometric representations of electronic or circuit IC components (called circuit modules) with pins, and (2) geometric representations of wiring (called interconnect lines below) that connect the pins of the circuit modules. A net is typically defined as a collection of pins that need to be connected. Several examples of route generation processes and route evaluation processes that use digital twins are described below.

Routing solutions are analyzed to predict how resistance and capacitance impact timing, signal integrity, and other effects impact the performance of the routes that are specified by the routing solutions. The route evaluation processes of some embodiments use digital twin MTNs to provide fast and reliable computation of the parasitic resistances and capacitances, and/or prediction of how these parasitics impact timing, signal integrity, and other effects. These route evaluation processes lead to improved routing solutions, improvements in routability, reduction in routing time, etc.

Some embodiments perform such evaluations while routing individual routes for individual nets. Other embodiments perform such evaluations after several routes have been defined for several nets. For instance, some embodiments perform such evaluations during rip-up and reroute operations that analyzes a design layout or a portion of the design layout to identify any structures (e.g., routes, vias, etc.) that do not meet certain criteria (e.g., parasitic criteria, via placement or size criteria, route cost criteria, etc.). For instance, during a rip-up and reroute operation, a router can analyze a group of routes to identify problematic routes, remove them from the design (i.e., "rip" these routes out of the design), and to identify new routes (i.e., to re-route) for the nets that had their routes removed. Rip-up and reroute is often an iterative process, running until all nets are successfully re-routed or a time limit/iteration count is exceeded, and often leads to improved routing solutions.

The route generation processes 105 and/or route evaluation processes 110 of some embodiments also use digital twin MTNs to generate predicted manufactured shapes of IC design components, and then use these shapes to inform their route generation and/or route evaluation operations. Many of the IC designs today are created with rectilinear shapes, using Manhattan routing, or occasionally 45 degree routing. When these designs are manufactured, the shapes deposited on the substrate are no longer Manhattan. In fact, the actual deposited shapes become highly curvilinear, due to the realities of manufacturing, particularly at modern process geometries.

Figure 2:
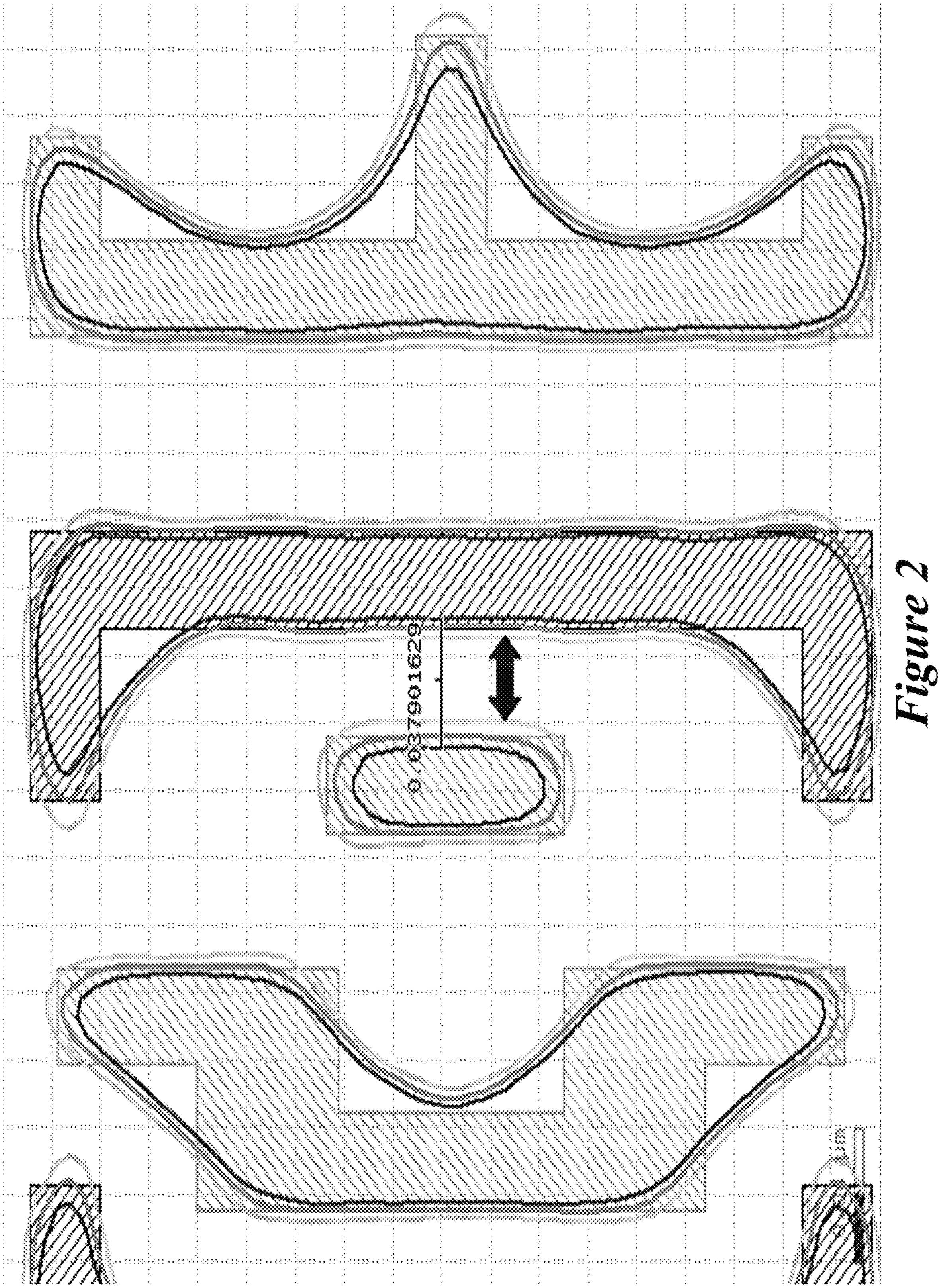
FIG. 2 illustrates an example of a curvilinearization of Manhattan shapes by manufacturing process.

FIG. 2 illustrates an example of a curvilinearization of Manhattan shapes by manufacturing process. This figure shows a user interface of an EDA tool displaying rectilinear/Manhattan shapes with cross-hatchings, which in some embodiments are displayed in first and second colors, e.g., light blue and red. Superimposed on these Manhattan shapes are the actual or predicted manufactured shapes, which as shown are in the curvilinear forms illustrated by the contours that in some embodiments are displayed in other colors (e.g., lighter gray, gray and darker gray).

In this example, the different-colored cross-hatched rectilinear shapes represent different color masks for a metal layer, while the three sets of curvilinear manufactured contours shown correspond to one manufacturing process extreme (e.g., inner contour shown in darker gray), the nominal process conditions (e.g., the middle contour shown in gray) and the other manufacturing process extreme (e.g., the outer contour shown in lighter gray). Some embodiments use the curvilinear shapes to perform design rule checks during route generation and/or route evaluation operations. U.S. Patent Publication 20220128899, U.S. patent application Ser. No. 17/992,870 (now published as U.S. Patent Publication 2023/0168660), U.S. patent application Ser. No. 18/097,272 (now published as U.S. Patent Publication 2023/0267265), and U.S. patent application Ser. No. 17/992,897 (now issued as U.S. Pat. No. 12,547,804) describe processes for generating predicted curvilinear manufactured shapes for IC designs. U.S. Patent Publication 20220128899, U.S. patent application Ser. No. 17/992,870 (now published as U.S. Patent Publication 2023/0168660), U.S. patent application Ser. No. 18/097,272 (now published as U.S. Patent Publication 2023/0267265), and U.S. patent application Ser. No. 17/992,897 (now issued as U.S. Pat. No. 12,547,804) are all incorporated herein by reference.

In some cases, the manufacturing processes variations that result in multiple contours (inner, nominal, outer) combine with the process layer misalignment problem to result in poor via/contact overlaps. While interconnect wiring traverses one metal layer that is commonly defined in terms of two axes (e.g., x- and y-axis), vias are conductive structures that traverse in a third axis (z-axis) to connect interconnect wirings that traverse along different layers and/or interconnect wiring and pins on different layers. Some embodiments use digital twin MTNs to produce the predicted via/contact overlaps in view of the manufacturing processes variations and misalignment problems, as further described in U.S. patent application Ser. No. 17/992,897, which is incorporated herein by reference.

The various degrees of curvature and proximity variation in the manufactured shapes become worse at smaller process nodes. This worsening makes it difficult to accurately predict the actual capacitance values, and perhaps more importantly, the spread or variation in capacitance values. This tends to result in added pessimism in resistance and capacitance models, which in turn adds pessimism to timing calculations, and so negatively impacts a router's chances to find a good enough solution in a reasonable timeframe.

As further described below, some embodiments use digital twin MTNs (e.g., neural networks) during routing to provide the router with sufficient information to improve the routability of designs, to improve the routing quality of results, to reduce or eliminate timing violations, to reduce or eliminate signal integrity (SI)-related violations, and/or to reduce or eliminate manufacturing hot spots.

Figure 3:
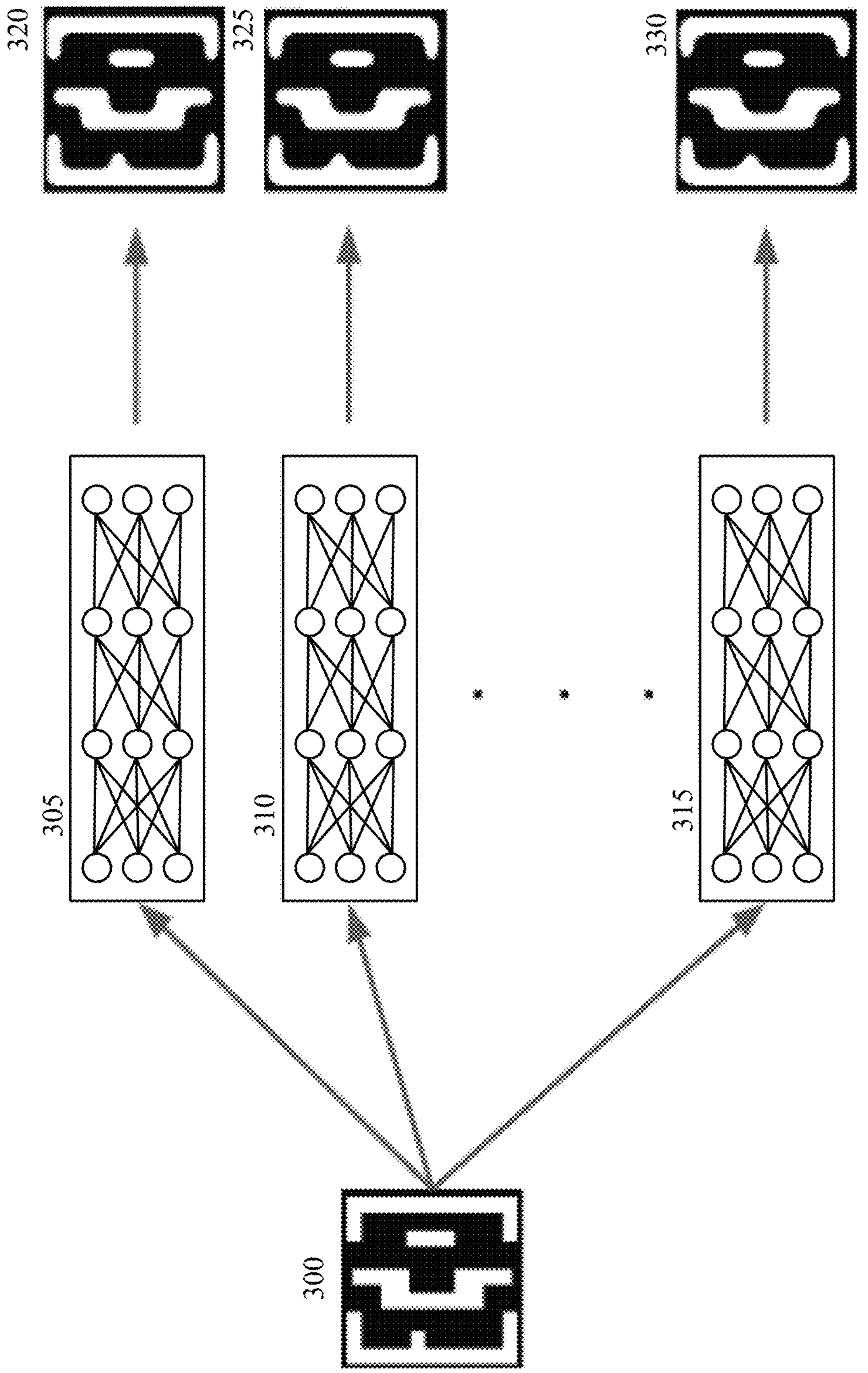
FIG. 3 illustrates multiple trained neural networks that produce multiple predicted contours for the design layout shaped over multiple process variations.

FIG. 3 illustrates that some embodiments use three different digital twin MTNs 305, 310 and 315 to produce for an input portion 300 of a design layout, three different predicted contours 320, 325 and 330 that are defined for three different process variations, as described above by reference to FIG. 2. These three different MTNs generate these contours very quickly and accurately. The training and use of these neural networks are further described in the above-incorporated U.S. Patent Publication 20220128899, U.S. patent application Ser. No. 17/992,870, U.S. patent application Ser. No. 18/097,272, and U.S. patent application Ser. No. 17/992,897. As mentioned in these incorporated applications, some embodiments use one MTN to generate all three contours instead of using three MTNs.

Also, each set of contours in the three different sets of contours in some embodiments corresponds to the predicted contours that would be manufactured on an IC if the manufacturing process variation associated with that contour set is experienced. This is because the MTNs in these embodiments are trained based on known contours (outputs) that are extracted from the manufactured ICs. In other embodiments, the three sets of contours are the contours that would be produced by the wafer simulation stage, as the MTNs are trained based on known outputs generated by a wafer simulator.

The input to the digital twins (e.g., MTNs 305-315) includes a rasterized image of some shapes to be manufactured for a given semiconductor layer. Pixel values range from 0 to 1, indicating the degree of coverage of the area associated with the pixel. In some embodiments, gray scale values in between 0 and 1 are present for pixels corresponding to the edges/corners of to-be-manufactured shapes. In some embodiments, these are shapes mostly likely to be interconnect shapes, e.g., metal layer interconnects. The output from the digital twin corresponds to an aerial image view (e.g., top-down view) of the correspondingly manufactured objects. In some embodiments, these are again in the form of gray-scale images, from which the manufactured shape contours are determined via a contouring operation. The contours will be different from the originally drawn images, typically being in some curvilinear form as reflecting the physics of manufacturing.

Figure 4:
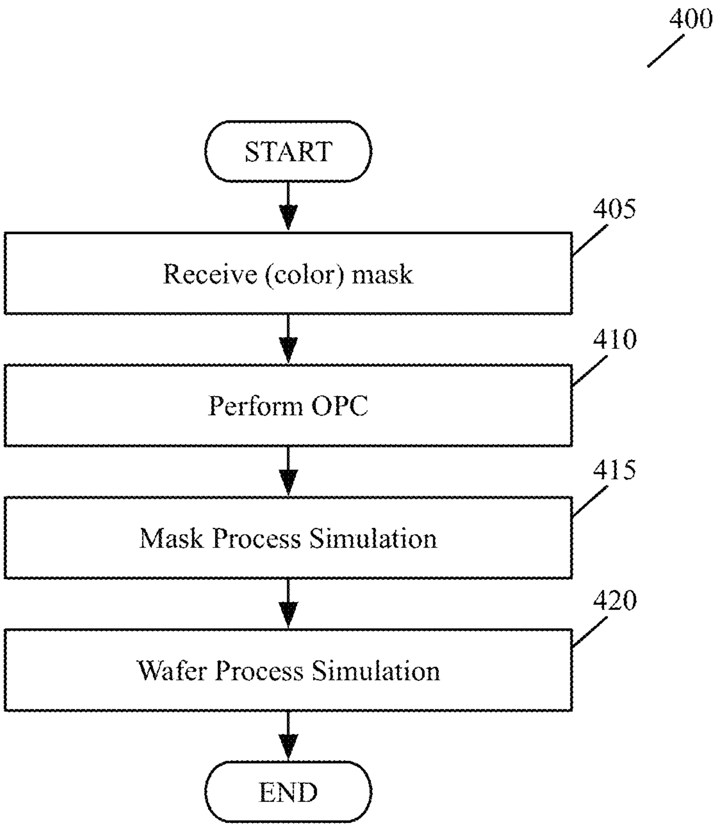
FIG. 4 illustrates a process for obtaining the ground truth data for training the digital twin in some embodiments.

FIG. 4 illustrates a process 400 for generating known input/output data (i.e., ground truth data) for training the digital twins. The process 400 is a simulation process that is used in some embodiments to produce an output training sample for a received input design training sample. In some embodiments, the input sample is an entire IC design, while in other embodiments, the input sample is a portion of an IC design in some embodiments.

When the input sample is the entire IC design or a large portion of the IC design, many input/output training pairs are extracted from the input that is supplied to the simulation process 400 and the output that is generated by this process. Under this approach, each extracted input is a particular smaller part of the IC design, while each extracted output is the small part of the simulation process' output that corresponds to the particular smaller input part. On the other hand, when the process 400 processes only small input design-layout samples to produce corresponding small wafer-simulation output samples, the process 400 is iteratively performed many times to produce many known input design layout samples and the corresponding wafer-simulation output samples for these input samples.

The process 400 in some embodiments generates series of images representative of desired to-be-manufactured interconnect patterns. These are then simulated with semiconductor manufacturing simulation software, under a variety of conditions. In some embodiments, the output images produced in response to the input images are further processed in order to determine the images associated with the manufacturing process corner extremes. In some embodiments, input, output pairs produced in this manner are then used to train a digital twin, e.g., in the form of a convolutional neural network. The process 400 incorporates the effects of optical proximity correction (OPC) (including inverse lithography technology, ILT) as part of the overall manufacturing process as these are accounted for to properly train the MTNs in some embodiments.

As shown, the process 400 starts by performing (at 405) a coloring operation that separates an input sample into multiple mask layers. In the coloring operation, each feature of the input sample on a reticle layer is colored to reflect the assignment of a feature to a particular mask layer. After the colorization operation, the process 400 performs (at 410) an OPC operation to produce one or more possible sets of mask designs, with each set of mask designs corresponding to the input sample. OPC adds or subtracts patterns to a mask to enhance the layout resolution and improve the printability or transfer of the mask patterns to the wafer.

Figure 5:
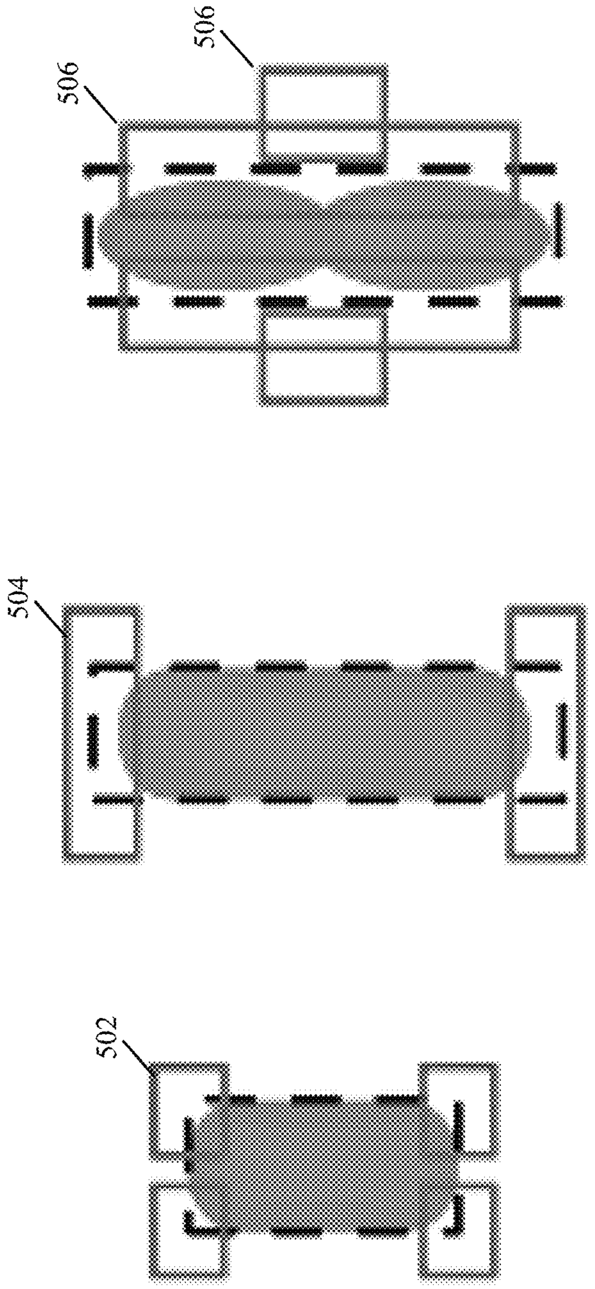
FIG. 5 illustrates examples of edge/corner-based OPC patterns in which serifs, hammerheads and line biasing are inserted.

For the input sample, the generated mask designs in some embodiments include a nominal mask design with variation. In some embodiments, the possible mask designs produced at 410 may be combined to create the nominal mask design with variations. Conventionally, the nominal mask design can be determined using a nominal dose, such as 1.0 and calculating a nominal contour of a mask design at a threshold, such as 0.5. In some embodiments, the nominal contour of the mask design is calculated from several possible mask designs. In some embodiments, the OPC operation includes an ILT operation. The ILT operation in some embodiments creates ideal curvilinear ILT patterns, while in other embodiments, the ILT operation rectilinearizes the curvilinear patterns. Instead of using advanced forms of OPC, including ILT, some embodiments use simpler forms of OPC, such as edge-based OPC, in which hammer heads, serifs, and line bias features are inserted. FIG. 5 illustrates examples of edge/corner-based OPC patterns in which serifs 502, hammerheads 504 and line biasing 506 are inserted.

After the OPC operation, the process 400 performs (at 415) a mask simulation operation to produce mask data preparation (MDP), which prepares the mask design for a mask writer. This operation in some embodiments includes "fracturing" the data into trapezoids, rectangles, or triangles. This operation also includes in some embodiments Mask Process Correction (MPC), which geometrically modifies the shapes and/or assigns dose to the shapes to make the resulting shapes on the mask closer to the desired shape. MDP may use as input the possible mask designs or the results of MPC. MPC may be performed as part of a fracturing or other MDP operation.

After the mask simulation, the process 400 performs (at 420) a wafer simulation operation that calculates possible IC patterns that would result from using the generated masks. In some embodiments, the wafer simulation operation (at 420) includes a lithography simulation that uses the calculated mask images. The operation at 420 calculates several possible patterns on the substrate from the plurality of mask images. After 420, the process ends.

For an input sample, the generated IC pattern in some embodiments represents an output pattern or a range of output patterns (when the produced shapes have multiple contours to account for process variations and manufacturing parameter variations). The input sample and the generated output pattern represent a known input with a known output that are used to train the machine-trained neural network in some embodiments. Once trained, the neural network can then be used during compaction to assist in the routing operations of some embodiments.

It will be appreciated by those of ordinary skill that the process 400 may be somewhat more, or less, involved than that shown. Typically, the mask process simulation software can be parameterized i.e., instructed to perform the mask process simulation under a set of mask process (e.g., dosemap variation) parameter values. Likewise, the wafer simulation software can be parameterized i.e., instructed to perform the wafer process simulations under a set of wafer process (e.g., dosemap variation and depth-of-focus variation) parameter values.

By adjusting such parameters, multiple output samples (e.g., multiple manufactured contours) corresponding to multiple process variations for one input sample are produced in some embodiments. In this manner, the trained digital twins of some embodiments can predict manufactured shapes, while factoring both OPC and manufacturing process variations. By generating multiple input patterns by placing one input pattern in a variety of different neighboring variations with different neighboring patterns, some embodiments also produce training data to account for neighborhood variations of any input pattern.

Some embodiments use the generated input/output training samples to put the machine trained neural networks through learning processes that account for (1) manufacturing variations in one or more manufacturing parameters (such as dosage and focus depth) and/or (2) neighborhood variations that account for different possible components that neighbor input component patterns that are part of the inputs used for the learning processes. To train the neural network, some embodiments feed each known input sample through the neural network to generate an output, and then compare this generated output to the known output of the input to identify a set of one or more error values. The error values for a group of known inputs/outputs are then used to compute a loss function, which is then back propagated through the neural network to train the configurable parameters (e.g., the weight values) of the neural network. Once trained by processing a large number of known inputs/outputs, the neural network can then be used to facilitate routing operations of some embodiments.

To appreciate the benefits of digital twin MTNs, it is helpful to understand common issues experienced by most routers. In a typical EDA flow, routing is often performed after Clock Tree Synthesis (CT S) and optimization, and results in the exact interconnect by which macros, standard cells, and I/O pins are connected. The interconnect is realized via metal tracks and inter-layer vias in the layout, which often follows the same logical connections present in the pre-routed netlist. After the CTS step, the router has access to information including the various cell placements, any blockages which routing must avoid, the various clock tree buffers/inverters inserted during CTS, and of course the I/O pins themselves.

This information steers the router to electrically complete all connections defined in the netlist. Routers are often guided by constraints such as (1) the number of interconnect layers to be used, (2) the maximum length for the routed interconnect wires, (3) the minimum width of, and minimum spacing between, the interconnect wires, (4) routing mostly along preferred routing directions often including horizontal and vertical (specific layers are to be routed in particular directions only or primarily), (5) off-grid routing constraints, (6), blockages (predefined areas which block routing in particular areas), (7) allowed routing areas, which limit routing to specific areas only, (8) routing region precedence, (9) routing density, (10) pin connection constraints and (11) restrictions in how much rerouting can take place.

Routers try to ensure that (1) any DRC violations introduced during routing are minimized, (2) routing is completed, i.e., the design is 100% routed with minimal discrepancies between the post-routed layout and the pre-routed netlist, (3) Signal Integrity (SI) related violations (such as cross talk, delta-delays, etc.) are minimized, (4) congestion hotspots are eliminated or minimized, (5) timing goals are accomplished, specifically, the Quality Of Results (QOR) of the timing is sufficiently good (e.g., sufficiently high clock speeds are attained), and timing check violations (e.g., setup and hold violations, etc.) are eliminated, (6) goals are accomplished in the face of ever increasing manufacturing variations, specifically, manufacturing repeatability is maximized, which is a challenge particularly for smaller geometry processes, and/or (7) reliability-related sub-goals are accomplished (such as metal density is correct, antenna effects are eliminated/minimized, electromigration effects are minimized, etc.).

The various routing goals and constraints are often conflicting, and achieving a routing solution that eliminates all issues, and has fully achieved all goals, is often an intractable problem. The long list of often conflicting objectives is what makes routing extremely difficult. Due to the extremely high compute time to best meet these conflicting objectives, routers therefore seldom attempt to find an optimum result. Instead, almost all routing is based on heuristics which try to find a solution that is good enough.

As a result of these heuristics, many existing routers (1) create solutions that require more routing layers than actually needed, with the corresponding extra mask sets adding to the manufacturing cost, (2) create solutions with sub-optimal timing (or at least, less-optimal than would otherwise be attained should more precise models of resistance and capacitance and their impacts of timing have been available), (3) create routed designs that increase via count (and so resistance increases), (4) create more complex routing solutions than actually needed to minimize crosstalk, (5) create routed designs that are difficult to manufacture in terms of printability, increasing the burden on downstream OPC tools and (6) abandon a tentative routing solution as 'infeasible', when in fact it is feasible. All of these issues can negatively impact the time for the router to find a good enough solution, or can result in a solution with inadequate quality of results.

EDA tools often use a two-stage approach to make the solving of the complex combinatorial problem of routing more manageable. The two stages are global routing and detailed routing. Global routing first divides the area to be routed into relatively large tiles, and determines the tile-to-tile paths for all nets. During the determination of the tile-to-tile paths, the global router also seeks to optimize an objective function, such as a function related to total wire length, and circuit timing. After the global routing has identified the tile-to-tile paths, the detailed router typically performs the actual track and via assignment for the various nets in the tiles.

Figure 6:
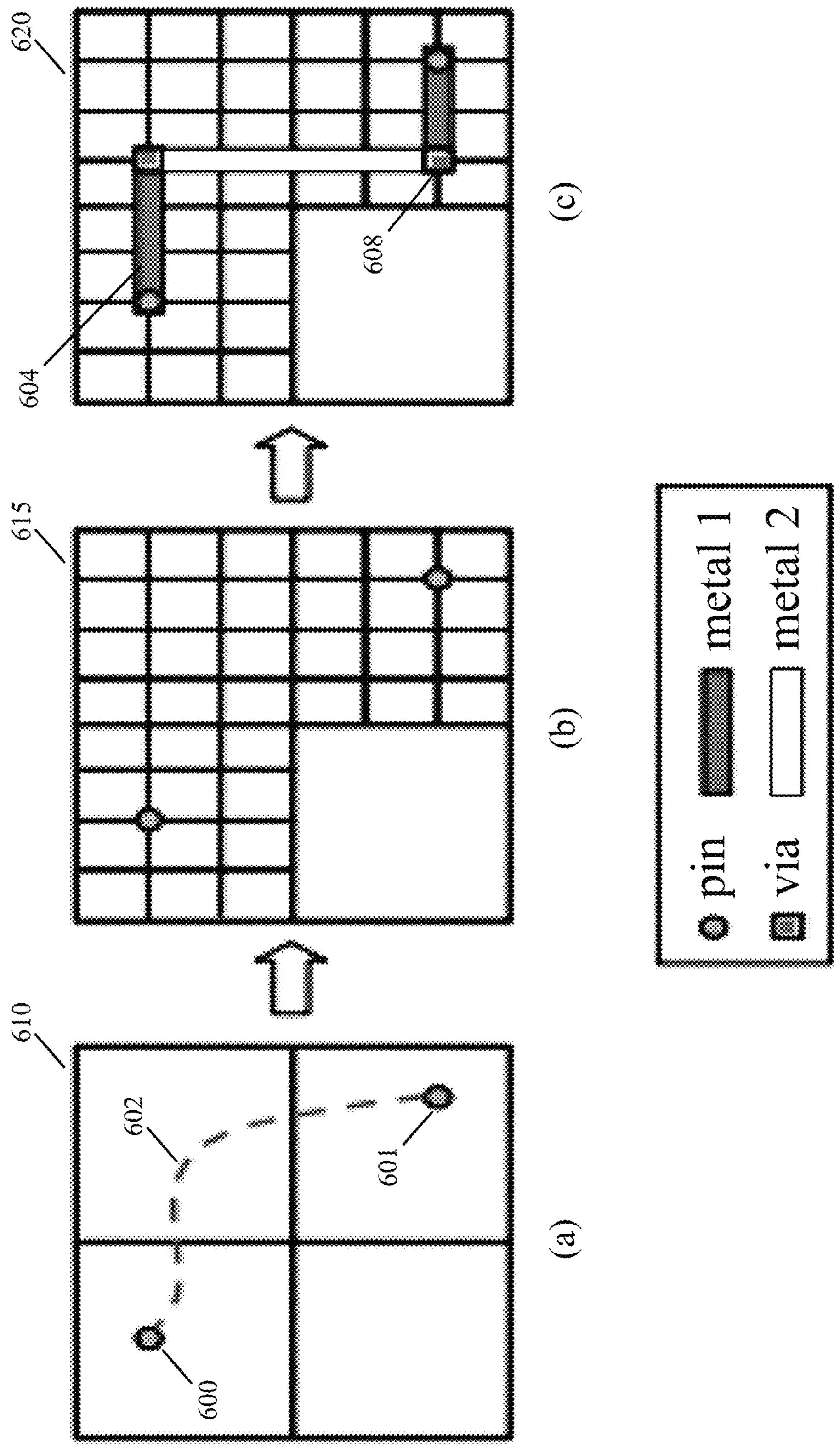
FIG. 6 illustrates an example of a global and (grid-based) detailed routing that routes a path between the two circular pins in some embodiments.

FIG. 6 illustrates an example of global and detailed routing that define first a global route and then a detailed route to connect two pins 600 and 601. This example is illustrated in three stages 610, 615, and 620. In the first stage 610, the routing area is first partitioned by the global router into four square cells such that the two pins are located in the top-left and bottom-right squares respectively. The global router produces the global route 602, in which the dashed line traverses the three cells involved in the routing solution (top-left, top-right, and bottom-right). The bottom-left cell is ignored by the global routing solution in this case.

The second and third stages 615 and 620 illustrate the detailed routing process. The second stage 615 shows the grid lines that the detailed router defines in the three cells that contain the identified global route 602. In the grid defined by these grid lines, the detailed router then defines the detailed route 604. As shown, this detailed route 604 has three segments that are assigned to the grid lines, which correspond to metal tracks on wiring layers. The darker segments run on the horizontally routed nth metal layer, while the lighter vertical segment run on the vertically routed metal n+1 layer, with vias 608 inserted at the appropriate transitions between the two layers.

For global and detailed routing problems that are expressed in terms of graph problems, a graph-searching technique is often applied to solve each problem. Popular graph-searching techniques include maze processes, line-search processes, and the A* search process. These processes are general-purpose as they are applied to both global routing and detailed routing, though specializations often apply. These graph based processes are often guided by congestion and timing information. This information in turn is associated with routing topologies and routing regions. In order to minimize congestion, and to balance net distribution among routing regions, routers assign larger costs to route nets through regions of high congestion. Modeling the routing resource as a graph, where the graph topology represents the chip structure, allows the graph-search technique to be deployed.

In global routing, the rectangular tiles that are used to divide the routed area (e.g., the chip) are called global routing tiles (or gCells), each of which accommodate dozens of routing tracks in each dimension. A node in the graph represents a tile or gCell on the chip, and edges represent the boundaries between two adjacent tiles/gCells. Each edge is assigned a capacity based on the physical area available for routing, or in more modern approaches, depending on the number of tracks in the tile.

Global routers find tile-to-tile paths for all nets on the global routing graph described above. These paths in turn guide the detailed routers. The overarching goal for the global router is to route as many nets as possible while meeting the capacity requirements of each global graph edge, along with any other constraints that are specified. For routers with a timing-driven focus, extra costs are typically added to the routing topologies which incur longer critical path delays. After global routing, detailed routers determine the actual physical interconnections of nets via the allocation of wiring on specific metal layers, and the use of between-layer vias to switch between these layers.

Two common layer models are used, which are often denoted reserved and unreserved layer models (also called preferred and non-preferred wiring direction models). In the former, each layer is only allowed to run, or strongly biased to run, in one specific routing direction (e.g., all wires in that layer must run horizontally, or all wires must run vertically). The direction is known as the preferred routing direction. In the unreserved model, wires are allowed to run in any direction, e.g., horizontally or vertically within the same layer, or in eight directions within the same layer. It is common in many routers to use the reserved model, i.e., preferred direction routing, due to its lower problem complexity, and its tendency towards improved manufacturability, e.g., due to semiconductor manufacturing, lithography systems often use specific light sources which are optimized for one direction or the other, but not both.

Two primary routing models have been used to date for detailed routing. These are gridless routing models and grid-based routing (also called shape-based routing). In the former, a grid is superimposed on the routing area, and routing paths within the grid are then found by the detailed router. The latter refers to any other kind of model, i.e., models that are not strictly grid based.

Figure 7:
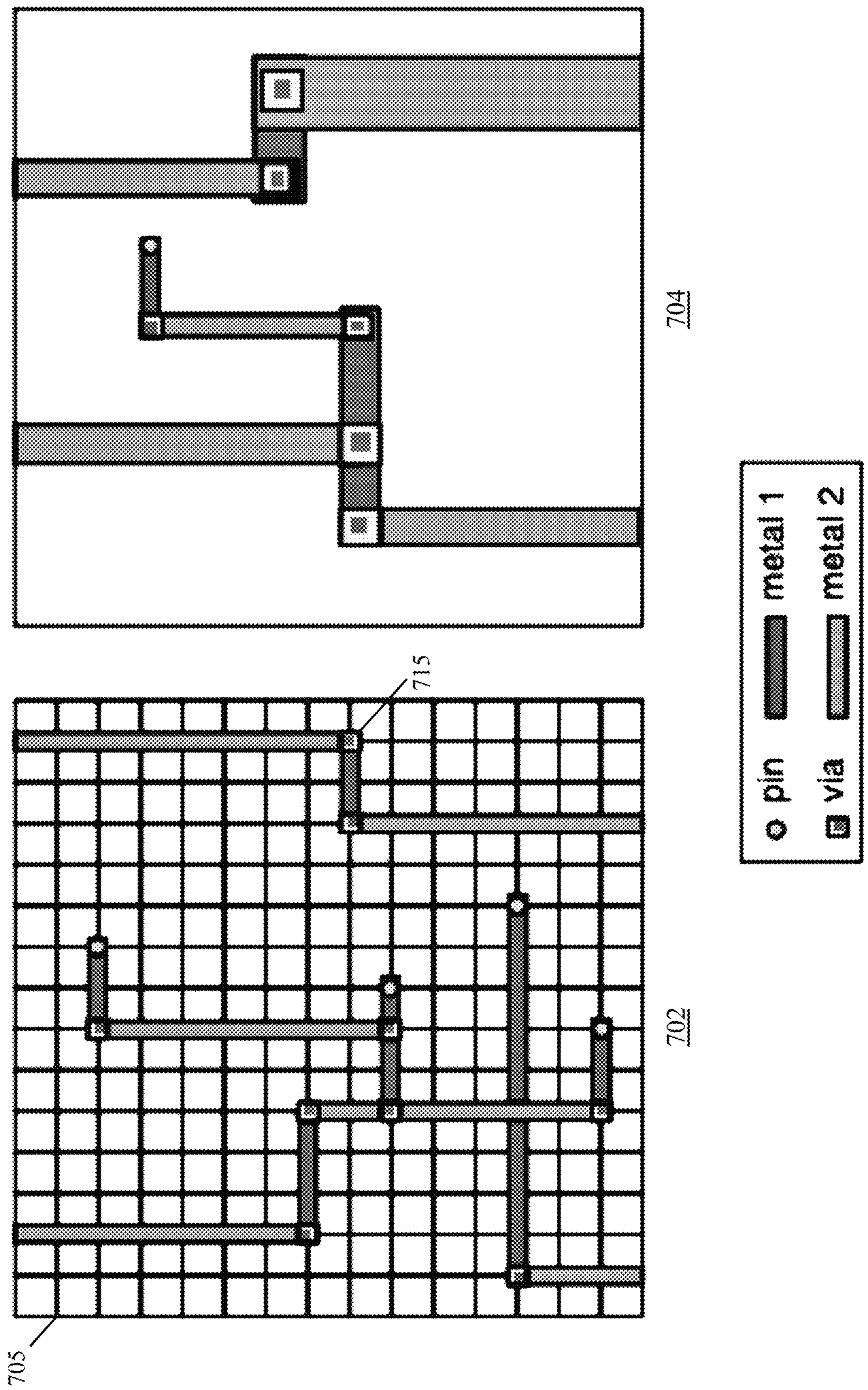
FIG. 7 illustrates examples of detailed routing that are grid-based or gridless in some embodiments.

FIG. 7 illustrates two examples that illustrate the grid-based and gridless models. In a gridded routing model 702, a routing grid 705 is superimposed on the routing area, and the detailed router is constrained to finding routing paths that adhere to that grid. In other words, grid-based routers superimpose a fixed grid on the routing area, finding routing points within, and only within, the grid. The space between adjacent lines on the grid is called the wire pitch. Wire pitches are defined in the technology file, and are greater than or equal to the combined minimum spacing and minimum width of the wires for the layer.

When the detailed grid-based router uses preferred direction wiring, the search space is constrained such that the wires on any layer run only in the preferred direction (e.g., horizontal or vertical direction) on that layer, or are strongly biased to run along the preferred direction. In this model, vias 715 that allow routes to change layer are performed at the intersection of the horizontal and vertical grid lines. Further, minimized-width wires that follow the legal paths in the grid usually satisfy the design rules by construction. In combination, this greatly reduces the search space compared to the gridless model, making grid-based routing models more computationally efficient, though at the cost of reduced flexibility.

Gridless routing model 704, on the other hand, does not have these grid enforcements. By not following a pre-defined routing grid, the gridless detailed routers allow different wire widths and different wire spacings, which in turn, provides greater flexibility in finding a routing solution. Because the wire widths and spacings are not as highly constrained as those of the grid-based router, the gridless router is more suitable for optimizing or tuning interconnects, e.g., by performing wire sizing and perturbation. However, due to the higher complexity, gridless routing models tend to have higher computational costs than grid-based models and are often slower than the grid-based approach.

Given a 'high level roadmap' produced by a global router, a detailed router has the task of identifying the exact tracks and vias to be used when routing nets. By limiting the detailed router to the tiles identified by the global router for each net, the overall search space can be drastically pruned and the overall routing time correspondingly reduced. For older process nodes, with large geometries and relatively few metal layers (e.g., 3 layers of metal only), wires are mostly routed in the free space between blocks. For example, for a standard cell based design, the routing is performed in spaces between the standard cell rows. For newer nodes, with smaller geometries and a relatively large number of metal layers (e.g., up to 11 metal layers for today's nanometer-scale processes), routing is done in the metal layers above the cells/blocks. This is known as over-the-cell routing. This approach is also used for full-chip routing.

Routing approaches need to meet various constraints in addition to merely completing the routing of a design. These constraints include two major types, which are performance constraints and design constraints. Performance constraints are to ensure the connections result in chip performance specifications provided by the designers. Circuit timing is typically the most important performance constraint, but power constraints and area constraints (the collective then referred to as PPA, or Performance, Power and Area) are also common.

Design rule constraints tend to relate to manufacturability, and are provided by the foundry rather than the chip designer. These constraints are often provided in the form of design rules, such as minimum wire width, minimum wire-to-wire spacing, or via-to-via spacing. Other common rules include overlap or extension rules, by which for example a wire end must overlap or extend beyond a via by some minimum amount.

Figure 8:
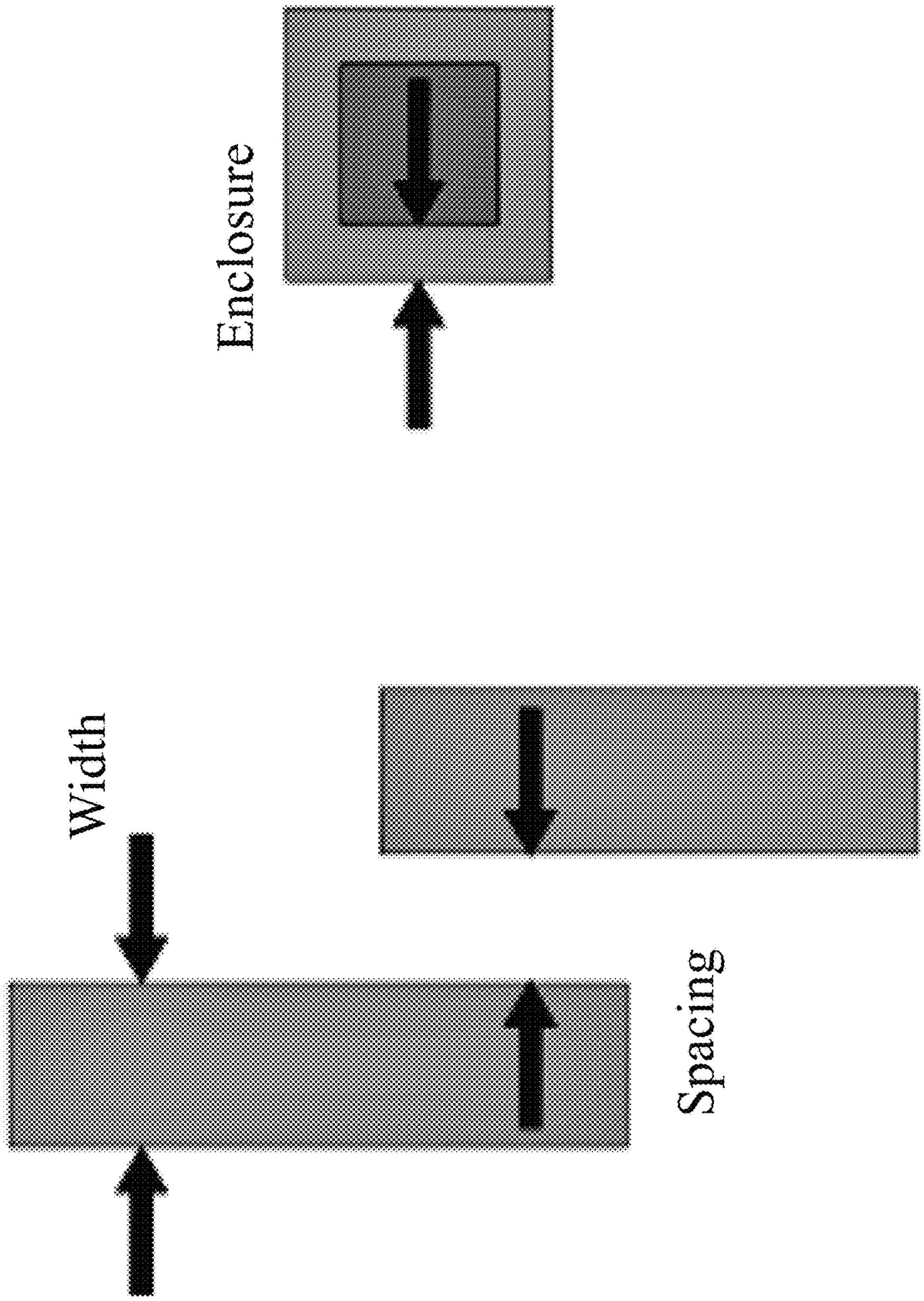
FIG. 8 illustrates examples of three design rules that are often checked are component width, component spacing and enclosure spacing.

FIG. 8 illustrates examples of three types of design rules that are often checked. These design rules are component width rule that specifies the minimum width of a component, a component spacing rule that specifies the minimum spacing between two components, and an enclosure spacing rule that specifies the minimum spacing for one object (e.g., one metal contact on one layer) to overlap another object (e.g., another metal object on another layer).

As mentioned above, routers often employ rip-up and reroute strategies. An initial net ordering is assumed and nets are ripped up and re-routed as needed to meet constraints. Some common net ordering schemes include (1) ordering the nets in ascending order based upon the number of pins within their bounding boxes (nets with larger pin counts tend to block other nets within this bounding box), (2) for timing performance-driven routers, ordering the nets in descending order of their lengths (longer nets should be routed first for high performance designs, as they typically dominate the overall timing), (3) for routability-driven routers (find a routing solution at all costs), ordering the nets in ascending order of their lengths (routing shorter nets first leads to better results, as these nets tend to have less flexibility than those for longer nets), and (4) ordering the nets in terms of their timing criticality. In some cases, nets in congested regions are often routed before nets in less congested regions.

Rip-up and reroute include identifying bottleneck areas and ripping up some of the nets which have already been routed, routing the nets which have previously been blocked and then rerouting the ripped up connections. Rip-up and reroute is often an iterative process, running until all nets are successfully re-routed or a time limit/iteration count is exceeded, and often leads to improved routing solutions.

For newer nodes, with small geometries and a relatively large number of metal layers (e.g., up to 11 metal layers for today's nanometer-scale processes), routing is done 'over-the-cell' in the metal layers above the cells/block. The full chip routing problem is very complex and represents a large combinatorial problem. To increase tractability, various divide-and-conquer approaches are used. As mentioned above, one divide-and-conquer approach is the two stage technique of first running a global router to arrive at a very coarse routing using gCells, which is then refined via a detailed router (within one or multiple gCells). In order to gain even more tractability on larger problems however, it is commonplace to transform the problem into smaller problems which are then divided into even smaller sub-problems. The router then proceeds in a top-down manner, a bottom-up manner, or a hybrid manner (combining both approaches). At each problem level, the nets can be routed sequentially or concurrently (e.g., by using a solver).

Figure 9:
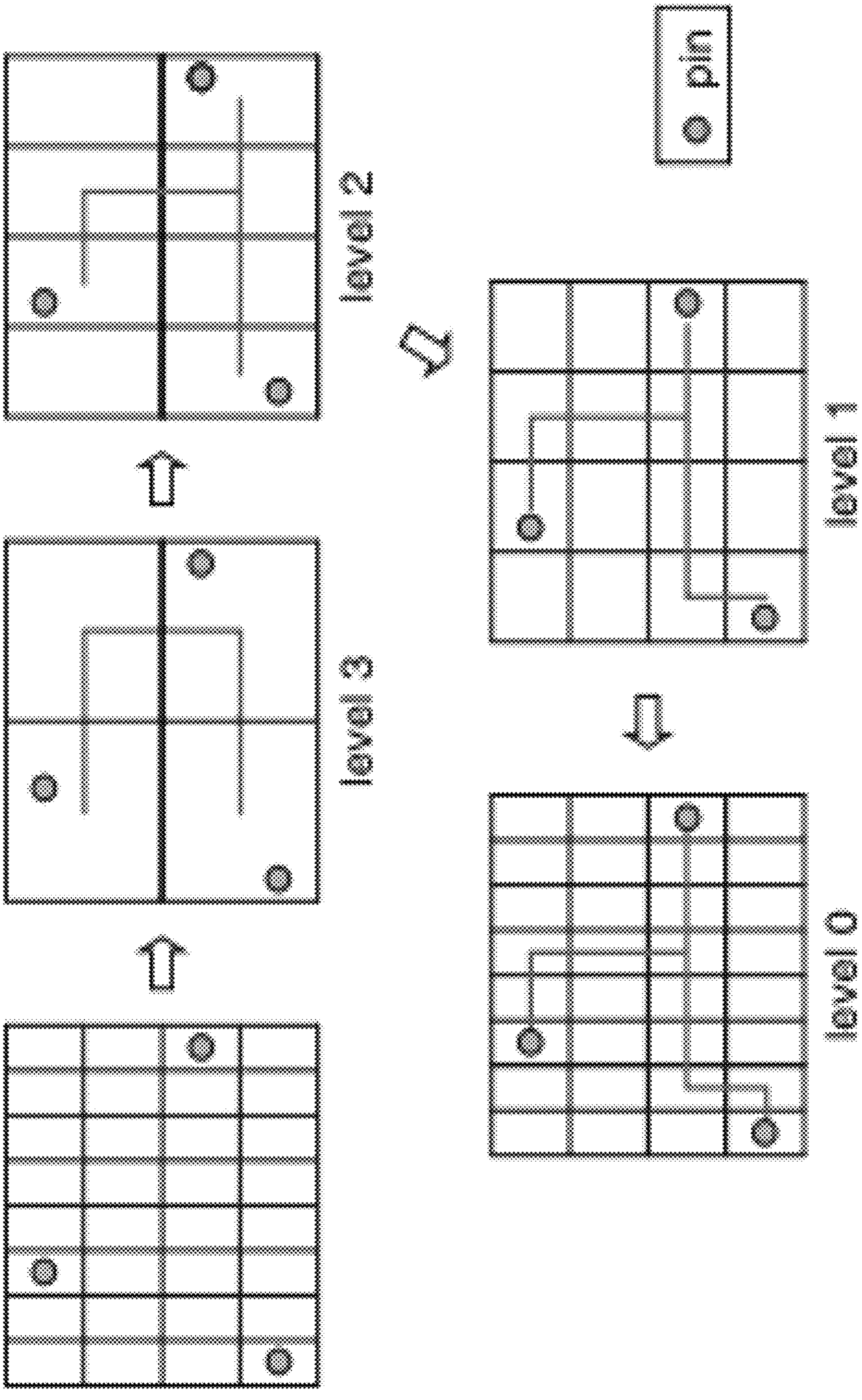
FIG. 9 illustrates an example of a top-down manner, a level by level approach for routing a 3-pin net.

FIG. 9 illustrates an example of a top-down manner, a level by level approach for routing a 3-pin net. In this example, four successive grids are used for four successive levels, starting with level 3 and ending with level 0. Each of the higher levels uses a coarser grid than the levels below it. At each higher level, a coarser route is defined by reference to the coarser grid of that level, until the route for level 0 is defined. At each particular level 2, 1, or 0, the route that is defined respectively for level 3, 2, or 1 is used as the starting input to define the route at that particular level.

Figure 10:
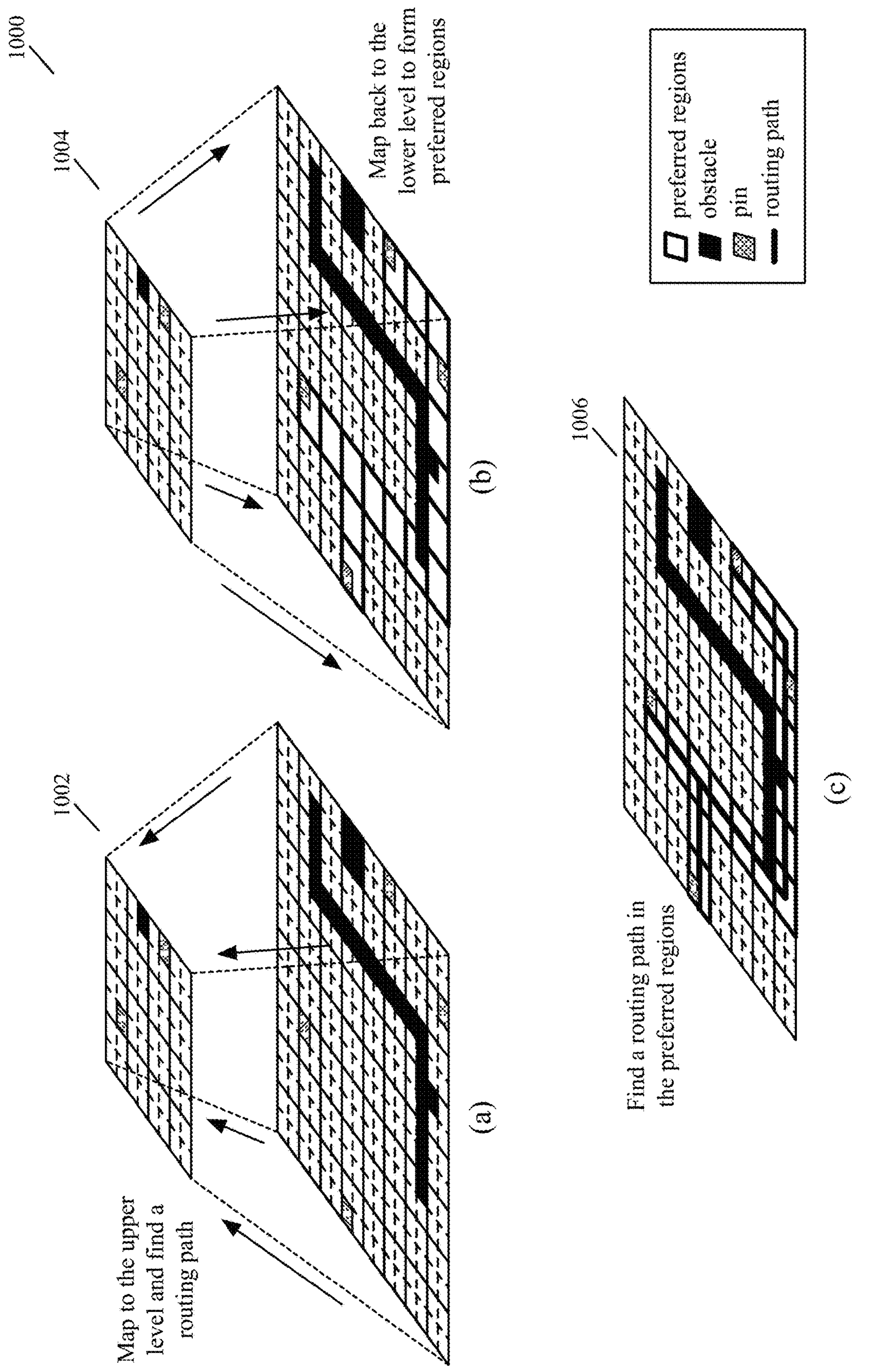
FIG. 10 illustrates an example of a hybrid hierarchical approach to routing.

A limitation of this hierarchical approach is that the routing decisions made at a given hierarchical level are not always optimal for subsequent levels. Therefore, in a hybrid approach that combines bounded maze-routing processes with both top-down and bottom-up approaches alleviates this problem. FIG. 10 illustrates an example of a hybrid hierarchical approach 1000 to routing. This approach (1) maps at 1002 pins and blockages up one level (lower resolution grid) to find a path at the upper level, (2) maps at 1004 the upper level connections back down to the lower level (higher resolution grid) to form preferred regions, and (3) finds at 1006 a solution within the preferred regions on the lower level.

The approach has three-phases including neighboring propagation, preference partitioning, and bounded routing. The first phase attempts to perform a wave propagation from each pin using a bounded maze routing process to propagate W circles of waves, where W is a user-defined parameter. If that fails, the second phase recursively maps the pins and routing blockage/obstruction areas onto the next adjacent upper level, i.e., a lower-resolution grid, repeating the recursive operation until a solution path is determined. The resulting low-resolution path is then mapped back onto the high-resolution grid in the third phase, forming preferred regions and those preferred regions are used to constrain the search space in the determination of the final routing path.

Some embodiments combine the hierarchical approach with a convolutional neural network in the first phase, i.e. for failed nets, to map (e.g., at 1002) the pins and blockages up one level to a lower resolution grid, and then use the CNN for finding a path at that upper level. Here, the convolutional neural network is used to solve the higher level routing problem, the solution of which is then mapped down to form the preferred regions for the lower level. In some such embodiments, the neural network only knows about the upper level problem, but does not know much or anything about the lower level problem.

In other embodiments, the CNN is used at the lower and higher levels, e.g., the network performs both the higher level mapping, route solving, and re-mapping back to the lower level as preferred areas. Under this approach, the CNN is aware of one or both hierarchical levels, and also does one or both of the up/down mapping operations.

Some embodiments use deep reinforcement learning in lieu of the maze routing or other traditional routing approaches at any of the hierarchical levels. In some embodiments, a deep reinforcement agent is used to route each net sequentially, or a 'team' of deep reinforcement agents are used to route nets concurrently, following the Multiple-Agent Reinforcement Learning (MARL) paradigm.

During the routing of the lowermost hierarchical levels (within the preferred areas), DRL is used in combination with a front-to-back digital twin in some embodiments. In some embodiments, a digital twin MTN is used within the reward function for the reinforcement learning, taking the actual manufactured contours that correspond to as-routed candidate solutions into account, and penalizing those which will manufacture poorly. The penalty component as part of the reward function will serve to guide the agent to produce final lowest-level routing solutions that provide the most manufacturability.

Figure 11:
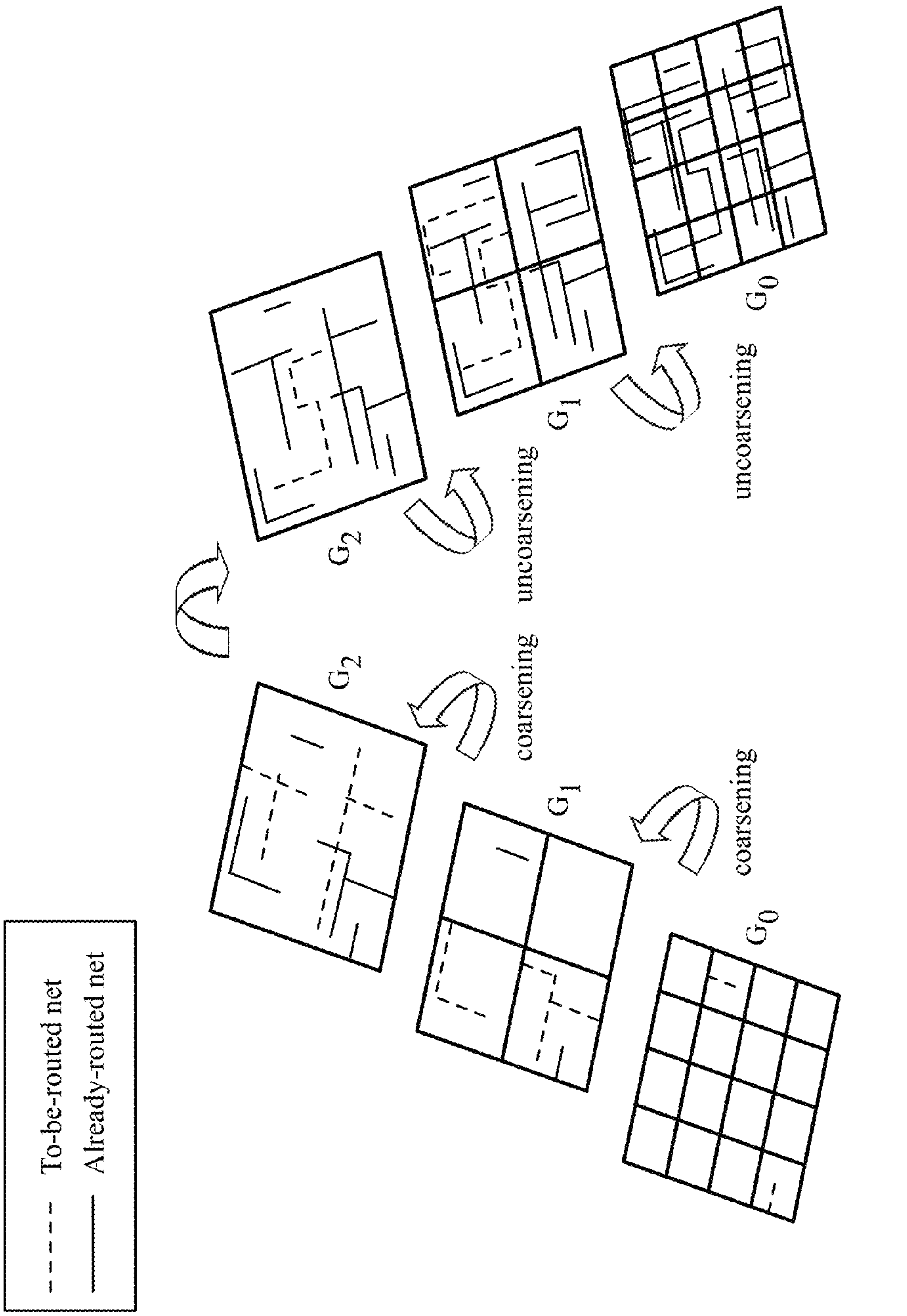
FIG. 11 illustrates an example of another common multi-level approach known as A-shaped (Gamma) multi-level routing.

FIG. 11 illustrates an example of another common multi-level approach known as Λ-shaped (Gamma) multi-level routing. As shown, the routing area is divided into an array of rectangular subregions, known as global cells. Each global cell contains dozens of routing tracks in each dimension. A node in the routing graph corresponds to a global cell, and an edge represents the boundary between two cells. Each edge is assigned a capacity. The approach is repeated at multiple hierarchical levels (e.g., the lowest level is G0, the level above that is G1, then G2, etc.). Routing then has a bottom-up coarsening, followed by a top-down un-coarsening or refinement. Coarsening is a bottom-up approach that iteratively groups a number of global cells, starting from the finest (bottom) level, and merging 4 adjacent global cells into a 'coarser' cell at the next level up. Resource estimation is then performed for the coarser cell at that next level up.

The coarsening process repeats this operation in an iterative, upward direction until the number of cells at the top level is less than some minimum threshold. Un-coarsening proceeds in the opposite direction, again in an iterative manner. This time, starting from the top, a global cell is decomposed into 4 smaller cells at the level below, each of which is further decomposed into 4 smaller cells at the level below that, etc. The process continues until the 'bottom' is reached, i.e., the finest level of granularity is reached.

The process first applies a minimum spanning tree (MST) process to decompose each net into 2-pin connections. Global routing is first performed for the local 2-pin connections at each level of the coarsening stage, and then the detailed router is used to determine the exact wiring. Local 2-pin connections are those that sit entirely within the global cell at a given level. Non-local connections (that span multiple global cells at a given hierarchical level) are deferred until a higher hierarchical level is reached.

During the detailed routing, a cost function is used to control the congestion, and the global routing process always searches for the shortest global routing path between two pins in order to minimize the wire length. After the global routing is completed for a given hierarchical level, a detailed routing step is applied for the same level. In this step, the process simultaneously minimizes path length and via count, e.g., by using a maze-routing process. This process finds the shortest path with the minimum number of wire bends and vias, usually with an emphasis on the via count due to the high resistance of vias. Since the global and detailed routing steps are effectively combined together at each hierarchical level, along with resource estimation, the resulting resource estimation is more accurate. This facilitates refinement of the routing solution using rip-up and reroute during the subsequent refinement/un-coarsening stage.

For the gamma multi-level routing approach of FIG. 11, some embodiments use a CNN to replace the maze routing process at any given hierarchical level. Other embodiments use CNNs to replace maze routing at some hierarchical levels, while continuing to use the maze routing processes at the other levels. Some embodiments use deep reinforcement learning to replace the maze routing process at any given hierarchical level. Other embodiments use deep reinforcement learning to replace maze routing at some hierarchical levels, while continuing to use the maze routing processes at the other levels.

Some embodiments use both CNNs to perform the routing (via image-to-image translation), and deep reinforcement learning, in conjunction with, or to replace, any of the maze routing steps at any of the hierarchical level. Further, the introduction of the front-to-back digital twin (which understands the exact shapes that can be manufactured) is used to perform manufacturability-aware routing at any level, but particularly at the lowest level G0. For the deep reinforcement learning cases, some embodiments incorporate the front-to-back digital twin into the reward function.

While track and layer assignments are often performed by the detailed router after the global router has finished, this is not always the case. For example, some have proposed a global router that performs delay-driven layer assignment under a multi-tier interconnect structure, considering the fact that higher layers of metal lead to fatter wires with smaller resistance. A two-stage process first minimizes the total wire delay, and via count simultaneously by a dynamic programming and negotiation technique, and then further minimizes the maximum delay carefully while not increasing the via count.

This approach reduces the total delay and maximum delay while keeping roughly the same via count, compared with state-of-the-art via-count-minimization methods. The approach also benefits from the observation that thicker interconnects on higher layers lead to lower resistance/fatter wires, which has a large impact on the interconnect delay, and so the delays incurred by layer assignment need to be carefully considered. The approach transforms a 2-D global routing problem solution into a 3-D multi-layer solution in which delays and via count are minimized, subject to wire congestion constraints.

Figure 12:
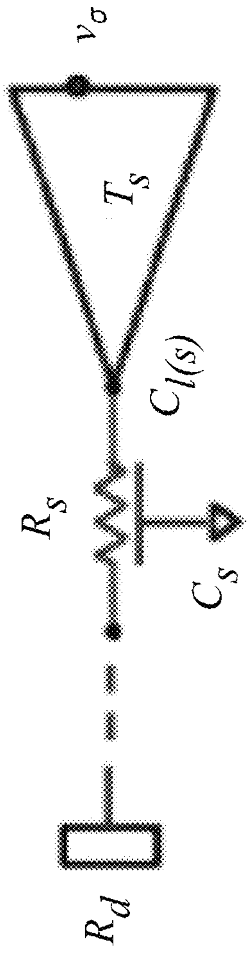
FIG. 12 illustrates an example of a contribution of a RC segment to Elmore delay at a sink.

For such an approach, resistances and capacitances of the metal wires and vias are accounted for by using a 3-D RC model. FIG. 12 illustrates one manner of accounting for the contribution of RC segment by computing an Elmore delay at a sink. As shown, the distributed Elmore delay model is adopted to estimate the interconnect delay, such that the delay of a net T is a weighted sum of the segment resistance $R_s$ times half the segment self-capacitance $C_s$ plus the load capacitance $C_1$. A first stage uses a layer assignment process for simultaneous delay and via count minimization (SDLA), which is based on a dynamic programming technique, in order to find a 3-D layer assignment of a 2-D routed net, such that the minimum total cost of the delay, via account and wire congestion is minimized.

The second stage further minimizes the maximum delay while not increasing the via count. Below is the pseudo code for a process that implements the second stage.

```
initialize PriorityQueue Q by nets' delay and set Flag←true
while Flag do
  get net T with maximum delay D_T in Q and its 3D path P_T
  rip-up-and-re-assign T by SDLA with large λ and without consideration of the wire
    congestion, get the new delay D'_T
  if D'_T ≥ D_T then recover old path P_T to T and break end if
  traverse the new path of T and get the candidate net set S
  foreach net T1 ∈ S in the decreased order of net delay do
    backup old path P_T1 of T1
    rip-up-and-re-assign T1 by SDLA with large λ under the wire congestion
    constraint, get the new delay D'_T1
    if D'_T1 ≥ D_T then
      recover old path P_T1 to T1
        rip-up-and-re-assign T by SDLA with large λ under the wire congestion
        constraint, get the new delay D"_T
      if D"_T ≥ D_T then Flag←false end if
      break
    end if
  end foreach
  update Q by T and T1's with corresponding new delays
end while
```

The performance of the above-described processes are dependent on the accuracy of the segment delays. Segment delays are dependent on the values of the segment resistances $R_s$ and capacitances $C_s$, which in turn depend on the actual shapes as manufactured. Hence, to compute accurate resistance, capacitance and delay computations, some embodiments use the digital twin neural network to produce the predicted curvilinear manufactured shapes, such as the shapes illustrated in the above-described FIG. 2.

U.S. Patent Publication 20220128899, U.S. patent application Ser. No. 17/992,870, U.S. patent application Ser. No. 18/097,272, and U.S. patent application Ser. No. 17/992,897 describe how some embodiments use convolutional neural networks (CNNs) as digital twin processes that produce the predicted manufactured shapes under process variations. The CNNs that are described in these applications are both accurate and fast due to the ability of the CNNs to leverage the computational resources of devices such as Graphics Processing Units (GPUs) or Tensor Processing Units (TPUs), etc. To produce the predicted manufactured shapes, these CNNs are trained with output shapes that are manufactured on ICs from input IC design layout shapes in some embodiments. In other embodiments, the CNNs are trained with output shapes that are produced by wafer simulation processes from input IC design layout shapes, as described above by reference to FIG. 4. Such differing training techniques are further described in the above-incorporated applications.

By using the manufactured shapes and their precise tolerances, some embodiments compute extremely accurate parasitics $R_s$ and $C_s$ for the wire network. Some of these embodiments compute the parasitics accurately via a 3-D electromagnetic solver, while other embodiments use a second digital twin (in place of slower solvers) to rapidly calculate the parasitics. U.S. Patent Publication 20230027655 describes these two differing techniques for computing parasitics. U.S. Patent Publication 20230027655 is incorporated herein by reference.

Some embodiments use the more accurate resistance and capacitance values that are produced in conjunction with digital twins, or by digital twins, to estimate the interconnect delay (e.g., through the use of these values in distributed Elmore models) during routing. In some embodiments, the interconnect delay is used within a process that simultaneously minimizes delay and via count. This process in some embodiments is used to perform delay-driven layer assignment in global routing, e.g., under multi-connect interconnect structures. In some embodiments, the use of the more accurate parasitics leads to routes being assigned to different layers, which can have drastically different electrical characteristics, and thereby have a large positive impact on the quality of results of the routing solution.

Some embodiments also use digital twins to quickly and accurately predict parasitics and then produce more accurate interconnect delays (e.g., Elmore delays) based on these parasitics, in order to improve the performance of a process that minimizes the maximum delay. The processes cited are exemplary, and not intended to be limiting. It will be appreciated by those of ordinary skill that other processes are used in addition to, or in place of, the processes described here, to improve layer assignments during routing, based on the use of digital twins for improved parasitic estimates.

As device geometries have shrunk in modern processes, wire heights have grown taller, and the spacings between wires have decreased, thereby increasing coupling capacitance between wires. The coupling capacitance now exceeds self-capacitance and forms a substantial portion of the total capacitance. The increased capacitive coupling between wires has in turn become a key issue for signal integrity in terms of creating unwanted crosstalk. Signal integrity noise comes in two flavors. One introduces a malfunction in a chip, inverting the logic values of gates, and the other presents itself as timing changes.

Figure 13:
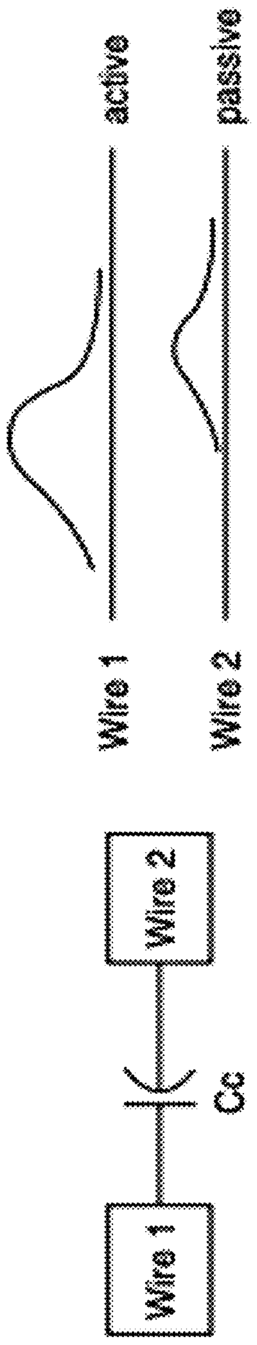
FIG. 13 illustrates an example of a crosstalk effect, a main source of noise.

FIG. 13 illustrates an example of a crosstalk effect, a main source of noise. As shown, a pulse on an active Wire 1 induces a smaller pulse on the passive Wire 2, which is capacitively coupled to wire 1 via coupling capacitance Cc. The bigger the coupling, the bigger the effect on the passive net (also called the victim net). Crosstalk is mostly related to coupling capacitance on same-layer nets. Crosstalk is proportional to the coupling of two wires on the same layer. This coupling is determined by the relative positions of the wires. Coupling capacitance between two perpendicular wires is minimal, while coupling capacitance between two parallel, closely spaced wires can be quite large. Crossover and crossunder capacitances to the wires on the interconnect layers above and below are also small in comparison to the lateral coupling on the same-layer wires. Coupling between two parallel same-layer wires is proportional to the overlapping interconnect length, and inversely proportional (though in a non-linear manner) to the distance between them, increasing significantly as the distance gets too close. Crosstalk-aware routers therefore have to minimize the overlapping run length between closely adjacent wires or ensure that wires which must run in parallel are sufficiently spaced apart (e.g., not on adjacent tracks).

Figure 14:
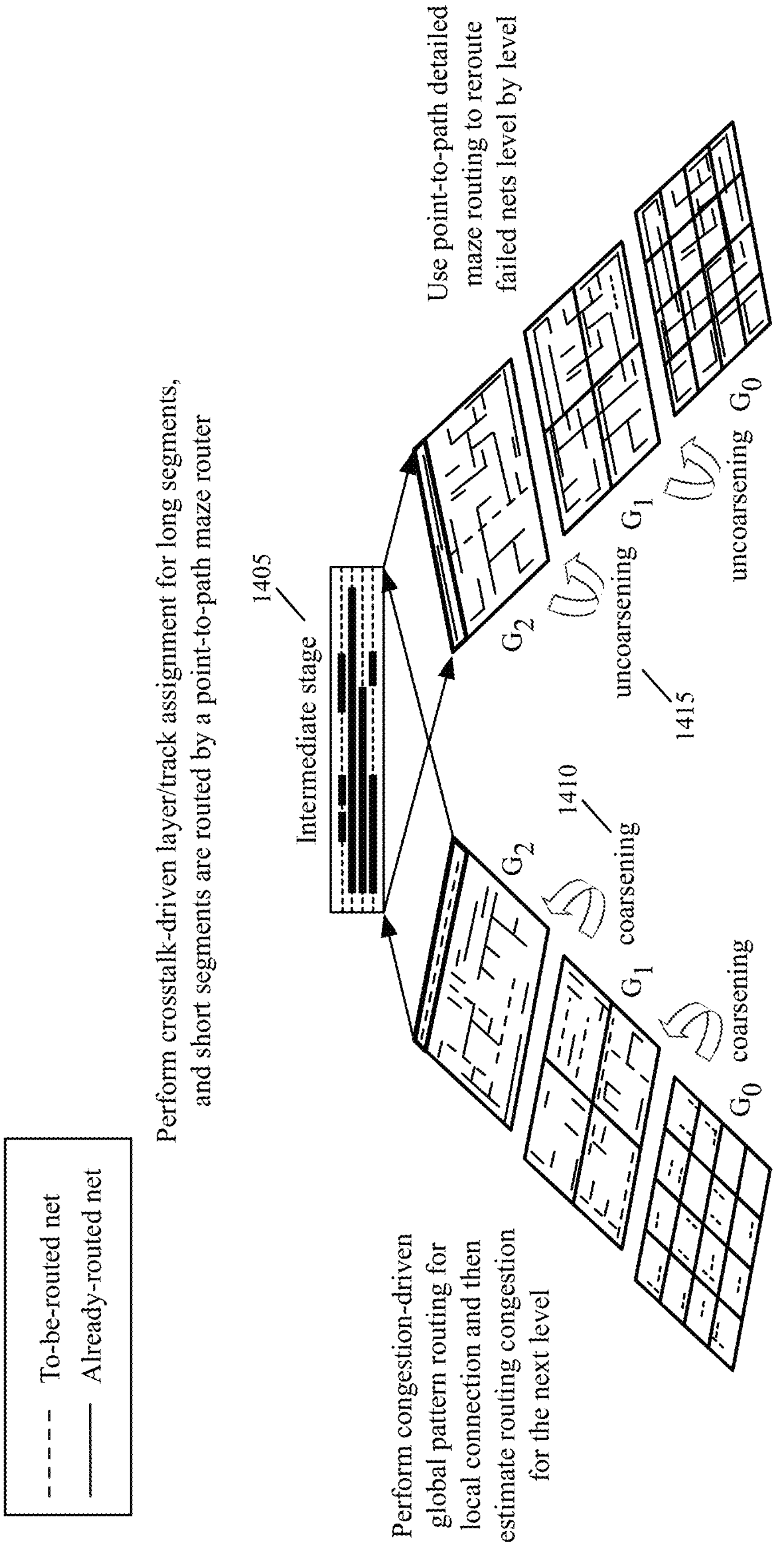
FIG. 14 illustrates an example of an intermediate stage in A-shaped (Gamma) multi-level routing to minimize crosstalk.

FIG. 14 illustrates an example of an intermediate stage in A-shaped (Gamma) multi-level routing that minimizes crosstalk. In this routing, a layer/track assignment heuristic is used to minimize crosstalk in the intermediate stage of the A-shaped (Gamma) multi-level routing. Layers/tracks are assigned at an intermediate stage 1405 between the last coarsening step 1410 and the first un-coarsening step 1415 of the multilevel framework. Long interconnect segments are carefully assigned to layers/tracks in the intermediate stage 1405, so as to attempt to minimize parallel run length on adjacent tracks, and so minimize crosstalk.

Figure 15:
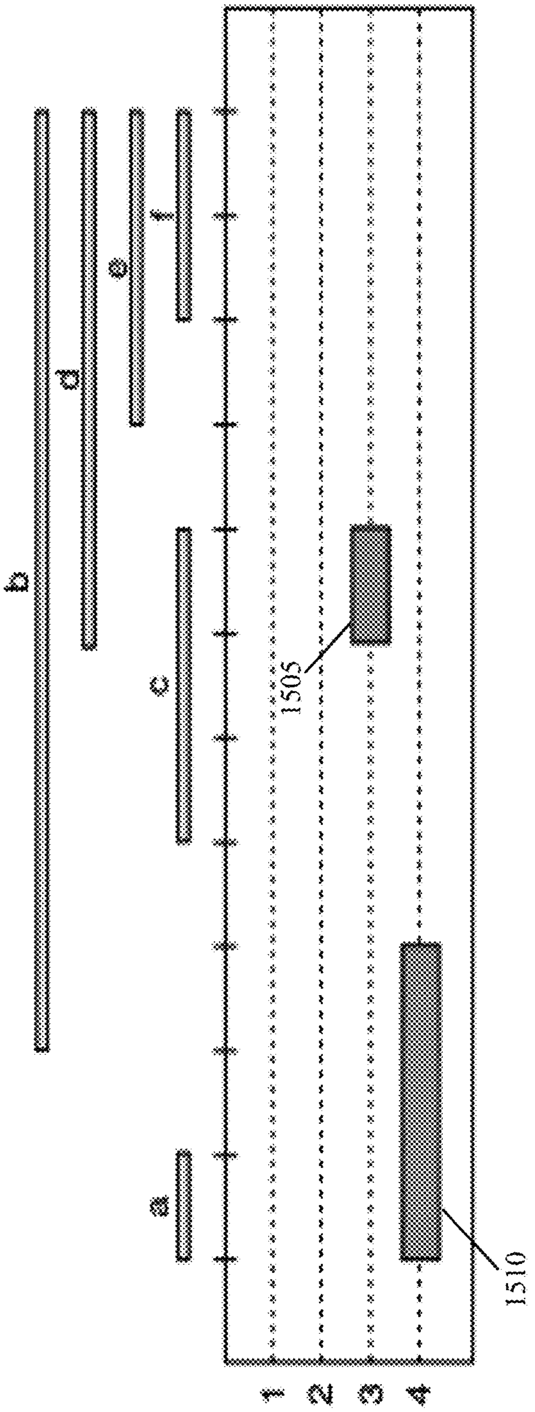
FIG. 15 illustrates an example of a track assignment problem for crosstalk minimization.
Figure 16:
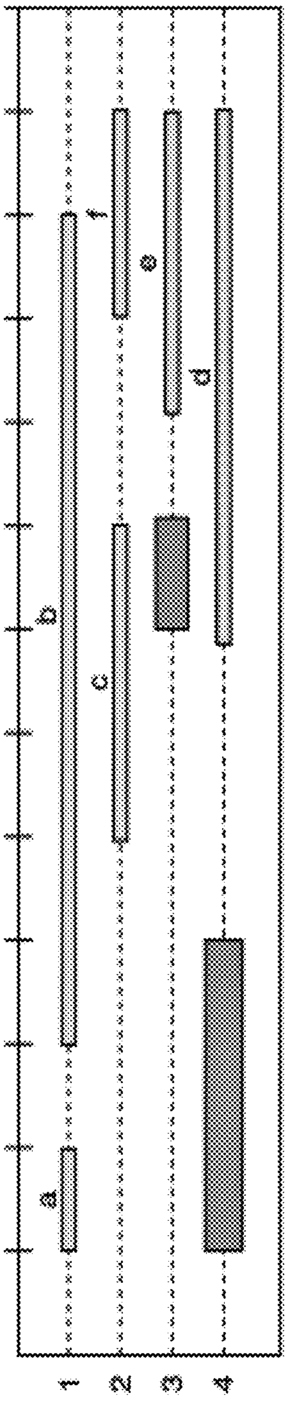
FIG. 16 illustrates an example of a potential solution to a crosstalk-aware track assignment problem.

FIG. 15 illustrates an example of a track assignment problem for crosstalk minimization in which 6 wire segments a-f are to be assigned to tracks 1-4, in the presence of some blockages 1505 and 1510. The goal is to assign the 6 net segments to the different tracks, while minimizing the parallel run lengths for the segments on adjacent tracks. FIG. 16 illustrates an example of a potential solution to a crosstalk-aware track assignment problem. As shown, the longest wire segment 'b' has been assigned to the first track, which also has room for the short segment 'a'. Medium-short segments 'c' and 'f' have been assigned to the second track in such a way that the parallel run length between both of them and segment 'b' is reasonably small. The second longest segment 'd' is assigned to the furthest away track (track 4) from the track containing the longest segment 'b'. Segments 'c' and e' are similar in length and can be interchanged.

Typical crosstalk-aware track assignment processes assume that the wires will be manufactured as perfect rectangles and do not factor in variations in the spacing, wire bulging, pinching or other effects related to fine-geometry lithography, even in the presence of OPC/ILT. These non-idealities in wire manufacturing of course have an impact on the coupling capacitance. Accordingly, some embodiments use a digital twin MTN to generate the predicted manufactured shapes, and then use these shapes to identify the crosstalk-minimization track assignment solution.

With the knowledge of the expected manufactured shapes, the actual coupling capacitance between the shapes is more accurately determined rather than simply estimated from a simple capacitance model assuming wires are manufactured in perfect rectilinear form as produced by the design layout tool. This more accurate determination can then be used to fine tune the track assignment results. In other words, by using digital twins, some embodiments consider other combinations than the one described above. For example, after using digital twin CNN to produce the expected manufactured shapes, some embodiments would explore a combination where wires 'c' and e' are interchanged, or a combination where wire 'c' is moved further to the left or right, to avoid the impact of the blockage on its manufactured contours and hence its coupling capacitance to wire 'b'. Even a small change in placement/track assignment in some embodiments result in a significant difference to coupling capacitance (and hence crosstalk) for particularly sensitive nets. The accurate capacitance values in some embodiments are therefore used in more intelligent decision making.

One way to determine the more accurate coupling capacitance is to run an EM solver on the predicted manufactured shape contours produced by the digital twin MTN, particularly those for the outer contour corresponding to one manufacturing process parameter extreme. This however, can be too slow to be used for routing operations in some cases. Accordingly, some embodiments use a faster way of computing the coupling capacitance by using a digital twin neural network that extracts coupling-capacitance extraction instead of the solver. In some such embodiments, one digital twin MTN produces the predicted manufactured shapes while a second digital twin MTN computes the curvilinear coupling capacitances. Under this approach, the intermediate curvilinear as-manufactured shapes are explicitly inferred and considered during the capacitance computation operation of the second digital twin.

The curvilinear coupling-capacitance extraction digital twin is trained with images corresponding to known manufactured curvilinear shapes as input samples and these input shapes' corresponding coupling capacitance as output samples. To generate these input/output sample pairs (i.e., the training data), some embodiments use a field solver that receives curvilinear-shaped 3-D conductor input structures (i.e., each input sample) and that produces corresponding capacitive coupling output samples for each received input structure. For each input structure, the field solver produces the coupling capacitance output by solving the electromagnetic equations for the input structure. In this case, at capacitance-inference time, the front-to-back digital twin is first used to explicitly compute the predicted manufactured wire shape images, and then these are directly consumed by a second network which computes the capacitance values.

In other embodiments, the two networks (i.e., the network that produces the predicted manufactured shapes and the one that computes the capacitive coupling for the shape) are combined into a single network. In some of these embodiments, the input to this single network includes a raster image of the routing solution (e.g., the rectilinear track assignment candidate solution) and its neighboring structures, and the output comprises the corresponding parasitic values (e.g., parasitic capacitance values) for the corresponding parasitic coupling on the routing solution from its neighboring structures.

The predicted manufactured wire contours are not explicitly computed, but rather implicitly computed in some abstract form within the model. Such a model would be trained by generating the data in two stages. First, the front-to-back digital twin is used to explicitly compute the images containing the predicted manufactured wire shapes pertaining to a track assignment candidate solution, and then an EM solver (or curvilinear parasitic extraction digital twin) is used to consume those images and produce the capacitance values. The initial image pertaining to a track assignment candidate solution and the final capacitance values are then used as a known input/output pair to directly train the network, along with many other input/output pairs that are similarly generated.

In some embodiments, the front-to-back and/or capacitance-extraction digital twins is used in the reward function of a RL (reinforcement learning) approach to detailed routing. By incorporating either or both of these digital twins into the reward computations for a DRL (deep reinforcement learning) approach to detailed routing, the DRL agent in some embodiments are crosstalk-aware and guided to produce detailed routing solutions that minimize crosstalk. DRL approaches are further described below.

In some embodiments, a parasitic extraction digital twin predicts, very quickly, and with a high degree of accuracy, values for the parasitic elements associated with semiconductor interconnect. Further, in some embodiments, it predicts these parasitic values reflective of manufacturing process variations, including nominal case, best case and worst case values. Examples of parasitic values include capacitance and resistance. In some embodiments, the parasitic extraction digital twin is implemented in the form of a neural network.

In some embodiments, the parasitic extracting MTN accepts multiple inputs (or a single input with multiple layers, analogous to RGB layers in a color image), and outputs one or more parasitic values. The inputs correspond to rasterized images associated with different semiconductor layers, e.g., different metal layers, via layers, or some combination. The outputs correspond to parasitic values, e.g., capacitance values, associated with the different conductor shapes represented in the input images.

Figure 17:
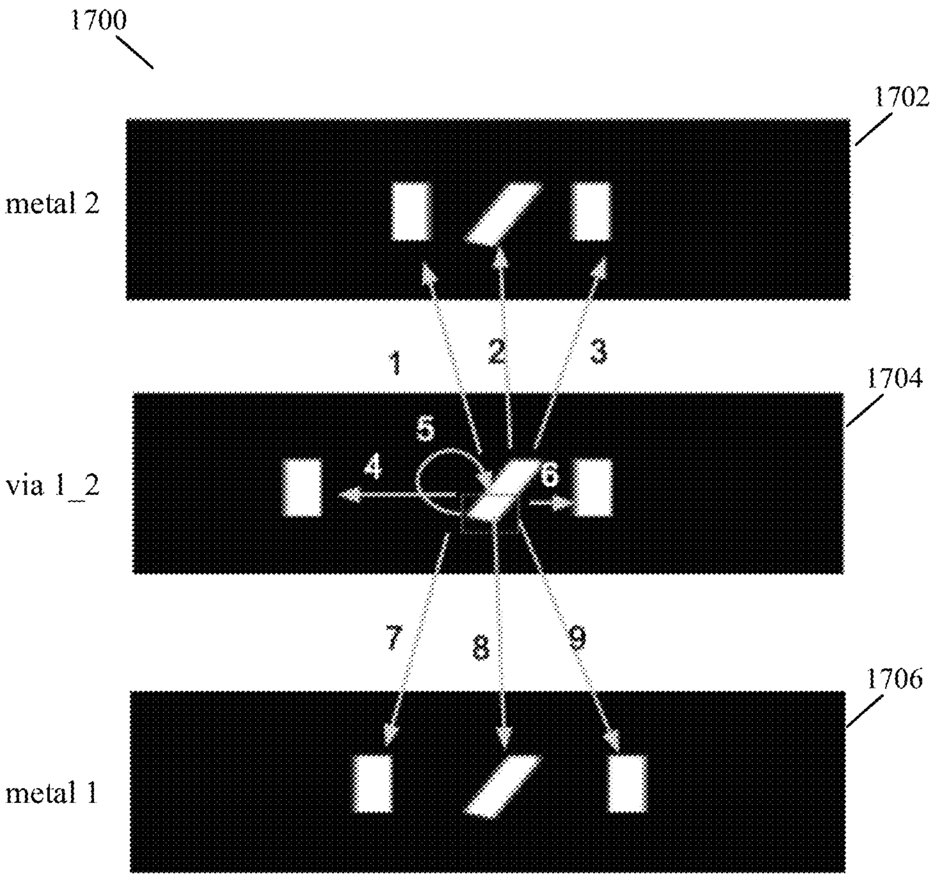
FIG. 17 illustrates an example of a capacitance matrix between a shape and other shapes, in which three semiconductor layers are represented.

FIG. 17 illustrates an example of a capacitance matrix between a shape (middle, middle) and other shapes, in which three semiconductor layers (metal 1, via 1_2, and metal 2) are represented. Each figure contains three (white colored) shapes, assumed to be three different electrical semiconductors. Nine different electrical semiconductors are present. The metal 2 layer 1702, contains three closely-spaced (white colored) shapes, two of which are rectangular (left, right), and one of which is a diagonal. The via 1_2 layer 1704 also contains three shapes. The leftmost of these, however, is spaced fairly distantly from the middle one, whereas the rightmost is again spaced fairly closely to the middle one. The left and right shapes on the via layer are rectangular, and the middle shape is a diagonal shape.

On the bottom 'metal 1' layer 1706, there are again three shapes, with medium spacing. On this layer, there are also two rectangular shapes and a diagonal shape in the center. Each of these white shapes represents some semiconductor material on a semiconductor wafer layer. White color pixels indicate where semiconductor material (e.g., metal) is present, and black color pixels indicate where the semiconductor material is absent.

The capacitance matrix 1700 includes nine numbered arrows (1 through 9), and the capacitance table 1705 on the right contains some labels (e.g., left, middle, etc.) corresponding to these arrows. The capacitance table 1705 represents nine key capacitance values of interest, all of which involve the middle shape on the via layer 1704 (i.e., the diagonal shape on the middle 'via_1_2' layer 1704, from which all arrows emanate), to all nine semiconductor shapes (one arrow (5) of which represents a self-capacitance, from the (middle, middle) diagonal shape to itself).

Figure 18:
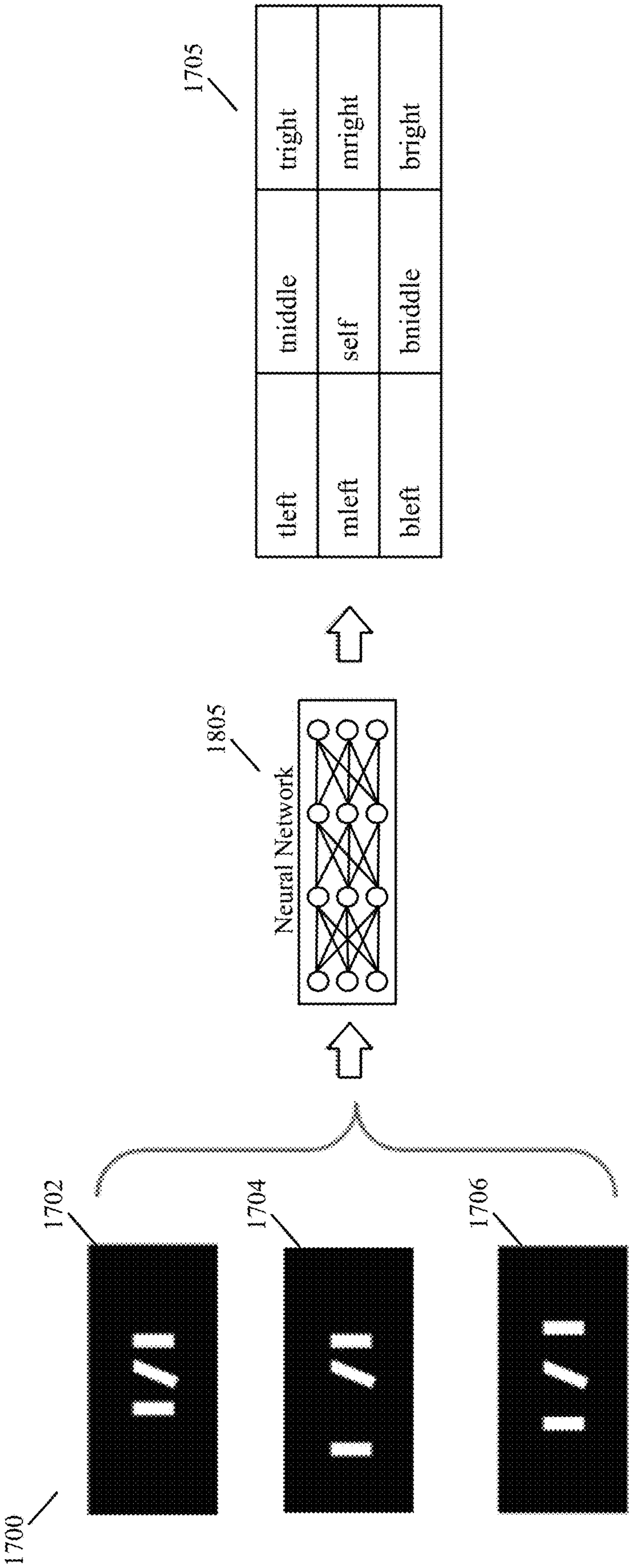
FIG. 18 illustrates a neural network trained and used to infer capacitance values in some embodiments.

FIG. 18 illustrates that in some embodiments a neural network 1805 is trained and used to infer the nine capacitance values for the nine capacitive couplings on the middle shape of the via layer 1704. The above-incorporated U.S. Patent Publication 20230027655 describes the training of this network, as well as the use of this network to generate matrices of capacitance values like the matrix 1700 of FIGS. 17 and 18. As described above and as described further in this incorporated patent application, some embodiments then use the capacitance values from the capacitance matrix 1700 to solve a set of one or more equations that compute a parasitic capacitance value to express the parasitic effect experienced by the middle shape of the via layer 1704. This parasitic value expresses the parasitic capacitance effect on this middle shape by itself and its neighboring structures.

As mentioned above, a parasitic extraction neural network in some embodiments is trained to produce a single output parasitic capacitance value instead of a capacitance matrix such as the one illustrated in FIGS. 17 and 18. This parasitic value expresses the parasitic capacitance effect on this middle shape by itself and its neighboring structures.

Figure 19:
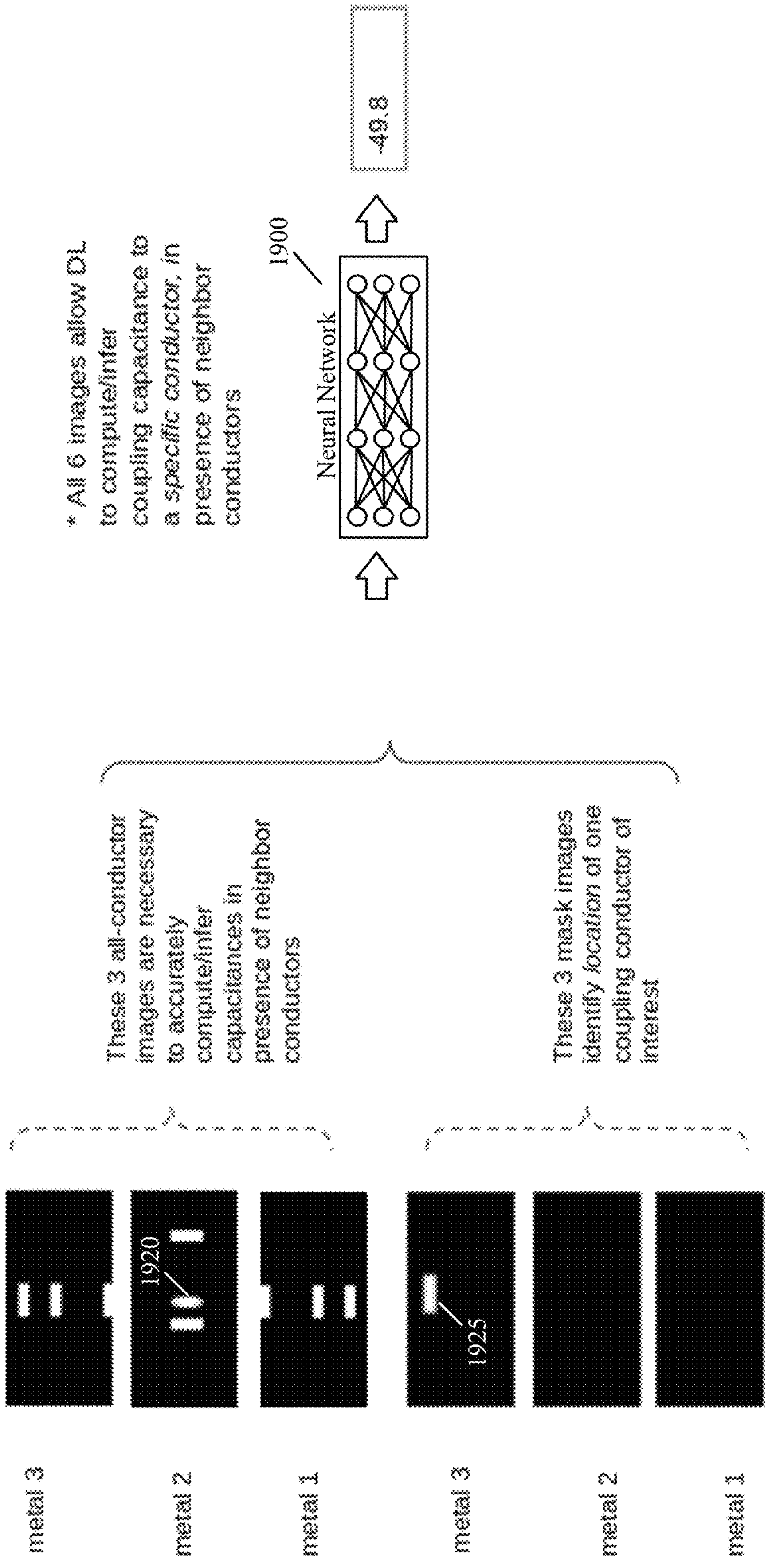
FIG. 19 illustrates an example of a 6-channel image that is input to the network.

Alternatively, parasitic extraction neural network in some embodiments is trained to produce a single output parasitic capacitance value that expresses the parasitic effect of just one neighboring structure at a time. FIG. 19 illustrates an example of such a neural network 1900. As shown, a 6-channel image is input to the neural network 1900. The first three channels are used to describe the full context for the parasitic extraction that expresses the capacitances on the oval shaped conductor 1920 on metal layer 2. For this oval shaped conductor, these three channels include all the neighboring conductors on the same metal layer as well as on the metal layer above and below a conductor whose capacitances are to be extracted.

Additionally, three more channels are used to present a mask, indicating in a graphical form which particular conductor is of interest, i.e., which specific conductor's coupling capacitance to the primary conductor (center conductor on the center metal layer) is to be determined. In the three mask channels, only a single conductor (corresponding to one of the multiple conductors in the vicinity) is represented. Further, the neural network now produces a single output value, rather than the 9 values described previously. This single value is the capacitive coupling on the oval shaped conductor by the object 1925 on the third metal layer that is identified by three masks.

This general approach allows for any number of contextual conductors to be present in the area surrounding the primary conductor of interest (e.g., the center conductor of the center metal layer). All contextual conductors are accounted for in the first three channels, while the additional mask channel images indicate which of these is to be considered. All contextual conductors need to be included for capacitance prediction, as the addition or subtraction of any one of them changes the capacitances for all of the remaining conductors. This approach is used in some embodiments that use a trackless router.

Instead of producing matrices that include parasitic values (e.g., capacitance values) computed by the MTN, the MTN of some embodiments produces parasitic parameters from which the parasitic extraction tool can compute parasitic values. For instance, as described in the above-incorporated U.S. Patent Publication 20230027655, the MTN of some embodiments outputs parasitic capacitances per unit length. The parasitic extraction tool then identifies the overlapping length between two adjacent conductors and multiplies this length by the capacitance per unit length to compute the parasitic capacitive coupling by one of these conductors on the other.

Figure 20:
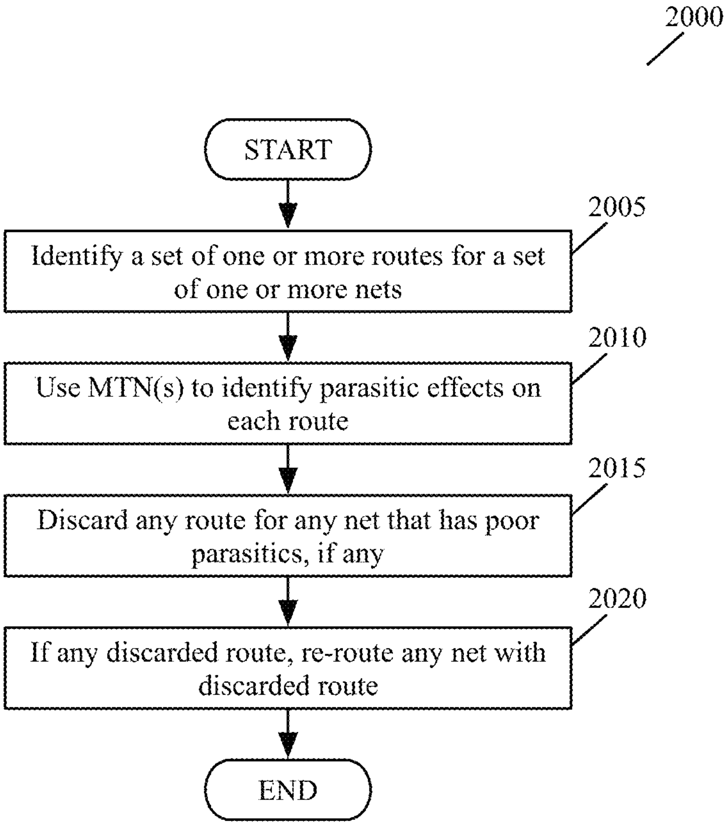
FIG. 20 illustrates a process that uses a digital twin MTN during routing to identify routes with acceptable parasitics.

FIG. 20 illustrates a process 2000 that uses a digital twin MTN during routing to identify routes with acceptable parasitics. In some embodiments, a router uses the process 2000 repeatedly during routing to generate routes. As shown, the process 2000 initially identifies (at 2005) a set of one or more routes for a set of nets in a design layout by using one or more conventional routing processes. In some embodiments, a router uses the process 2000 for each route that it defines for each net, while in other embodiments, the router uses the process 2000 for a group of routes that it defines for a group of nets (e.g., as part of a rip-up-and-reroute operation). To define each route, the process 2000 uses (at 2005) one of the traditional detailed routing processes that are commonly used today to define detailed routes.

Next, at 2010, the process uses the digital twin MTN to identify parasitic effects on (e.g., parasitic capacitances experienced by) the set of routes identified at 2005. To use the digital twin MTN, the process 2000 in some embodiments rasterizes (i.e., pixelates) the design layout portion that contains the identified set of routes, and supplies this rasterized representation to the digital twin MTN. When the router defines its routes in the contour domain, the process 2000 first performs a rasterization operation that transforms the contour/geometric definition of the design layout into the pixel-domain in which the shapes in the design layout are represented by actual pixel values, e.g., such as those described above. For process 2000 and other processes described in this document, different embodiments use different known rasterization processes to transform the contour definition of a design into the pixel domain.

In some embodiments, the MTN processes the rasterized design layout portion to compute the overall parasitic effect on (e.g., the overall parasitic capacitances experienced by) each route in the supplied design layout. Instead of directly outputting an overall parasitic value for each route, the MTN in other embodiments generates parasitic parameters for each route, and the process in these embodiments computes the overall parasitic value(s) for each route by using another solver process.

At 2015, the process 2000 discards any identified route that has unacceptable parasitics (e.g., an overall parasitic capacitance value that exceeds a threshold capacitance value). When performing the process 2000 during a rip-up-and-reroute operation, the operation 2015 can rip out (i.e., discard) more than one route when more than one route has poor parasitics. At 2020, the process then uses one or more conventional routing processes to identify a new route for any net that had its route discarded at 2015, if any such route was discarded at 2015. In some embodiments, the process 2000 performs the operations 2015 and 2020 on the design layout that contains the set of routes identified at 2005 and that is defined in the contour domain. After ensuring that the parasitics for any newly defined route is acceptable, the process 2000 then ends.

As processes has evolved, open-via defects have become one of the most important failure mechanisms. Vias fail due to random defects, cut misalignment, thermal stress-induced voiding effects, or electromigration. In some embodiments, routers that are aware of these effects and take steps to mitigate them, provide more reliable solutions than those that are not. Redundant via-insertion is one existing technique used to improve reliability and yield. A failing via that has a fault-tolerant, redundant via partner need not be an issue.

Figure 21:
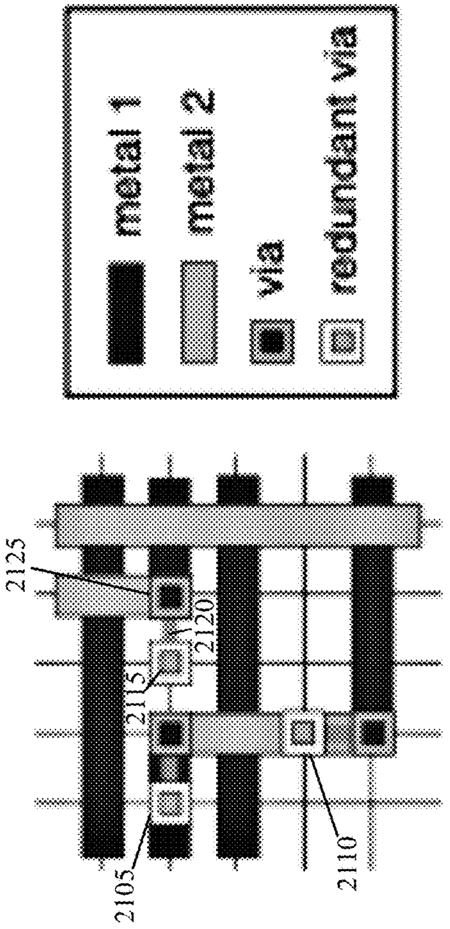
FIG. 21 illustrates an example of a double-pair redundant via insertion.
Figure 22:
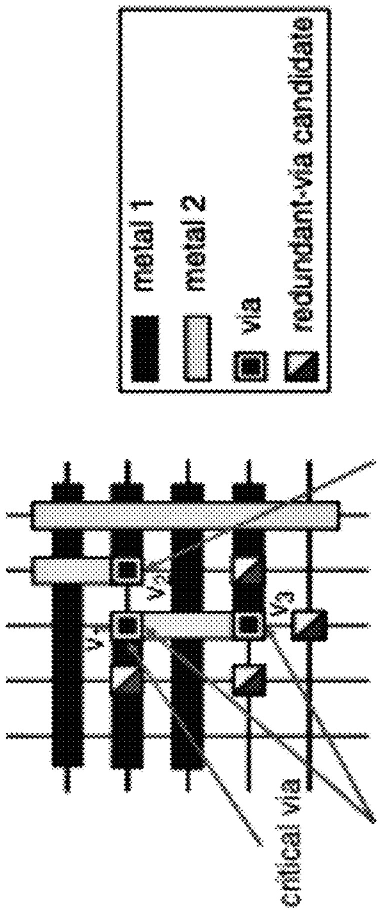
FIG. 22 illustrates examples of 'dead' vias, 'critical' vias, and 'alive' vias.

FIG. 21 illustrates an example of a double-pair redundant via insertion. In this approach, each via is accompanied by a redundant via partner. Each via is shown with a black square center, while its corresponding redundant via is shown with a gray square center. Double-pair vias have been found to lead to failure rates which are 10-100 times smaller than single vias. In some of todays via insertion processes, vias are categorized as alive, dead and critical vias. FIG. 22 illustrates examples of dead, critical and alive vias. Alive vias have at least one, and possibly more redundant via possibilities. Alive vias within only a single redundant via possibility are termed critical vias, and vias that have no redundant via partners are termed dead vias.

In some embodiments, redundant via insertion are performed as a post processing step after routing is complete. However, if the router in some embodiments minimizes the number of dead vias (via locations for which no redundancy possible) or critical vias (via locations for which only a single redundancy is possible), the post-layout via insertion rate is significantly improved.

Figure 23:
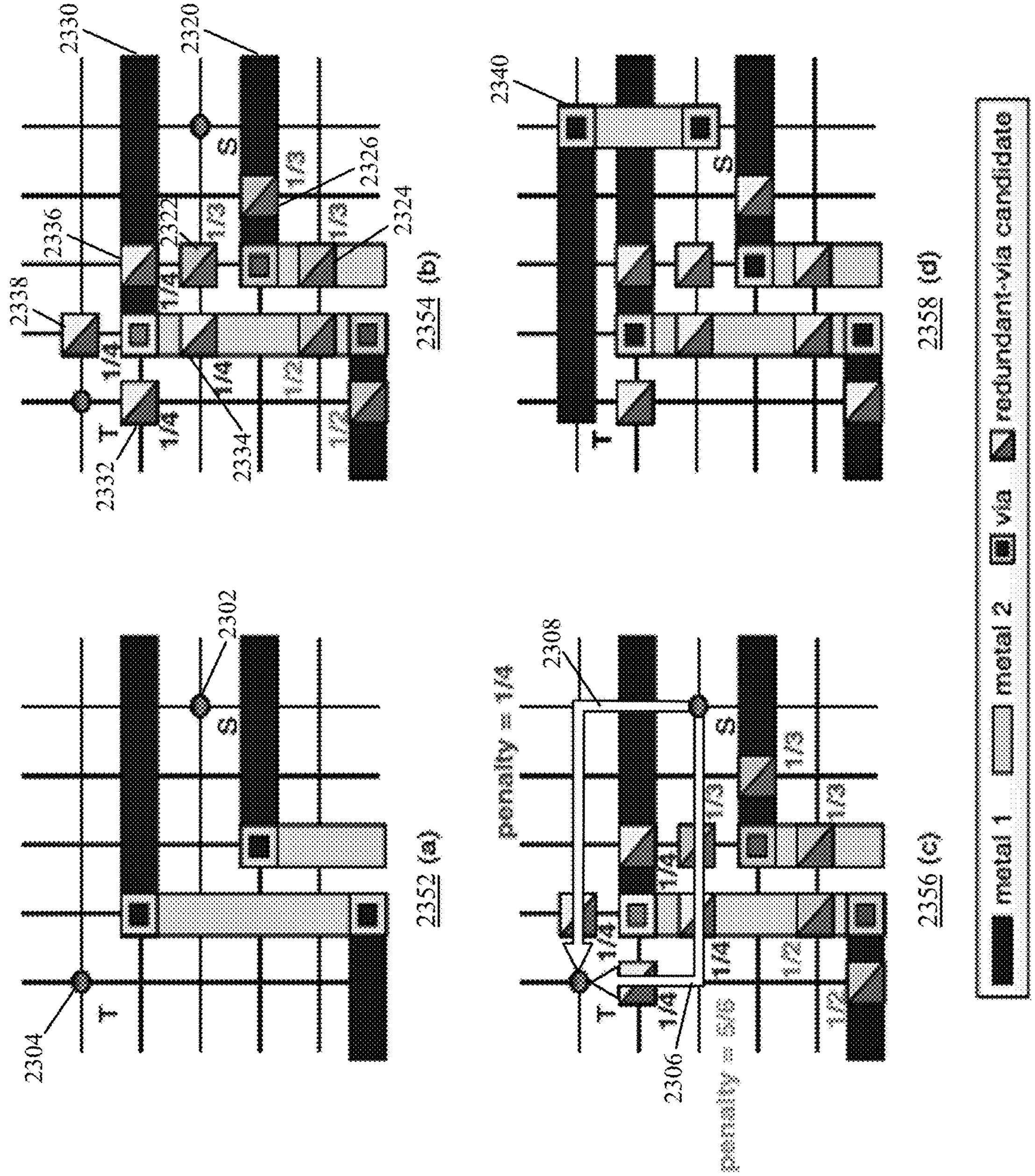
FIG. 23 illustrates an example of a process for redundant-via-aware detailed routing.

FIG. 23 illustrates an example of a process for redundant-via-aware detailed routing in four stages 2352-2358. As shown, in first stage 2352 illustrated in image (a), a net is shown that needs to be routed from the source pin S 2302 to the target pin T 2304. The second stage 2354 illustrated in image (b) shows the potential locations for inserting redundant vias before the routing operation is performed. Three redundant vias 2322, 2324, and 2326 are defined for pre-existing route 2320, while four redundant vias 2332, 2334, 2336 and 2338 are defined for pre-existing route 2330. Each redundant via location is assigned a redundant via cost. The via cost for each via is the cost assigned to a new route being placed in such a way as to block that via. Per this encoding, some redundant vias have lower costs than others, as there are more possibilities for alternates.

The third stage 2356 illustrated in image (c) shows the router considering two possible routes for the net under consideration. One routing path 2306 goes to the left and then up, while the other routing path 2308 goes up and then to the left. The routing path 2306 crosses (or eliminates the possibilities) for vias in a higher cost manner than the second routing path 2308. The first path incurs a via cost of 5/6 (which is the sum of the individual via costs eliminated by this route candidate), while the second path incurs a cost of just 1/4. Hence, the fourth stage 2358 illustrated in image (d) shows that the redundant-via-aware router has defined a route 2340 for the net with the source S and target T pins, by selecting and completing the latter routing path 2308.

Some embodiments use a neural network to rapidly compute the lowest-cost path, replacing the prior art steps of first computing all the redundant via locations and then enumerating all the possible paths/via intersections to find the via-cost for each path. Such a network is trained in some embodiments first to make such inferences. To train such a neural network, some embodiments supply the network with inputs that correspond to images like the first stage 2352 image (a) of FIG. 23, and known outputs associated with these input images, with such outputs corresponding to the result from which the neural network is being trained (e.g., redundant via location and/or via elimination, etc.).

Hence, given an image like input image (a) of FIG. 23, the trained neural network in some embodiments identifies the via insertion solution illustrated in image (d) of FIG. 23 as the preferred solution. This via insertion solution has the three redundant vias 2322, 2324, and 2326 for the pre-existing route 2320, and the three redundant vias 2332, 2334 and 2336 for the pre-existing route 2330. In some embodiments, the trained neural network also produces the route 2340 illustrated in the image (d). In other embodiments, the trained neural network just produces the via insertion locations for the router to use to modify the pre-existing routes 2320 and 2330, and then leaves it to this router to subsequently identify in a subsequent routing operation the route for the net with the source S and target T pins.

Not all via costs are equal. Some redundant via locations are 'better' than others due to the effects of lithography and manufacturing process variations, even in the face of advanced OPC. If two paths are deemed equal-cost by the process described above, either could be selected by the router. To identify the better solutions due to lithographic and manufacturing issues, some embodiments use a digital twin MTN to determine more accurate via costs. For example, in some embodiments, a front-to-back digital twin is used to precisely predict the manufactured contours for the various candidate redundant via locations.

Vias will be manufactured as 'circles' (approximately), which will vary in uniformity and area. The digital twin MTN of some embodiments produces predicted shapes of vias in view of lithography and manufacturing process variations. From these shapes, the router in some embodiments then selects the new routing candidate path that results in the largest area/most uniform vias for the previously routed paths, all other things being equal.

In other embodiments, during a post-processing operation prior to the insertion of the redundant vias, a trained neural network is used to rapidly identify the areas of the routed design most in need of redundant via insertion. This introduces a new concept of missing-redundant-via hotspots in a design. In some embodiments, an area of the design so-identified is targeted for an additional round of routing refinement, e.g., rip-up and reroute operations, and the router called again. A trained-neural network approach in some embodiments is substantially faster than iterating over the net shapes in detail to compute this information, while still offering a sufficiently accurate result.

Figure 24:
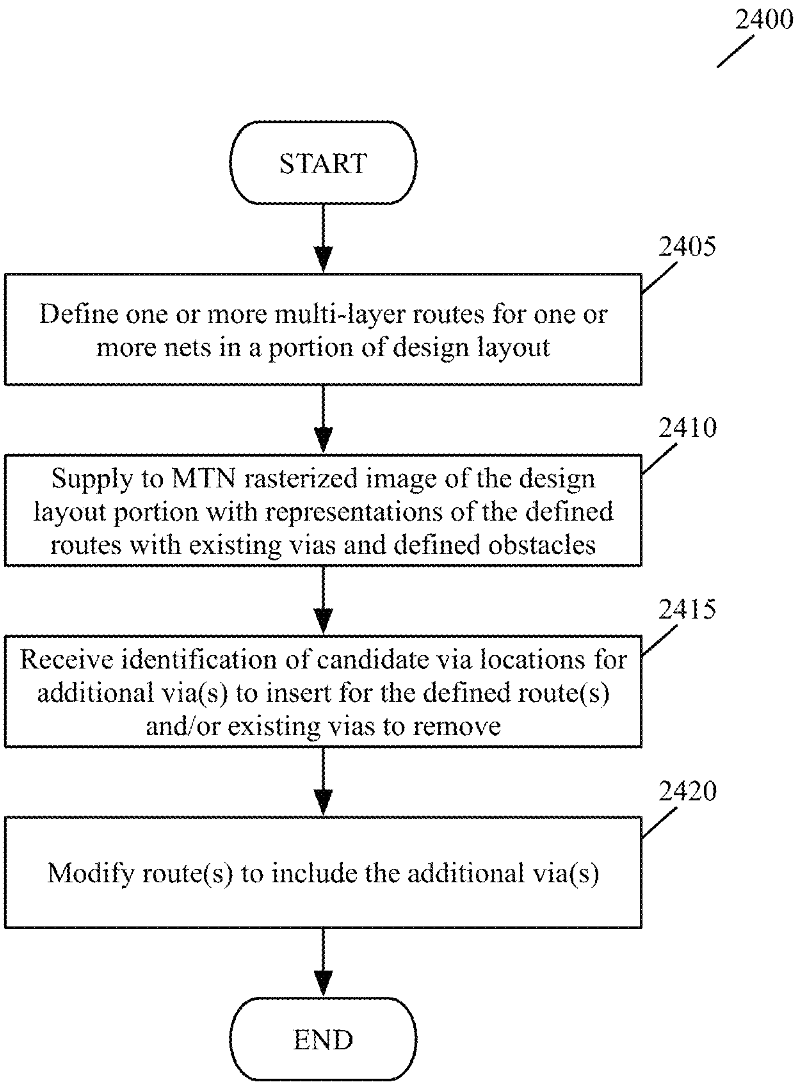
FIG. 24 illustrates a process that some embodiments use to identify candidate redundant via insertion locations.

FIG. 24 illustrates a process 2400 that some embodiments use to identify candidate redundant via insertion locations. This process uses an MTN to identify these candidate locations for inserting vias into the design layout. As shown, this process starts by a router defining (at 2405) one or more routes for one or more nets in a portion of the IC design layout. At least one of these defined routes is a multi-layer route that traverses multiple interconnect layers to connect at least two pins of a net. In some embodiments, a router uses the process 2400 for each route that it defines for each net, while in other embodiments, the router uses the process 2400 for a group of routes that it defines for a group of nets (e.g., as part of a rip-up-and-reroute operation). To define each route, the process 2400 uses (at 2405) one of the traditional detailed routing processes that are commonly used today to define detailed routes.

At 2410, a rasterized (i.e., pixelated) version of the design layout portion is supplied to the MTN. When the router defines its routes in the contour domain, a rasterization operation has to be performed to transform the contour/geometric definition of the design layout into the pixel-domain in which the shapes in the design layout are represented by actual pixel values, e.g., such as those described above.

Figure 25:
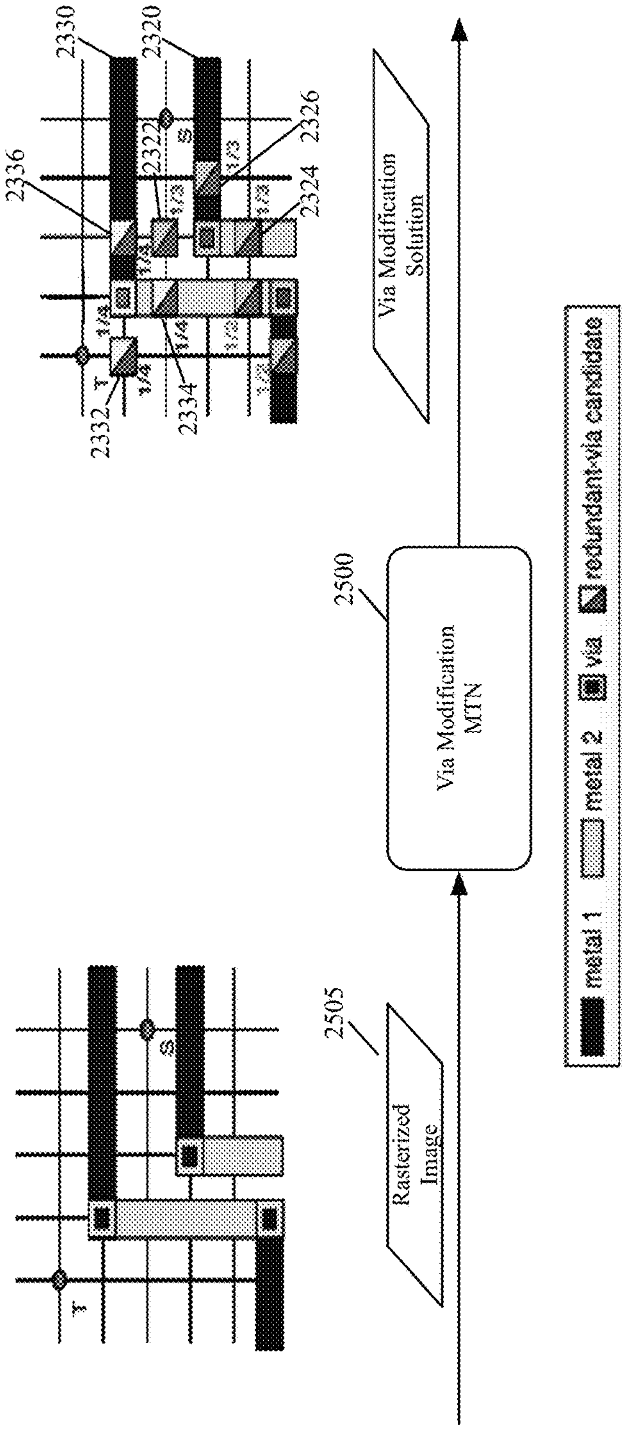
FIG. 25 illustrates an example of an MTN processing the rasterized design layout portion to identify locations for inserting vias in the design layout.

Next, at 2415, the MTN processes the rasterized design layout portion to identify locations for inserting redundant vias in the design layout. FIG. 25 illustrates an example of this operation. This figure illustrates an MTN 2500 processing a rasterized version 2505 of the first-stage design layout of FIG. 23, to identify the via insertion solution has the three redundant vias 2322, 2324, and 2326 for the pre-existing route 2320, and the three redundant vias 2332, 2334, and 2336 for the pre-existing route 2330.

The MTN 2500 outputs these via insertion locations differently in different embodiments. In some embodiments, it outputs these locations in terms of the coordinates of the candidate via locations that the MTN identifies. In other embodiments, the MTN outputs a pixel-domain representation of the image with the identified candidate via insertion locations. In still other embodiments, the MTN identifies the via locations in other ways, e.g., by identifying a route that needs to have its vias examined.

The MTN 2500 identifies the candidate via locations, as it was placed through a training process that supplied lots of known input design layout portions, and the corresponding output candidate via locations (for each input sample) that were identified by traditional via-insertion processes, as further described below. In some embodiments, the MTN 2500 not only identifies candidate via locations for insertion into the design layout, but also identifies via locations that the router defined for its routes that are candidates for moving or removal. The MTN in these embodiments can identify the vias to move or remove as the known input/output samples that were used to train the MTN allow the MTN to identify router-defined via locations that are not optimal (e.g., that create too much congestion or have poor manufacturing or lithographic properties).

Figure 26:
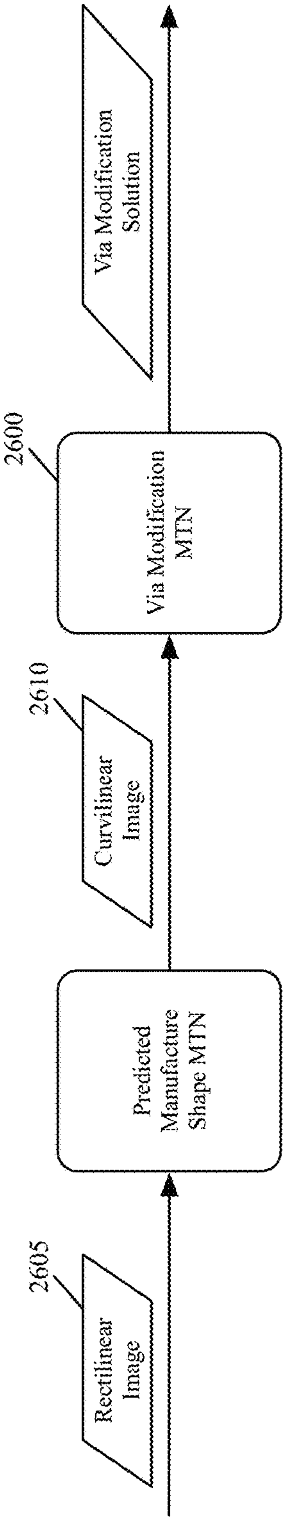
FIG. 26 illustrates an example of an MTN processing a rasterized image of a rectilinear design layout to produce another rasterized image of a curvilinear design layout that represents the predicted manufactured IC associated with the input design layout.

The via modification MTN 2500 in some embodiments performs its via modification operations (e.g., provides its via insertion and/or removal recommendations) based on the predicted manufactured shapes of the input IC design layout that it receives. As shown in FIG. 26, some embodiments first have another MTN 2600 process a rasterized image 2605 of a rectilinear design layout to produce another rasterized image 2610 of a curvilinear design layout that represents the predicted manufactured IC associated with the input design layout. Examples of such MTNs are described in the above-incorporated U.S. Patent Publication 20220128899, U.S. patent application Ser. No. 17/992,870, U.S. patent application Ser. No. 18/097,272, and U.S. patent application Ser. No. 17/992,897.

In these embodiments, the rasterized image 2610 of the curvilinear design is then supplied to the via modification MTN 2600, which then processes this curvilinear image to produce its via insertion and/or removal recommendations. In other embodiments, the via modification MTN 2500 is trained to implicitly perform the task of the MTN 2600 in order to provide, for a given input rectilinear design that it receives, its via modification recommendations based on the predicted manufactured curvilinear design. In still other embodiments, the via modification MTN 2500 receives from the router the predicted manufactured curvilinear design as the router produces such designs natively.

After the via modification MTN identifies (at 2415) the via locations that have to be added or removed from the supplied design layout, the process 2400 modifies (at 2420) one or more routes to account for the via modification(s) specified by the via modification MTN. In some embodiments, the process 2400 performs the operation 2420 back in the contour domain. Some embodiments use (at 2420) a known via-modification process to add redundant vias at locations identified by the MTN. In some embodiments, the router implements the via-modification process. For the via modification, the route modification (at 2420) in some embodiments involves modifying the defined routes to include the additional redundant vias. This modification includes adding the identified vias to the previously defined routes.

When such an added via requires a previously defined route to be extended on one or more layers traversed by the route, the route modification includes the necessary extension of the routes. For instance, two of the redundant vias 2105 and 2110 in FIG. 21 would not require extensions of the previously defined routes as they are defined in the path traversed by these routes, while a third redundant via 2115 in this example requires the route 2120 to be extended on both metal layers (i.e., to the x- and y-axis locations of the new redundant via) as it is defined outside of a corner made by this route. Also, in some cases, the pre-existing via 2125 that is defined at this corner might get flagged by the via modification MTN 2500 as a via that would have to be removed, e.g., as it might have issues once it is manufactured for being too close to a nearby wire or other obstacle. In such a case, the router would replace the via 2125 with the via 2115.

As mentioned above, the router that called the via modification MTN to check its route(s) is the EDA tool that performs the via and/or route modification operation 2420 in some embodiments. In other embodiments, it is another post-processing EDA tool that performs these operations. In still other embodiments, the via and/or route modification operation 2420 is performed by another MTN. In yet other embodiments, one via modification MTN both identifies the locations of the vias to add and/or remove, and performs the route and/or via modification operations that are needed to add and/or remove the vias.

Such a via modification MTN is trained to receive rasterized images of design layout portions and to produce rasterized images of modified design layout portions with added vias and/or removed vias, and when necessary, route modifications to effectuate the desired via modifications. To train such an MTN, some embodiments use known input/output design pairs, with the input designs having one or more routes, vias and neighboring structures, and the output designs that correspond to these input designs and that are generated by (i) using existing via modification processes followed by (ii) using existing route modification processes that use the information provided by the via modification processes.

Conjunctively with the insertion of the redundant vias, the MTN (at 2415) in some embodiments can identify vias to remove or to move. To move a via, some embodiments discard a first via that is defined along a first route at a first location and insert a second via along the first route at a second location. This movement of the via can be viewed as simply replacing the old via with a new via, or the movement of the old via to a new location (assuming that the same identifier is used for the via at the new or old locations). The movement of the via along a route can include modification of the route to extend to a new location of the via on one or more interconnect layers.

The MTN in some embodiments removes or moves the via instead of simply identifying the via to remove or move. In these embodiments, the MTN is trained in a training process that uses a first set of known input design layouts with a first set of corresponding known output design layouts that have (1) a new location for each of one or more vias in their corresponding input design layouts and (2) possibly one or more route modifications that modify one or more routes to traverse to a new via location. The known input design layouts are individually fed through the MTN during training to produce a generated output design layout that is part of a second set of generated output design layouts. Each generated output design layout includes (1) a new location for each of one or more vias in its corresponding input design layout and (2) possibly one or more route modifications that modify one or more routes to traverse to a new via location. For each training batch, the differences between the first and second sets of output design layouts are used to generate a loss function value, which is used to adjust a set of trainable parameters of the MTN. Multiple training batches are fed through the MTN, to fully train the adjustable set of trainable parameters of the MTN.

Instead of identifying candidate via locations to add, move or remove, the MTN of the process 2400 in other embodiments simply identifies (at 2415) via locations that should be re-assessed by a traditional via-modification and/or route-modification operation. These identified via locations are called via "hotspots" in some embodiments. They are via locations in routes defined by a router that need to be re-assessed by the router or a via-modification process used by the router in order to move the via location and/or to add additional redundant vias about this location in order to alleviate the hotspot problem identified by the process 2400. To train these hotspots, the MTN in some embodiments receives multiple pairs of known inputs/outputs, with each input being an extracted portion of a design layout and the input's corresponding output being one or more via hotspots that an existing via analysis process identified as potential problem locations for placing vias or for needing additional redundant vias.

Figure 27:
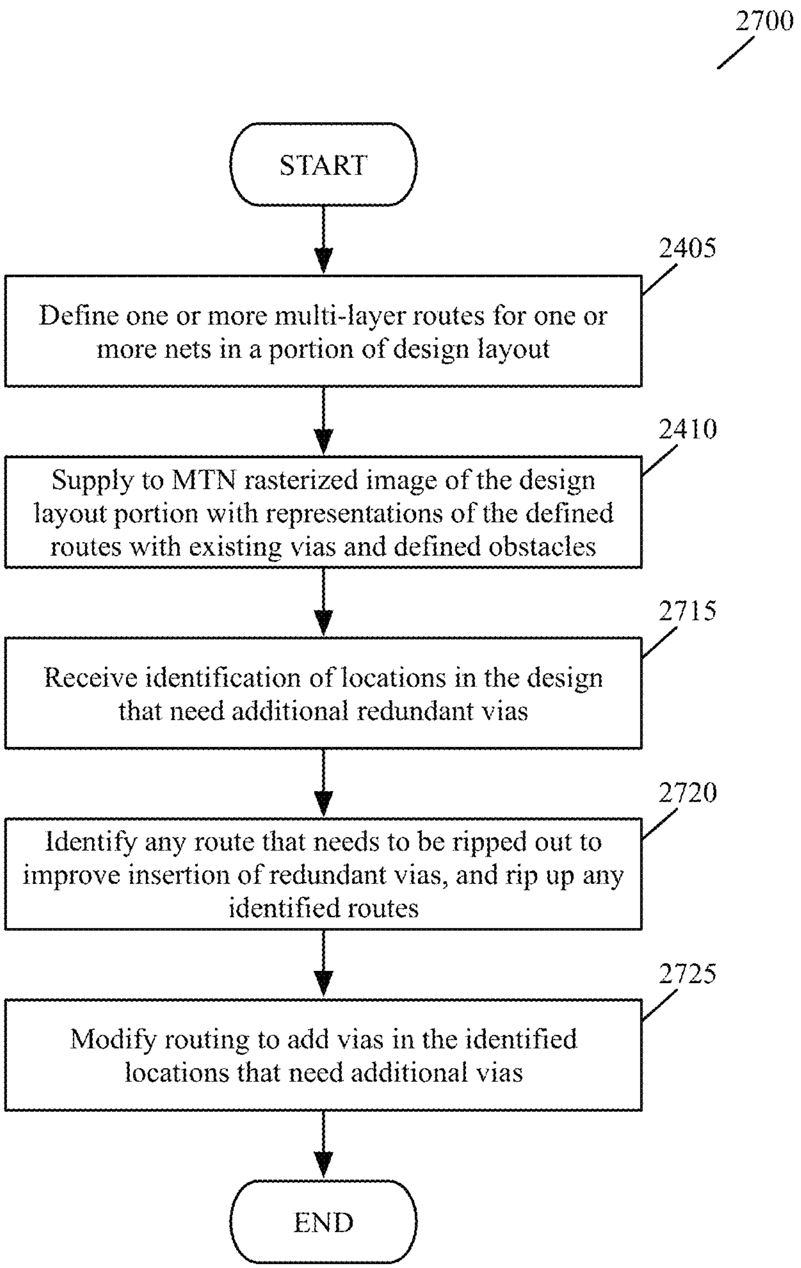
FIG. 27 illustrates a process of some embodiments that uses a digital twin MTN to just identify via hotspots, and then uses another process to analyze the identified hotspots in order to add redundant vias, move vias or remove vias.

FIG. 27 illustrates a process 2700 of some embodiments that uses a digital twin MTN to just identify via hotspots, and then uses another process to analyze the identified hotspots in order to add redundant vias, move vias or remove vias. The first two operations 2405 and 2410 of this process are similar to the operations 2405 and 2410 of process 2400 of FIG. 24. However, unlike the MTN used by process 2400, the MTN used by process 2700 identifies (at 2715) locations in the input design layout that need to be further analyzed for via modification operations (i.e., identifies via hotspots in the input design layout).

This output is expressed differently in different embodiments. In some embodiments, it is expressed with "hotspot" tags being associated with the routes and/or via locations that need further analysis in the input design layout. In other embodiments, this output is identified by geometric markers that are entered in the design layout (e.g., by one or more circular regions in the design layout) to identify route-crossing-locations and/or via-locations that need to be further examined by a via-modification operation. Still other embodiments use other techniques to identify the via locations that need to be further analyzed by a via-modification process.

Like the MTN used by the process 2400 in some embodiments, the MTN used by the process 2500 performs its via hotspot detection based on the predicted manufactured shapes of the input IC design layout that it receives. This MTN accounts for the predicted manufactured shapes in the same way as the MTN used by the process 2400 in some embodiments.

At 2720, the process 2700 identifies and removes any route that needs to be ripped out of the input design layout in order to address the detected via hotspot problem (e.g., to improve the performance of the vias at the identified hotspot locations). A route can get ripped out at 2720 for a variety of reasons, such as (1) the route creating congestion at a via location, (2) the route being too close to a desired via location (e.g., once the predicted manufactured shapes are taken into account) of another route, and (3) the route having one or more vias with poor characteristics (e.g., size, location, performance, etc.), etc.

For any net that had its route ripped out at 2720, the process then defines (at 2725) a new route. In some embodiments, this entails adding the net to the list of unrouted nets and then performing the routing operation one more time for this net to identify a route for it. In some embodiments, the router defines one or more new constraints (e.g., location constraints, via location constraints, or other via constraints) for the router to use while trying to identify a new route for this net. In some embodiments, the process 2700 performs the operations 2720 and 2725 on the design layout defined in the contour domain. After 2725, the process ends.

Figure 28:
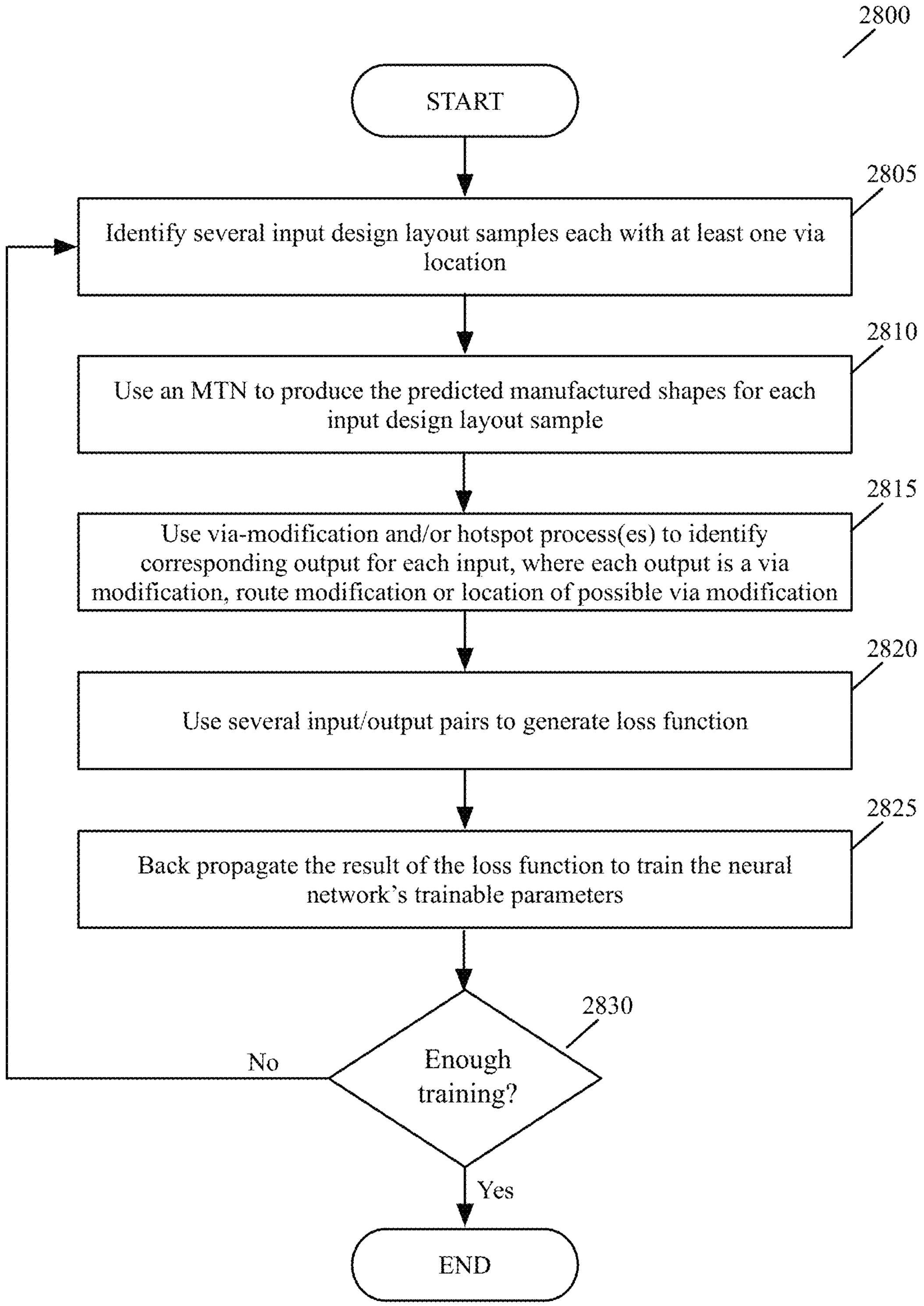
FIG. 28 illustrates a process for training a neural network to perform the operations of the via modification MTN of some embodiments.

FIG. 28 illustrates a process 2800 for training a neural network to perform the operations of the via modification MTN 2500 of some embodiments. As shown, the process initially identifies (at 2805) several input IC design layout samples, e.g., by extracting these samples from a previously defined IC design. Each of these samples is selected to have at least one multi-layer route with at least one via, although typically each sample has more than one via for one or more routes. Each input sample in some embodiments includes multiple images of multiple layers of wiring and interconnects. Also, each input sample can include pins, routes, vias and obstacles about which the routes and vias have to be defined.

Next, at 2810, the process 2800 feeds each input design layout sample through an MTN that predicts the shapes of the components in the input sample at a subsequent manufacturing stage (e.g., at a wafer simulation stage or at the manufactured IC stage). The process 2800 does this operation in order to train its via modification MTN to account for the predicted manufactured shapes of the design layout components. In other embodiments, the process 2800 uses other techniques (e.g., wafer simulation) to produce the known output shape of the components in the input sample at a subsequent manufacturing stage. For instance, in some embodiments, the process extracts the inputs and outputs from the database of prior design/manufacturing operations, where the input samples are from the prior produced physical design layouts and the output samples are from the outputs of the prior wafer simulation processes.

The manufactured shapes produced at 2810 serve as the known input samples that are used to train the via modification MTN. After 2810, the process 2800 then generates (at 2815) the known output for each input sample produced at 2810. In some embodiments, the process 2800 uses a modified version of a currently used via-modification process to generate the known output for each known input. One such via-modification process is described in "Post-Routing Redundant Via Insertion for Yield/Reliability Improvement," by Lee and Wang, in Proceedings of the 2006 Asia and South Pacific Design Automation Conference (ASP-DAC '06), January 2006, pgs. 303-308.

In some embodiments, the process identifies the intersection of the predicted manufactured curvilinear shapes that form the via on two or more layers in order to determine the predicted overlap shape of the via, and then uses this predicted overlap shape to determine whether to keep this via, discard the via or require additional redundant via(s) for this via. To compute the predicted via overlap shape based on the predicted manufactured curvilinear shapes of the via, some embodiments use the processes described in the above-incorporated U.S. patent application Ser. No. 17/992, 897. In some of these embodiments, the process discards a particular via if its predicted overlap shape is smaller than a first threshold, and requires additional redundant vias to be defined for the particular via when its predicted manufactured overlap shape is larger than the first threshold but smaller than a second threshold. In some of these embodiments, the predicted overlap shape for the particular via accounts for structures that neighbor this via on different layers.

The via modification process in some embodiments analyzes an input design layout sample to identify locations (1) to place redundant vias and/or (2) to move or remove vias defined by the router from the routes defined by the router. In some embodiments, the via modification process is also a route modification process that also modifies the routes in the input design layout to actually insert redundant vias, move previously defined vias and/or remove previously defined vias.

Next, at 2820, the process 2800 uses the input samples generated at 2810 and their corresponding output samples generated at 2815, to train the via modification MTN. To train the neural network, some embodiments feed each known input sample through the neural network to generate an output, and then compare this generated output to the known output of the input to identify a set of one or more error values. The error values for a group of known inputs/outputs are then used to compute a loss function, which is then back propagated (at 2825) through the neural network to train the configurable parameters (e.g., the weight values) of the neural network. In some embodiments, the MTN receives (at 2820) each input sample defined in the pixel domain.

At 2830, the process determines whether it has sufficiently trained the via modification MTN. If not, the process returns to 2805 to continue its training operations. Otherwise, the process ends. Once trained by processing a large number of known inputs/outputs, the neural network can then be used to facilitate routing operations of some embodiments by (1) identifying locations for adding vias, removing vias, or moving vias, (2) modifying routes to perform any of these via modification operations, or (3) simply identifying via hotspot locations in the design layouts.

Instead of identifying candidate via locations to add, move or remove, the training process 2800 in some embodiments trains the MTN to simply identify via locations that should be re-assessed by another traditional via-modification and/or route-modification operation. These "hotspot" locations need to be re-assessed by a router or a via-modification process used by the router in order to move the via location and/or to add additional redundant vias about this location in order to alleviate the identified hotspot problem.

In these embodiments, the MTN is trained in a training process that uses a first set of known input design layouts with a first set of corresponding known hotspot outputs that identify via hotspot locations in the input design layout. The known input design layouts are individually fed through the MTN during training to generate a second set of predicted via hotspot output location in the input design layouts. For each training batch, the differences between the first and second sets of via hotspot output locations are used to generate a loss function value, which is used to adjust a set of trainable parameters of the MTN. Multiple training batches are fed through the MTN, to fully train the adjustable set of trainable parameters of the MTN. During training, the input and output samples of the MTN are images of multi-layer designs as described above.

Figure 29:
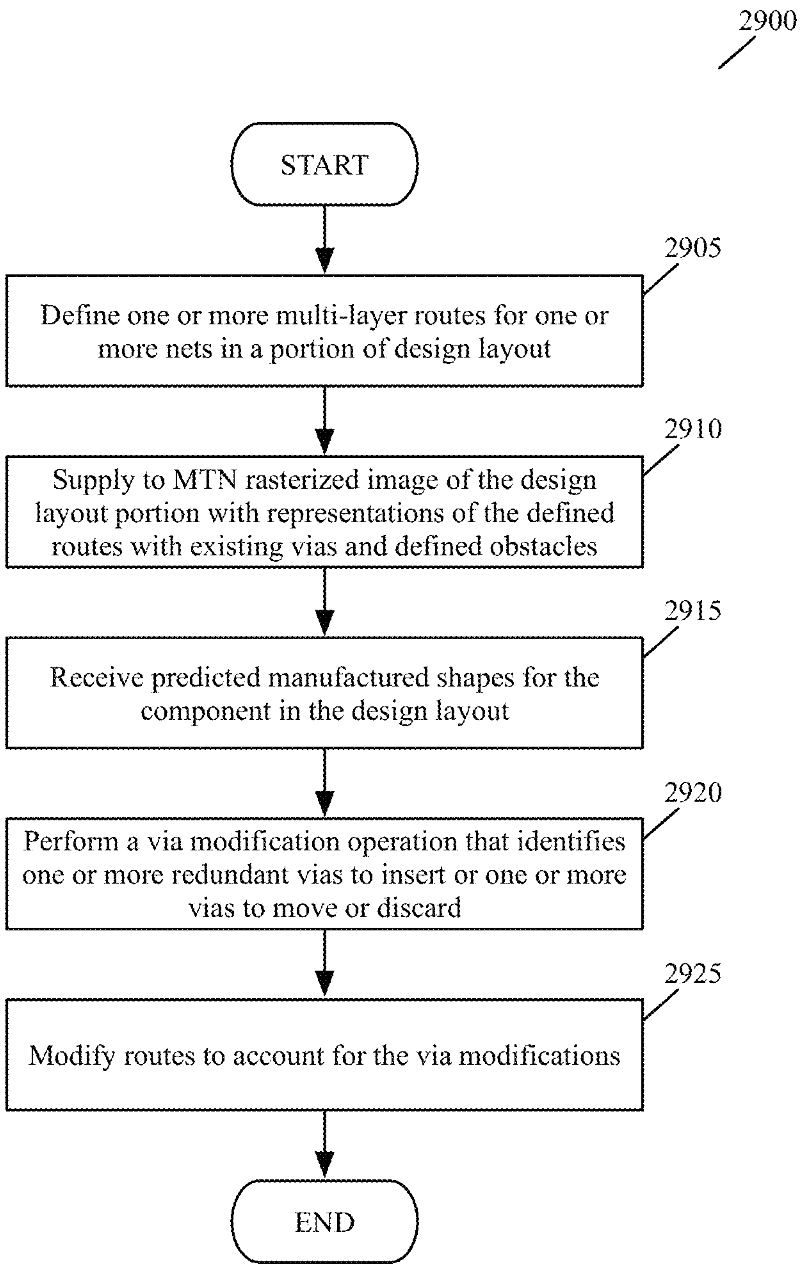
FIG. 29 illustrates a process of some embodiments that uses a digital twin MTN to generate the predicted manufactured shapes of vias, and then analyzes these shapes to determine whether it needs to insert additional redundant vias and/or to move any vias.

FIG. 29 illustrates a process 2900 of some embodiments that uses a digital twin MTN to generate the predicted manufactured shapes of vias, and then analyzes these shapes to determine whether it needs to insert additional redundant vias and/or to move any vias. As shown, this process starts by a router defining (at 2905) one or more routes for one or more nets in a portion of the IC design layout. At least one of these defined routes is a multi-layer route that traverses multiple interconnect layers to connect at least two pins of a net. In some embodiments, a router uses the process 2900 for each route that it defines for each net, while in other embodiments, the router uses the process 2900 for a group of routes that it defines for a group of nets (e.g., as part of a rip-up-and-reroute operation). To define each route, the process 2900 uses (at 2905) one of the traditional detailed routing processes that are commonly used today to define detailed routes.

At 2910, a rasterized (i.e., pixelated) version of the design layout portion is supplied to the MTN. When the router defines its routes in the contour domain, a rasterization operation has to be performed to transform the contour/geometric definition of the design layout into the pixel-domain in which the shapes in the design layout are represented by actual pixel values, e.g., such as those described above.

Next, at 2915, the MTN outputs a rasterized design layout portion that includes the predicted manufactured shapes for the components (e.g., routes, via contacts, etc.) in the design layout portion that the MTN received as input. In some embodiments, each predicted manufactured shape is drawn by three curvilinear contours representing three variations of a manufacturing parameter. The training and use of such an MTN is further described in the above-incorporated U.S. patent applications.

At 2920, the process 2900 performs a modified version of a currently available via-modification operation on the curvilinear output of the MTN. In some embodiments, the process 2900 performs the operation 2920 and subsequent operation 2925 on the design layout defined in the contour domain. Before performing this operation, the MTN output is transformed from the pixel domain to contour domain as the via-modification operation is performed in the contour domain. This via-modification operation in some embodiments analyzes the curvilinear MTN output to determine whether additional redundant vias need to be defined, or whether any vias need to be moved in or removed from the input IC design layout portion.

In some embodiments, the via-modification operation identifies the intersection of the predicted manufactured curvilinear shapes that form each via on two or more layers in order to determine the predicted overlap shape of the via, and then uses this predicted overlap shape to determine whether to keep this via, discard the via or require additional redundant via(s) for this via. To compute the predicted via overlap shape based on the predicted manufactured curvilinear shapes of the via, some embodiments use the processes described in above-incorporated U.S. patent application Ser. No. 17/992,897. In some of these embodiments, the process discards a particular via if its predicted overlap shape is smaller than a first threshold, and requires additional redundant vias to be defined for the particular via when its predicted manufactured overlap shape is larger than the first threshold but smaller than a second threshold. In some of these embodiments, the predicted overlap shape for the particular via accounts for structures that neighbor this via on different layers.

Instead of using a traditional via-modification operation, some embodiments use (at 2920) another via-modification MTN to analyze the curvilinear MTN output to determine whether additional redundant vias need to be defined, or whether any vias need to be moved in or removed from the input IC design layout portion. In these embodiments, the rasterized curvilinear MTN output is then supplied to the via modification MTN, which then processes this curvilinear image to produce its via insertion and/or removal recommendations.

At 2920, the process 2900 identifies and removes any route that needs to be ripped out of the input design layout in order to address a detected via problem that cannot be solved by adding redundant vias or moving vias. A route can also get ripped out at 2920 for a variety of other reasons, such as (1) the route creating congestion at a via location, (2) the route being too close to a desired via location (e.g., once the predicted manufactured shapes are taken into account) of another route, and (3) the route having one or more vias with poor characteristics (e.g., size, location, performance, etc.), etc.

Lastly, at 2925, the process 2900 (e.g., the via-modification operation) modifies any route for which the operation added redundant vias or moved vias. For any net that had its route ripped out at 2920, the process 2900 also defines (at 2925) a new route. In some embodiments, this entails adding the net to the list of unrouted nets and then performing the routing operation one more time for this net to identify a route for it. In some embodiments, the router defines one or more new constraints (e.g., location constraints, via location constraints, or other via constraints) for the router to use while trying to identify a new route for this net. After 2925, the process ends.

Edge-based OPC is a photolithography enhancement technique commonly used to compensate for image errors due to diffraction or process effects. OPC comes into play in the making of semiconductor devices and accounts for the limitations of light to maintain the edge placement integrity of the original design, after processing, into the etched image on the silicon wafer. These projected images appear with irregularities such as line widths that are narrower or wider than designed, and are amenable to compensation by changing the pattern on the photomask used for imaging. Other distortions (such as rounded corners) are driven by the resolution of the optical imaging tool and are harder to address. Such distortions, if not addressed, significantly alter the electrical properties of what is being fabricated. Optical proximity correction corrects these errors by moving edges or adding extra polygons to the pattern written on the photomask.

As process geometries have decreased, routing has faced the need to reconcile a growing interdependency between lithography and layout design. Printability and reliability of manufacturing have now become key concerns. Modern routers need to be aware of the limitations of manufacturing and aware of key advanced manufacturing-related flow steps such as OPC (optical proximity correction), variation in Edge Placement Errors (EPE), etc. The former problem requires that routers become aware of their impacts on the downstream OPC flow, and attempt to create more OPC-friendly routing solutions. The latter requires that routers go one step further and become aware not only of the OPC process itself but in fact, also of final manufacturing and the final edge placements in manufactured interconnects.

Some have suggested an OPC-friendly routing is an OPC-aware multilevel, full-chip gridless detailed router. The overall technique uses a multi-level approach to routing as described above. This router integrates global routing, detailed routing, and congestion estimation at each level of multilevel routing. In addition, the router in some embodiments reduces OPC-pattern-feature requirements, making the job of the downstream OPC tool easier. As the router seeks to optimize (e.g., minimize) path length (i.e., wirelength) using a shortest path process (such as Dijkstra's), it incorporates an additional cost, which is the OPC cost. The router therefore seeks to both minimize path length and optimize for OPC friendliness at the same time, with the latter achieved by introducing a rule-based OPC approach into the multilevel-routing framework, on the basis that a model-based approach is too time-consuming. However, rule-based approaches are not as accurate as model based approaches, and as process geometries have shrunk even further, OPC requirements are significantly higher than as modeled.

Today's modern nanometer geometry processes require a very complex form of OPC which includes SRAF (sub-resolution assist features) insertion or even full ILT (Inverse Lithography Technology). Some embodiments replace the simple rule-based OPC method and its associated cost function calculation with one based on a full front-to-back digital twin MTN. Some embodiments also replace the OPC cost during wirelength optimization with a very different type of cost, a cost associated with the final manufactured interconnect contours, which takes OPC methods (including advanced OPC methods such as ILT) into account, along with manufacturing itself.

In the prior approach, an OPC cost along with a wirelength cost is included when performing wirelength optimization. The OPC cost itself has two components, the first of which is an 'actual' OPC cost associated with nets that have already been routed, and the second of which is an 'estimated' OPC cost associated with the routes that remain to be routed. In the former case, the actual cost of a line is based on the OPC effect caused by the neighboring, already routed lines. In this latter case, the estimated OPC cost is taken as a worst case estimation, by assuming that a line segment will be fully surrounded by adjacent lines when routing is complete. The rule-based approach assumes that the OPC cost for a line is proportional to its length and width, by considering the likely placement of OPC features such as hammerheads at the line ends, and bias features on long line edges.

Some embodiments use a trained OPC-process digital twin to predict the actual OPC features that will be inserted for a given routing solution. These embodiments move from a simple rule-based approach to something that is more OPC-model-based. In this case however, rather than being a physics-based model, the model now is a trained convolutional neural network, i.e., a network which has been trained to produce edge-based OPC features such as line biases, hammerheads and the like as shown in FIG. 5 that was described above.

This model runs with a rasterized image representing the route candidate solution and immediate neighborhoods as input, and produces a raster image representing what the OPC tool would produce in terms of features as output. In some embodiments, the OPC digital twin is trained to produce curvilinear OPC features and SRAFs, such as those that would be produced by an ILT-based OPC tool. In some embodiments, a cost function is encoded that is based on a measurement of difference between the input image and the output image. The more 'different' the output (OPC-corrected) image is from the input (route-candidate image), the higher is the OPC cost associated with the route. This difference in some embodiments expresses the degree of difficulty in performing a subsequent OPC operations after physical design (e.g., after the routing). Hence, by selecting routing solutions with lower expected OPC costs, the router can ensure that the subsequent OPC operation will be easier.

Figure 30:
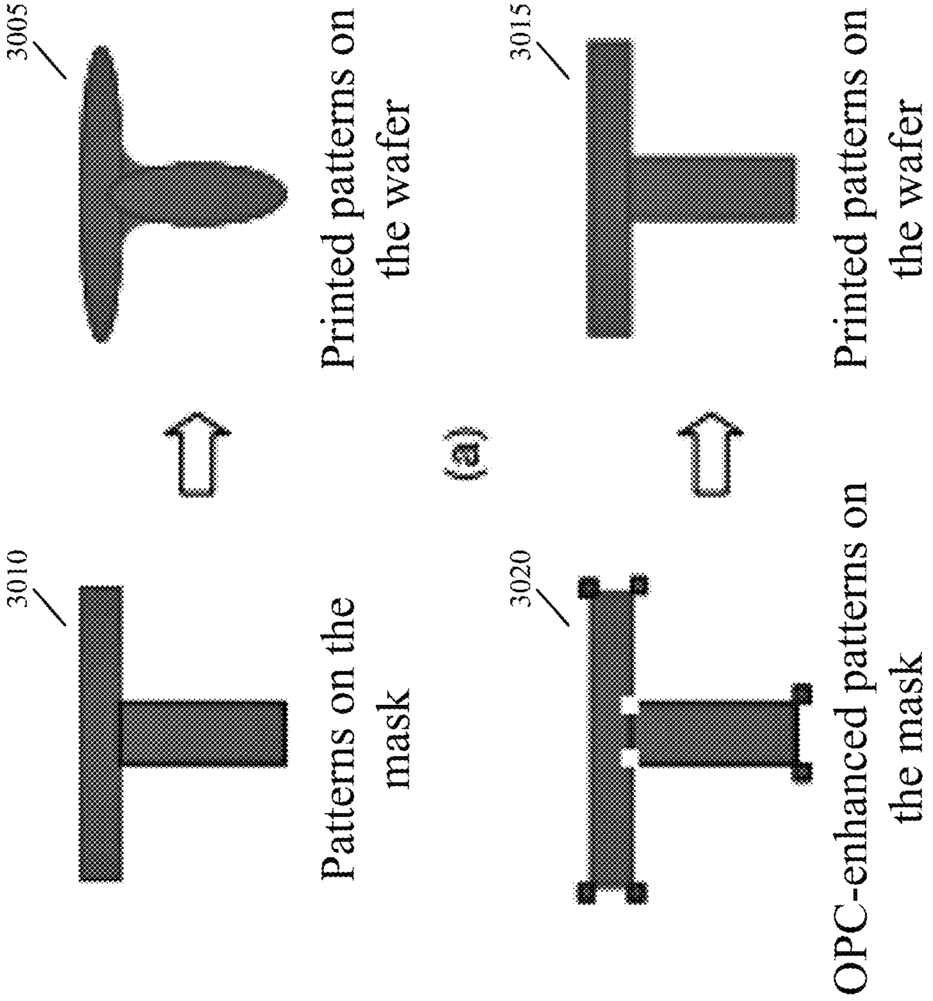
FIG. 30 illustrates examples of mask patterns without OPC and with (edge-based) OPC.

FIG. 30 illustrates examples of mask patterns without OPC and with edge-based OPC. The top half of this image shows the printed patterns 3005 that result from a non-OPC enhanced T-shaped pattern 3010 on the mask, while the bottom half of this image shows the printed patterns 3015 that result from the OPC-enhanced T-shaped pattern 3020 on the mask. The 'difference' between the two images representing the non-OPC-enhanced pattern 3010 and the OPC-enhanced pattern 3020 is encoded into the OPC cost function in some embodiments. The figure also illustrates improvement in the printability of the patterns by presenting on its right-side the degraded printed pattern 3005 that is produced from the non-OPC-enhanced pattern 3010 near the more T-shaped printed pattern 3015 that is produced from the OPC-enhanced pattern 3020.

In some embodiments, the output cost is determined by a post-processing operation given the pre- and post-OPC images (as produced by, for example, a fully convolutional neural network) as input. In some embodiments, the difference function is based on image processing difference operations, such as cross correlation, structural similarity, peak signal to noise ratio and the like, or other pixel-based difference functions are employed (such as intersection over union IOU, i.e., the Jacquard Index). Under this approach, the fully convolutional neural network is trained with image pairs with the input images being pre-OPC route candidate images, and the output images being post-OPC-corrected images, obtained by rasterizing the outputs of an OPC tool. A post processing operation then computes the OPC cost by analyzing the output OPC-corrected images. The router in some embodiments then uses this post-processing computed OPC cost in its routing optimization process, e.g., along with wirelength minimization and/or congestion reduction processes.

In other embodiments, the OPC cost is directly predicted by the neural network, for example by use of a standard convolutional neural network with a convolutional base and followed by a dense or fully connected output with a linear final activation function, acting as a regressor. Under this approach, the convolutional neural network is trained with (X,Y) data pairs where the inputs X are pre-OPC route candidate images, and the outputs Y are scalar values representing an OPC cost. The ground truth Y OPC cost values used to train the model are obtained by running an OPC tool and computing the cost, e.g., via some kind of difference function when producing the training data. During inference, the router in some embodiments uses the OPC cost output from the digital twin MTN in its routing optimization process (e.g., along with wirelength minimization and/or congestion reduction processes). By including cost function components related to a more accurate model-based OPC, the router is guided to produce a more OPC-friendly routing solution.

Figure 31:
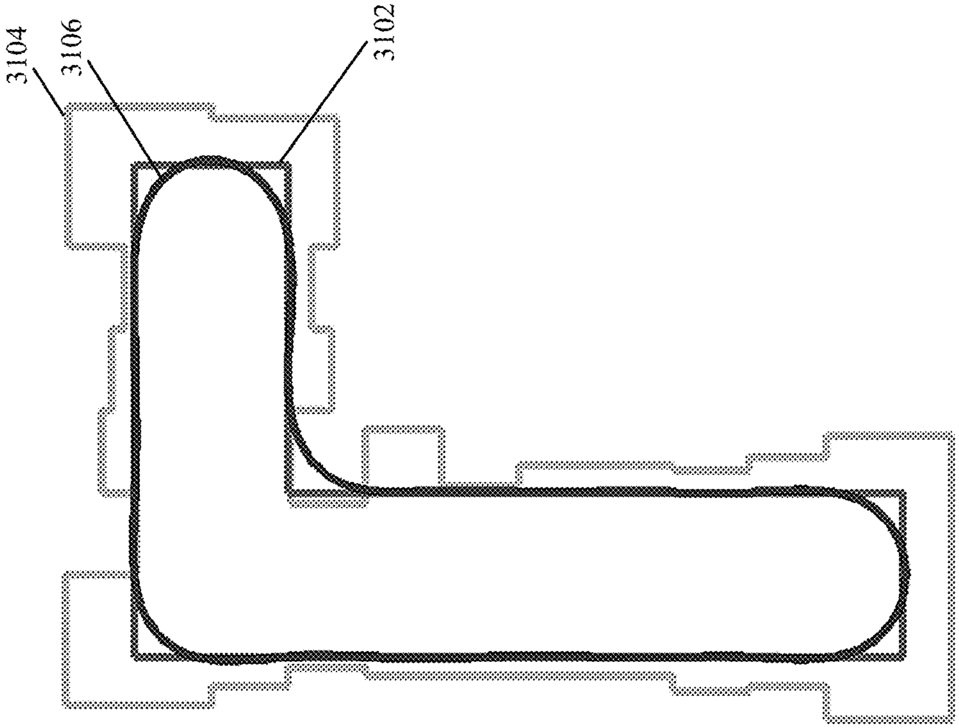
FIG. 31 illustrates an example of an optical proximity correction.

FIG. 31 illustrates another example of OPC corrected image. The F-like rectilinear shape 3102 (displayed in a first color, e.g., blue) is what a chip designer would like printed on the wafer. The shape after applying optical proximity correction 3104 is displayed in a second color (e.g., green) with the jagged edges. The curved contour 3106 (displayed in a third color, e.g., red) is how the shape actually prints, quite close to the desired F-like target. This form of OPC has been successfully applied at small geometry processes, but has not been effective for today's smallest, nanometer scale processes.

During routing, some embodiments use a digital twin MTN to perform edge-based OPC to quickly produce digital layout component shapes with 'jagged' edges (referred to below as 'jagged' output images). Given a desired image (F-like rectilinear shape 3102) as input, the digital twin MTN produces the OPC-corrected shape 3104 with the jagged edges. In some embodiments, the edge-based OPC digital twin is in the form of a neural network, such as a fully convolutional network. The network is trained by exposing it to a large number of X, Y samples, where the X values are images corresponding to the desired-to-be-manufactured shapes, and the Y values are the corresponding 'jagged' shapes determined by one of the existing edge-based OPC tool. The OPC shapes produced by the edge-based OPC tool will typically include hammerheads, serifs, and line bias features (such as those shown in the above-described FIG. 5), which modify the edges/corners of the originally drawn layout shapes.

In some embodiments, a post-processing operation is performed on the jagged output images produced by the digital twin MTN that is used during routing to produce OPC-corrected jagged edge shapes for assessing the quality of one or more routes contained in a routing solution for one or more nets. This post-processing operation quantifies an OPC cost that the router can then use to assess or re-assess the routes in its routing solution, as mentioned above. One post-processing operation in some embodiments quantifies the complexity level of an OPC-corrected jagged edge shape by counting the number of edges in the shape, with the higher edge number indicative of a higher OPC complexity score.

In some embodiments, the edge-based OPC solution produced by the digital twin does not need to be perfect, because in these embodiments the primary use of the digital-twin provided solution is in computing an OPC cost to be used during optimization within an OPC-aware detailed router. As long as the digital-twin provided solution is sufficiently accurate to be used to compute an OPC cost, it is acceptable. As previously mentioned, in some embodiments, the OPC cost is related to the difference between the pre-OPC and post-OPC images, e.g., a 'difference' figure computed by signal processing functions such as cross correlation, structural similarity, peak signal to noise ratio and the like, or other pixel-based difference functions are employed (such as intersection over union IOU, i.e., the Jacquard Index). As long as the 'cost' of the digital-twin produced OPC solution correlates well with the corresponding cost produced by a detailed, computational OPC tool, it benefits the OPC-aware router.

For bleeding edge processes and advanced IC designs, edge-based OPC is insufficient for reliably printing interconnect shapes. Modern approaches to OPC now include ILT (Inverse Lithography Technology), either partially or completely. In order for a router to be OPC-aware in a manner that works for such advanced designs, the OPC digital twin needs to be ILT-based.

Figure 32:
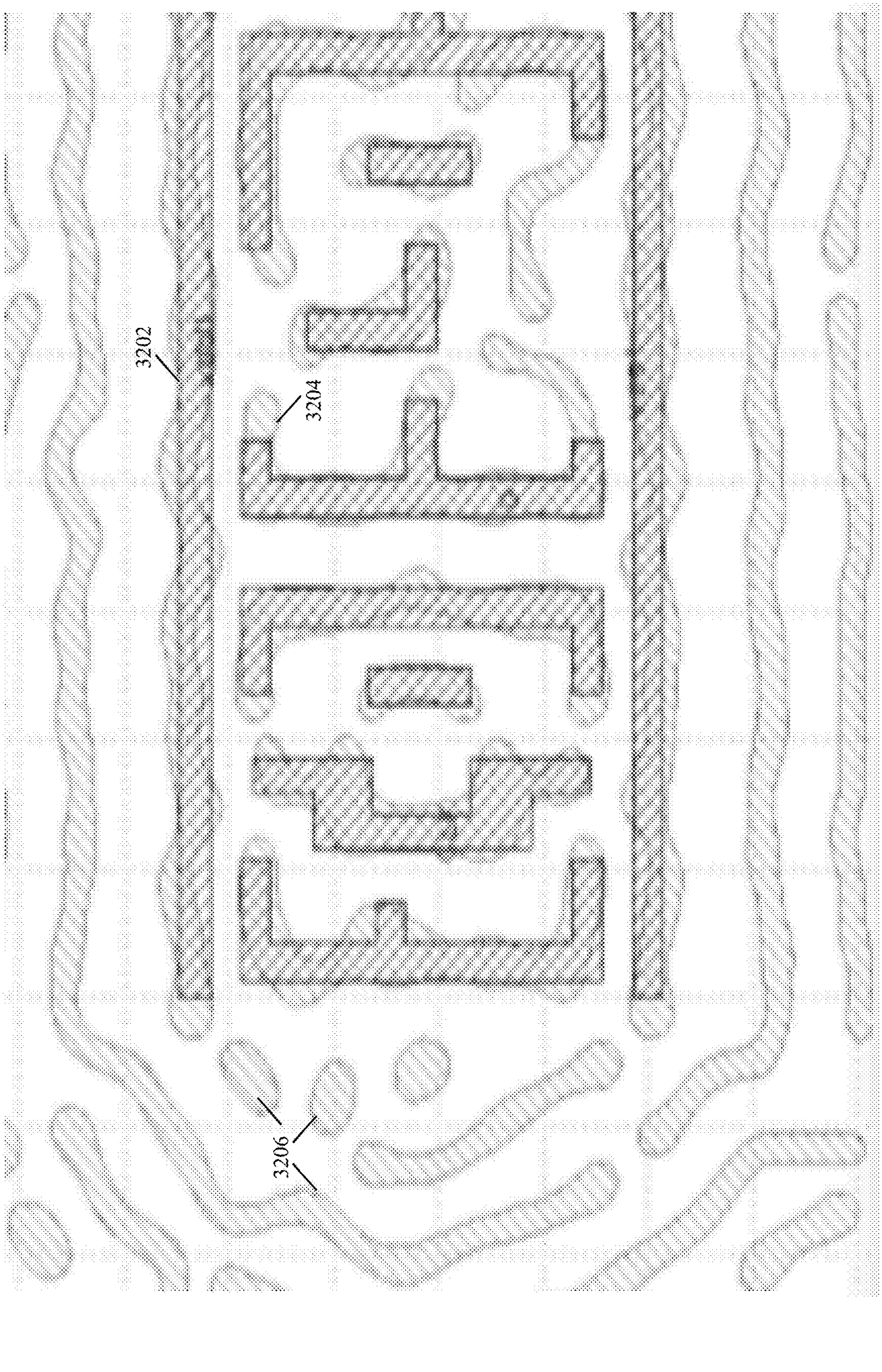
FIG. 32 illustrates an example of an ILT-based OPC output that shows a mask before and after ILT.

FIG. 32 illustrates an example of an ILT-based OPC output that shows a mask before and after ILT. The mask before the ILT has rectilinear shapes 3202, while the mask after ILT has curvilinear shapes 3204. In this example, the rectilinear shapes 3202 that are part of an originally drawn pre-OPC mask are superimposed on the curvilinear masks 3204 produced by the ILT tool. This figure also shows several SRAFs 3206, which are sub-resolution assist features that are inserted in the mask to help generate an eventual IC that has curvilinear interconnect lines that try to match the desired rectilinear shapes 3202 as much as possible.

Like the edge-based OPC digital twin of some embodiments, the ILT-based digital twin of some embodiments is trained via a large number of X, Y samples. Each X value is a set of one or more mask images corresponding to the desired-to-be-manufactured shapes, while each Y value is a set of one or more mask images comprising the corresponding 'curvy' shapes determined by a commercial ILT-based OPC tool, such as TrueMask-ILT.

In other embodiments, each X is the physical design layout shape (e.g., a design layout after a routing operation), while each Y is a set of one or more mask layout shapes that would result after an ILT operation. A router can use the MTN in these embodiments to produce the ILT-optimized masks, which another process during routing can analyze to derive a complexity score/cost for the ILT-optimized masks for the router to use in its route selection process. Still other embodiments train an MTN to take an input physical design layout during routing and directly output an ILT-based cost that expresses a cost for the eventual set of ILT-optimized masks. A router can then use the costs produced by such an MTN during routing to perform its route selection (e.g., to select routes at least partially based on the predicted ILT-cost).

Figure 33:
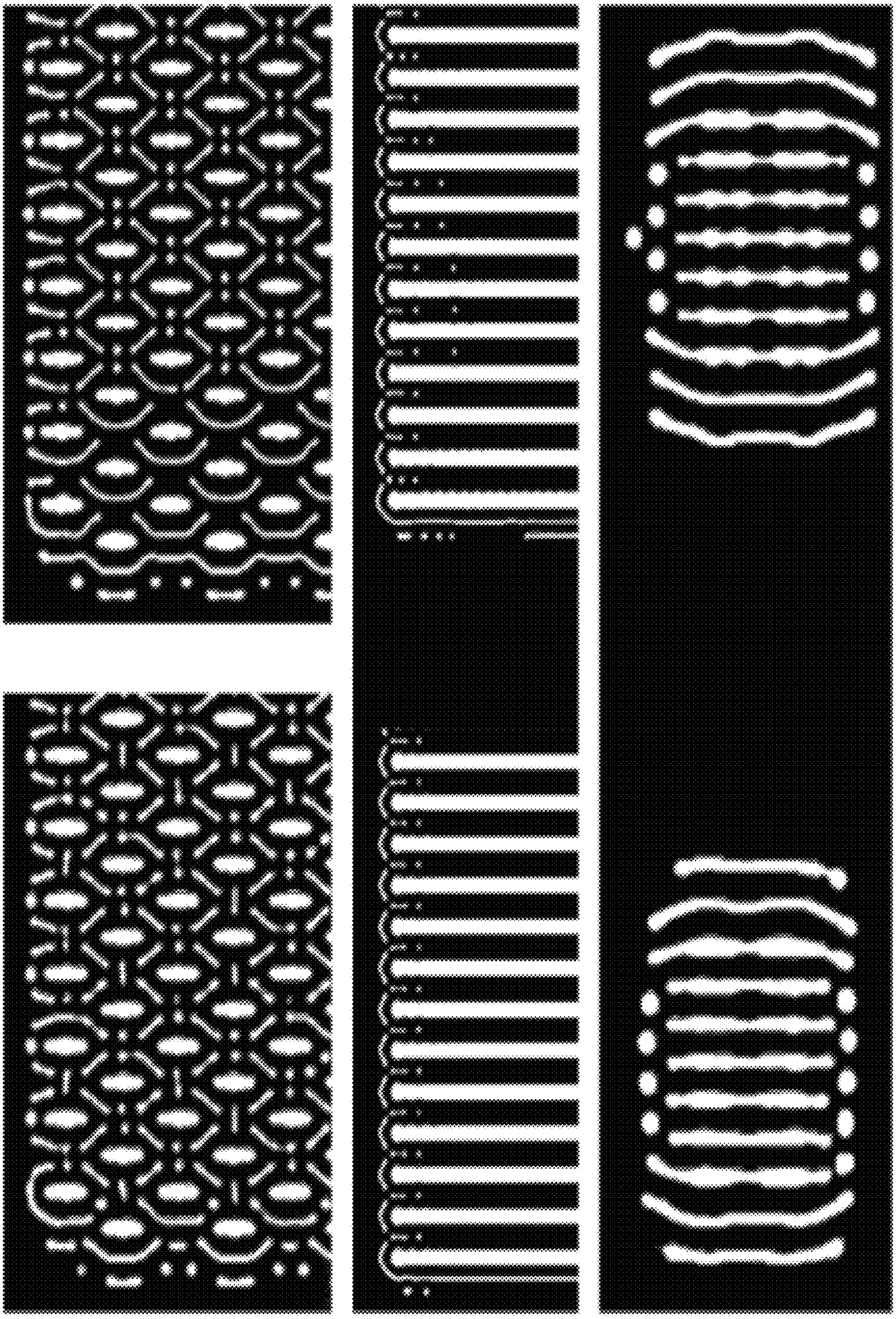
FIG. 33 illustrates examples of images produced by an ILT-based digital twin that shows curvilinear ILT digital twin and the real curvilinear mask pattern generated from an industry leading ILT tool.

FIG. 33 illustrates examples of images produced by an ILT-based digital twin MTN of some embodiments. Specifically, it shows three curvilinear output images of the ILT digital twin MTN of some embodiments on the left next to three real curvilinear mask patterns generated from an industry leading ILT tool on the right. As for the edge-based OPC case, in some embodiments a cost value is associated with the ILT processing, or a routing solution's 'amenability' to ILT-based OPC processing, by comparing the digital-twin produced ILT solution image with the pre-OPC routing candidate solution image provided by the router.

In some embodiments, signal processing functions such as cross correlation, structural similarity, peak signal to noise ratio and the like, or other pixel-based difference functions (such as intersection over union IOU, i.e., the Jacquard Index) are employed to compute the ILT 'cost'. The more different the digital-twin-produced ILT image from the router-produced candidate solution image, the more ILT-'unfriendly' it tends to be. As for the edge-based OPC case, the digital-twin-produced ILT image does not have to be perfect, but close enough to the corresponding image produced by an ILT tool for the costs to be well correlated.

To train an MTN to directly produce the ILT cost, some embodiments train an MTN or a traditional ILT processing tool to first generate the set of ILT-optimized mask images for each physical design input layout shape X, then generate the cost of the set of ILT-optimized mask images, and then use this cost as the known output Y for the known input X. Using numerous such known input/output pairs X, Y, these embodiments train the MTN to directly output an ILT-based cost for each routing solution that the router provides the MTN during routing.

Figure 34:
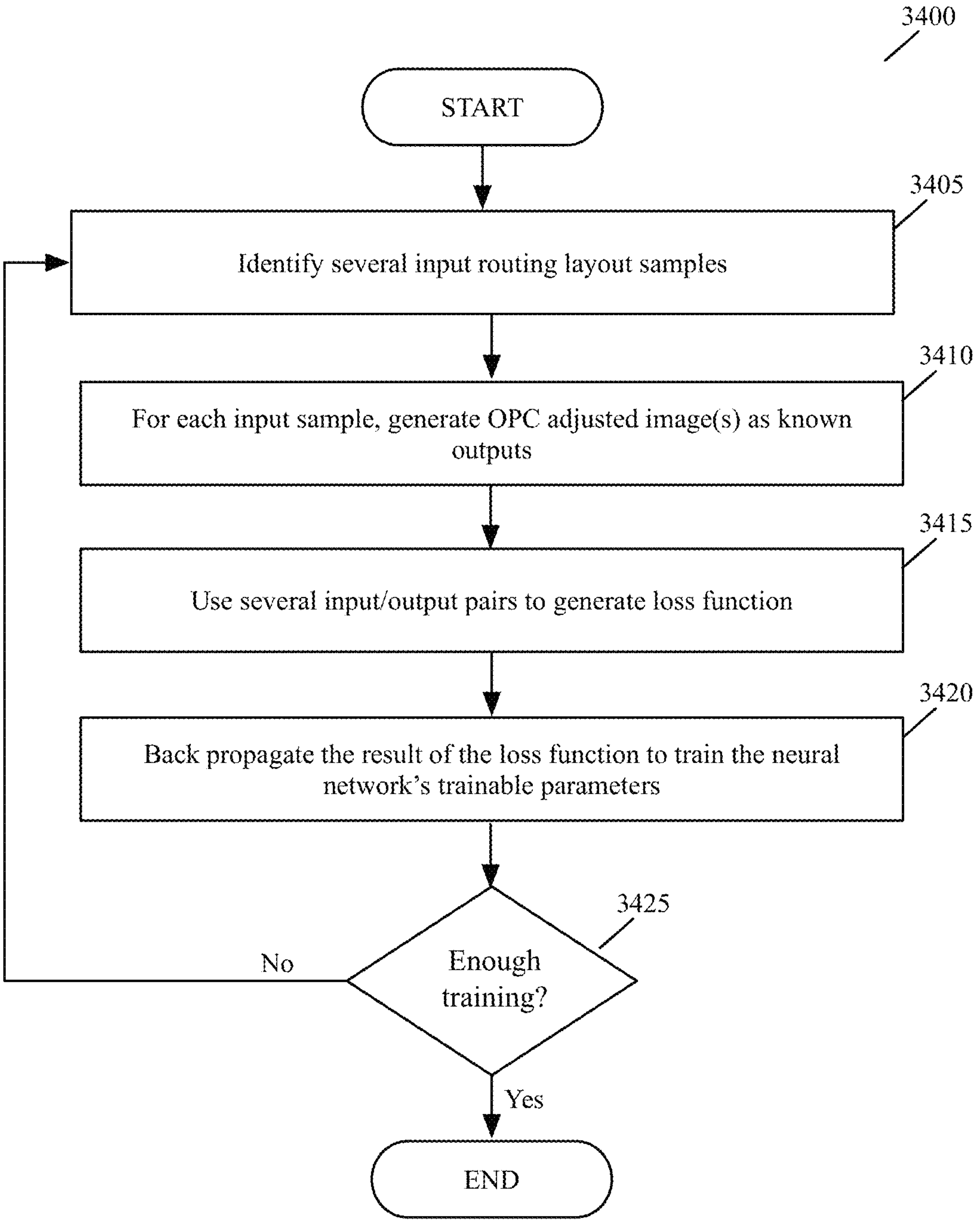
FIG. 34 illustrates a process for training a neural network to perform an OPC operation to produce OPC-adjusted images for a routing solution in some embodiments.

FIG. 34 illustrates a process 3400 for training a neural network to perform an OPC operation to produce OPC-adjusted images for a routing solution in some embodiments. During routing, a router can use this neural network to produce OPC-adjusted images for which the router or another process computes a cost that the router can account for in its route-selection operation. As shown, the process 3400 initially identifies (at 3405) several input IC design layout samples, e.g., by extracting these samples from a previously defined IC design. In addition to including one or more routes, each input sample can include pins, vias and/or obstacles about which the routes and vias have to be defined. Each input sample in some embodiments includes one or more images of one or more layers of wiring and interconnects.

Each input sample serves as the known input sample that is used to train the OPC-adjusting MTN. At 3410, the process 3400 then generates the known output for each input sample. To generate this known output, the process 3400 runs (at 3410) the input sample through a traditional sequence of operations that starts after the routing operation and ends with the OPC mask generation process to produce the corresponding output sample with the corresponding OPC shapes. To perform these operations efficiently for a large number of input/output pairs, the process 3400 in some embodiments performs these operations for a large input physical design, and then extracts each input sample from the large input physical design and identifies the output sample for each extracted input sample from the resulting OPC output. Like the input samples, the output samples generated at 3410 in some embodiments may be single layer samples or multi-layer samples (also called multi-channel outputs).

Next, at 3415, the process 3400 uses the input samples identified at 3405 and their corresponding output samples generated at 3410, to train the OPC-adjusting MTN. To train the neural network, some embodiments feed each known input sample through the neural network to generate an output, and then compare this generated output to the known output of the input to identify a set of one or more error values. The error values for a group of known inputs/outputs are then used to compute a loss function, which is then back propagated (at 3420) through the neural network to train the configurable parameters (e.g., the weight values) of the neural network. In some embodiments, the MTN receives (at 3415) each input sample defined in the pixel domain.

At 3425, the process determines whether it has sufficiently trained the OPC-adjusting MTN. If not, the process returns to 3405 to continue its training operations. Otherwise, the process ends. Once trained by processing a large number of known inputs/outputs, the neural network can then be used to facilitate routing operations of some embodiments by producing OPC-adjusted images for a given routing solution identified by a router, so that the router or another process can cost this solution and then use the cost in its route-selection operation (e.g., use this cost as part of its costing function that it optimizes for finding an optimal routing solution).

Figure 35:
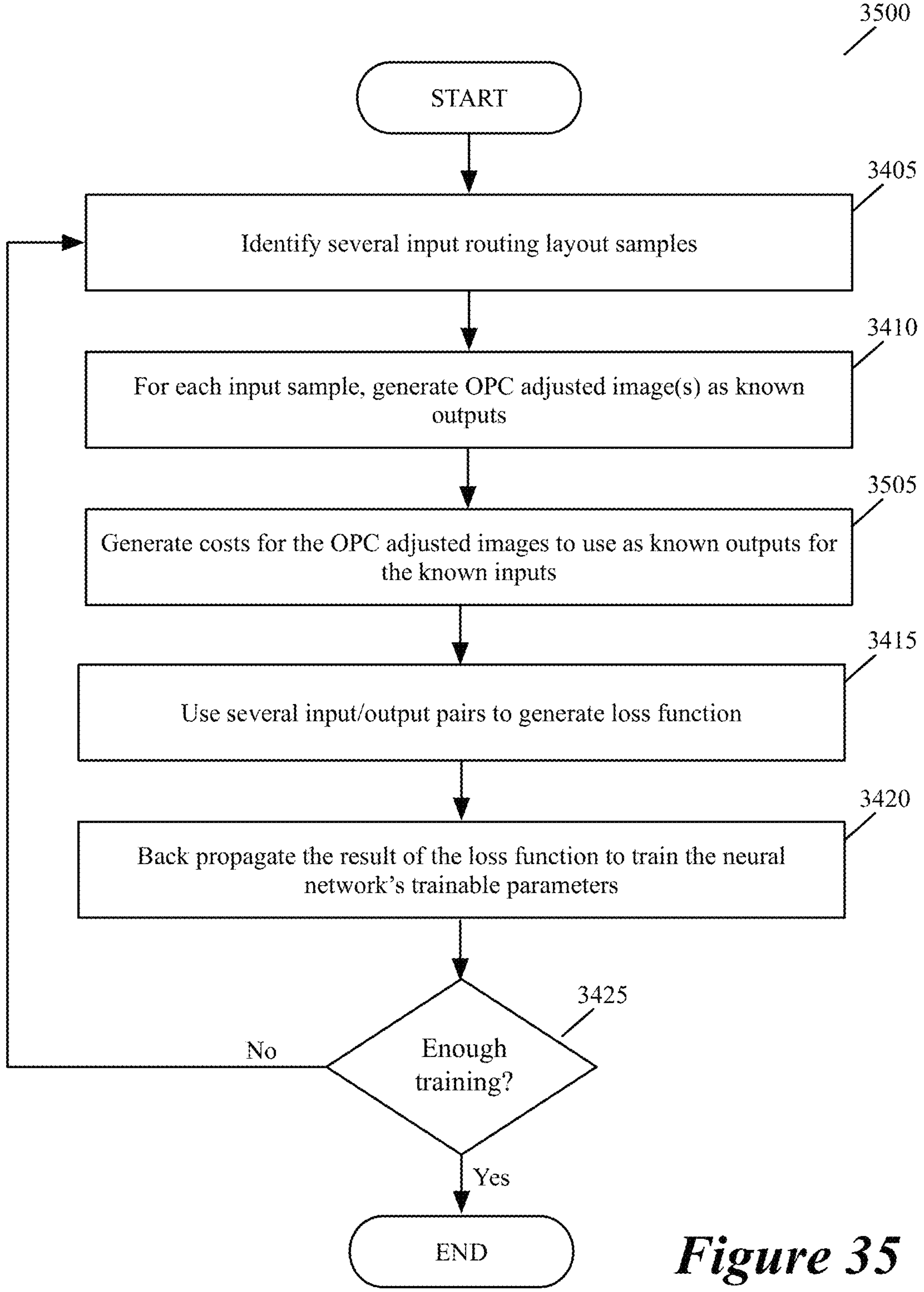
FIG. 35 illustrates a process for training an MTN to directly output an OPC cost for a routing solution.

As mentioned above, some embodiments train an MTN to directly output an OPC cost for a routing solution. FIG. 35 illustrates a process 3500 for training an MTN in such a manner. This process is similar to the process 3400 of FIG. 34, except that it has the additional operation 3505, which produces a cost for each OPC adjusted output that it produces at 3410 for each known input physical design sample, and uses this cost as the known output for the known input physical design sample during the loss function generation operation 3415. By using a large number of such known inputs/outputs (i.e., known physical design layout input portions along with the known OPC cost of these input portions) to train a neural network, the neural network can then be used to facilitate routing operations of some embodiments by producing an estimated OPC-cost for a given routing solution identified by a router, so that the router can then use this cost in its route-selection operation (e.g., use this cost as part of its costing function that it optimizes for finding an optimal routing solution).

Figure 36:
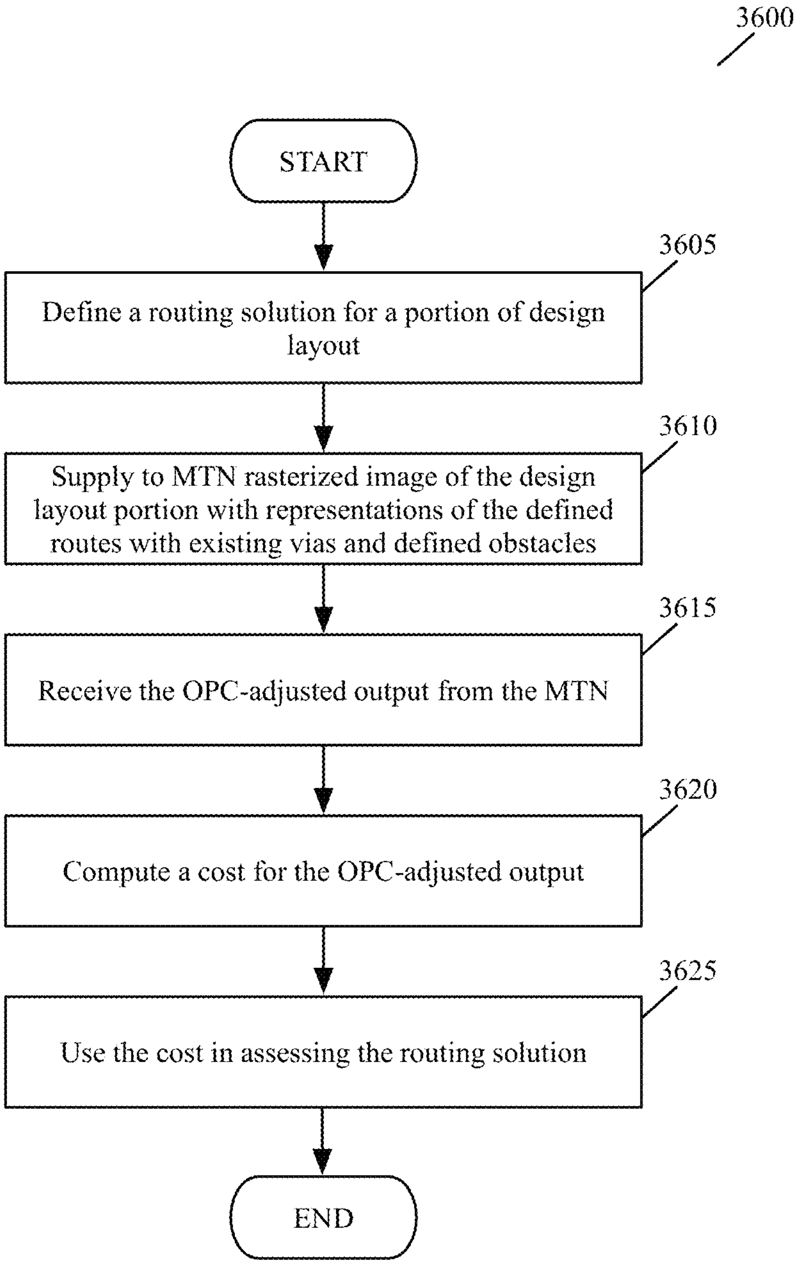
FIG. 36 illustrates a process that a router uses during routing in some embodiments to account for OPC costs in its route selection operation.

FIG. 36 illustrates a process 3600 that a router uses during routing in some embodiments to account for OPC costs in its route selection operation. The process 3600 uses a digital twin MTN to perform a quick OPC operation to produce OPC-adjusted component shapes, e.g., shapes with 'jagged' edges. In some embodiments, a router uses the process 3600 for each route that it defines for each net, while in other embodiments, the router uses the process 3600 for a group of routes that it defines for a group of nets (e.g., as part of a rip-up-and-reroute operation).

As shown, this process starts by a router defining (at 3605) one or more routes for one or more nets in a portion of the IC design layout. To define each route, the process 3600 uses (at 3605) one of the traditional detailed routing processes that are commonly used today to define detailed routes. When the routes are multi-layer routes, the routes include vias. The design layout portion that includes the defined routes also includes in some embodiments pins connected by the routes and/or obstacles about which the routes and vias have to be defined.

At 3610, a rasterized (i.e., pixelated) version of the design layout portion is supplied to the MTN. When the router defines its routes in the contour domain, a rasterization operation has to be performed to transform the contour/geometric definition of the design layout into the pixel-domain in which the shapes in the design layout are represented by actual pixel values, e.g., such as those described above. Each rasterized solution in some embodiments includes one or more images of one or more layers of interconnects and vias.

Next, at 3615, the MTN processes the rasterized design layout portion to produce an OPC-adjusted image that represents a predicted output of the OPC stage for the input routing solution. The OPC shapes produced by the OPC-adjusting MTN can include hammerheads, serifs, and line bias features that modify the edges/corners of the originally drawn layout shapes, such as those illustrated in FIG. 30. OPC shapes can also include edge-based serifs and line-biased modifications, such as those illustrated in FIG. 31. In case of ILT-based OPC, these shapes also include SRAFs, such as those illustrated in FIG. 32.

The OPC-adjusting MTN in some embodiments performs its OPC-adjusting operations based on the predicted manufactured shapes of the input IC design layout that it receives. For example, some embodiments first have another MTN process a rasterized image of a rectilinear design layout output from a rectilinear router to produce another rasterized image of a curvilinear design layout that represents the predicted manufactured IC associated with the input design layout. Examples of such MTNs are described in the above-mentioned and incorporated U.S. patent applications.

In these embodiments, the rasterized image of the curvilinear design is then supplied to the OPC-adjusting MTN, which then processes this curvilinear image to produce its OPC-adjusted image. In other embodiments, the OPC-adjusting MTN is trained to implicitly perform this task in order to provide, for a given input rectilinear design that it receives, its OPC-adjusting recommendations based on the predicted manufactured curvilinear design. In still other embodiments, the OPC-adjusting MTN receives from the router the predicted manufactured curvilinear design as the router produces such designs natively, as further described below.

After the OPC-adjusting MTN generates (at 3615) the OPC-adjusted image(s), the process 3600 computes (at 3620) a cost for OPC-adjusted image(s). In some embodiments, the router that called the OPC-adjusting MTN computes this cost. In other embodiments, the router uses another algorithmic tool or another MTN to compute this cost. The cost that is computed by the post-processing operation (at 3620) to represent the OPC-cost of the input routing solution is used (at 3625) by the router to assess the quality of one or more routes contained in the routing solution for one or more nets. In other words, this cost quantifies the complexity level of the subsequent OPC operation (e.g., the complexity or amount of the features that the OPC operation will have to add), and the router can use this cost in its route-selection operation (e.g., use this cost as part of its costing function that it optimizes for finding an optimal routing solution). In some embodiments, the process 3600 performs the operations 3620 and 3625 on the design layout defined in the contour domain. After 3625, the process 3600 ends.

Figure 37:
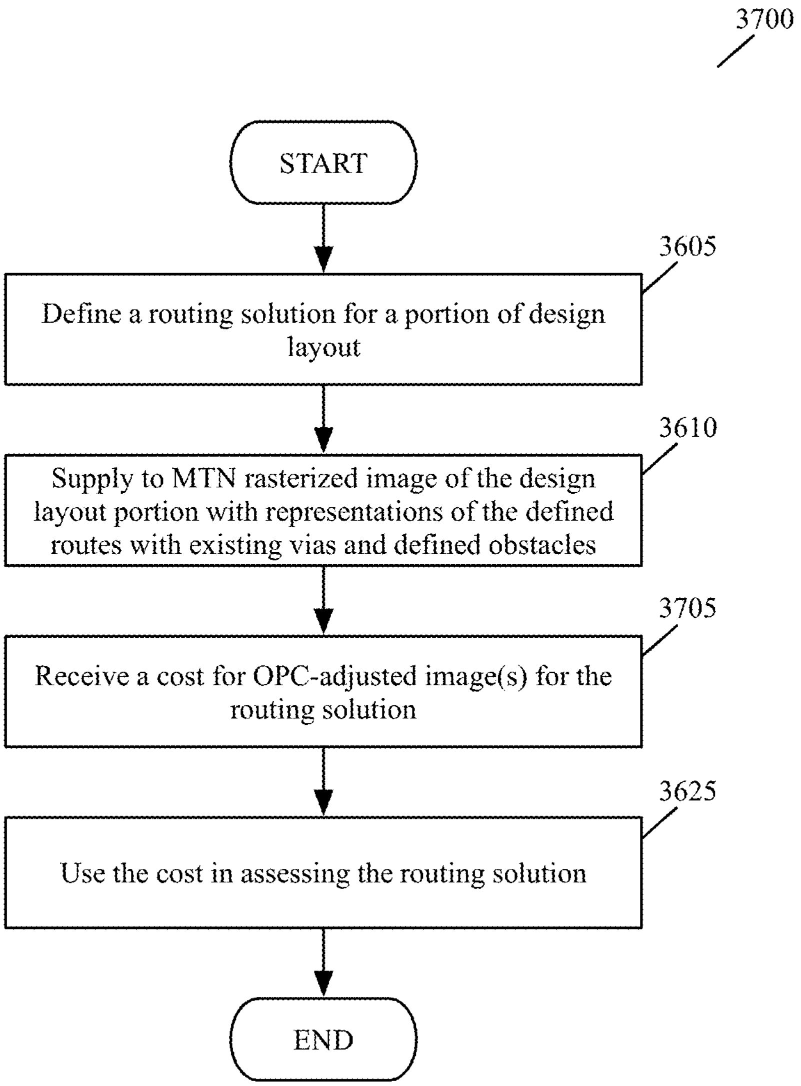
FIG. 37 illustrates a process that a router of some embodiments uses to employ such an MTN during routing.

As mentioned above, some embodiments train an MTN to directly output an OPC cost for a routing solution. FIG. 37 illustrates a process 3700 that a router of some embodiments uses to employ such an MTN during routing. The process 3700 is similar to the process 3600 of FIG. 36, except that instead of operations 3615 and 3620 (that use an MTN to produce an OPC-adjusted image and then compute a cost for this image separately), the process 3700 has the operation 3705, which uses the MTN to directly output the cost of the OPC-adjusted image. Process 3700 then uses this cost in its route selection operation 3625, in the same way as process 3600 uses this cost at 3625 of FIG. 36.

In several of the training or inference examples described above, the input solution is described as a rectilinear input routing solution. However, some embodiments employ curvilinear routers that produce curvilinear routes. For such cases, some embodiments properly train their MTNs to process curvilinear routes accurately. For instance, the training of the MTNs in such embodiments uses curvilinear input routing samples X, with known output samples Y that are computed by other MTNs or by other existing processes (e.g., other wafer simulation processes, via modification processes, OPC processes, ILT processes, etc.) for these curvilinear input routing samples.

Some embodiments use a multilevel process but instead of computing and leveraging OPC costs in the router cost function (e.g., when performing the wirelength minimization), a different type of cost function is used. This new cost function in some embodiments again contains two components, one 'actual' component associated with already-routed nets, and one 'estimated' function associated with yet-to-be-routed nets (e.g., a worst case estimate cost function). However, instead of the cost function being an OPC cost, it is instead taken as a true manufacturability cost. In some embodiments, raster images are produced for a routing solution that includes both actually routed segments, and line segments that are fully surrounded by adjacent lines (which take the place of to-be-routed nets), and used as input to a very different trained neural network such as a front-to-back digital twin.

The outputs of the digital twin MTN in some embodiments are then processed to produce an output cost that relates to manufacturability in terms of printability and/or reliability. Here, the final output cost in some embodiments represents a curvilinear DRC cost associated with the expected as-manufactured interconnect associated with the routing solution.

One simple DRC cost example would be related to the minimum space between two curvilinear manufactured routes. After manufacturing, curvilinear routes with smaller wire spacings below a certain threshold imply poorer manufacturability and a higher likelihood of bridge faults. A component of the DRC cost in some embodiments is then a measurement of the minimum distance between any two such manufactured interconnects.

Another is a cost associated with the minimum width of a manufactured interconnect wire in some embodiments. Excessively narrow manufactured (e.g. those associated with excessive pinching) in some embodiments leads to 'open' circuits either directly after manufacturing, or sometime later after electromigration has occurred in the circuit (a reliability issue). Hence, the DRC cost in some embodiments is related to the minimum width of the manufactured wire segments, taking their inner manufactured contours into account. Accordingly, some embodiments follow the same overall approach as for multilevel full-chip, OPC-aware gridless routing, but instead of being OPC-based, becomes fully manufacturing based, or even reliability based. By including cost function components related to a more stringent, overall manufacturing cost, the router is guided to produce a more manufacturable, and/or more reliable routing solution.

Some have proposed an Edge Placement Error (EPE)-aware wire spreading and rip-up process that is performed in a full-chip, detailed router. The process uses fast lithography simulations to determine the edge placement errors (EPE) associated with manufactured interconnect shapes (e.g., shapes resulting post OPC). The EPE information is then used to perform wire spreading within the router. Under this approach, wires that are too close together so as to optically interfere with each other during manufacturing in a deleterious fashion, are spread further apart by the router. Furthermore, the rip-up and reroute process incorporated within the router is modified to take the EPE information into account. Wires that are again found via the fast lithography simulator to optically interfere with each other during manufacturing, are constrained to be further apart via the introduction of EPE-aware blockages.

This approach suffers from some major deficiencies, however. In order to reduce the use of OPC tools, it relies on the concept of a lithography-simulation-produced, full-chip EPE map, which attempts to pinpoint lithography hotspots (presumably OPC is factored into this step). The full-chip EPE map is only produced once. The EPE's associated with lithography hotspots are then factored into the wire-spreading and blockage insertion steps of the detailed router. Only after EPE-related changes are made, are the corresponding hotspots locally re-simulated. The approach will fail for today's nanometer design processes however, as even very small changes produced by a modern router, for a modern process, need to be fully OPC corrected, and lithographic simulation alone is insufficient. Full OPC, and highly computationally expensive Inverse Lithography Simulation (ILT)-based OPC processes need to be employed for most cases, making the approach intractable within a nanometer geometry router.

Instead of using an EPE-aware wire spreading and rip-up process, the router of some embodiments uses a front-to-back digital twin MTN to perform wire spreading and blockage insertion. Given a routing candidate solution, the digital twin in some embodiments, deployed on modern GPU or TPU hardware, rapidly produces raster images of the manufactured interconnect shapes in the presence of manufacturing variations. This is performed in some embodiments even within the inner loops of the detailed router.

Curvilinear DRC checks in some embodiments are then rapidly performed by a curvilinear DRC checking digital twin and used to determine if the routing is viable/correct from a manufacturability standpoint. Wire spreading, and rip-up and reroute decisions are now made with respect to the output from the digital twins. In some embodiments, blockages are inserted where necessary based on the output from the digital twin(s) (e.g., within those areas where curvilinear DRC errors are found), the offending nets re-routed around those blockages, and the results again verified using the digital twins. Because the digital twins take OPC/ILT into account, the resulting route solution in some embodiments is successfully manufactured using today's manufacturing flows.

Figure 38:
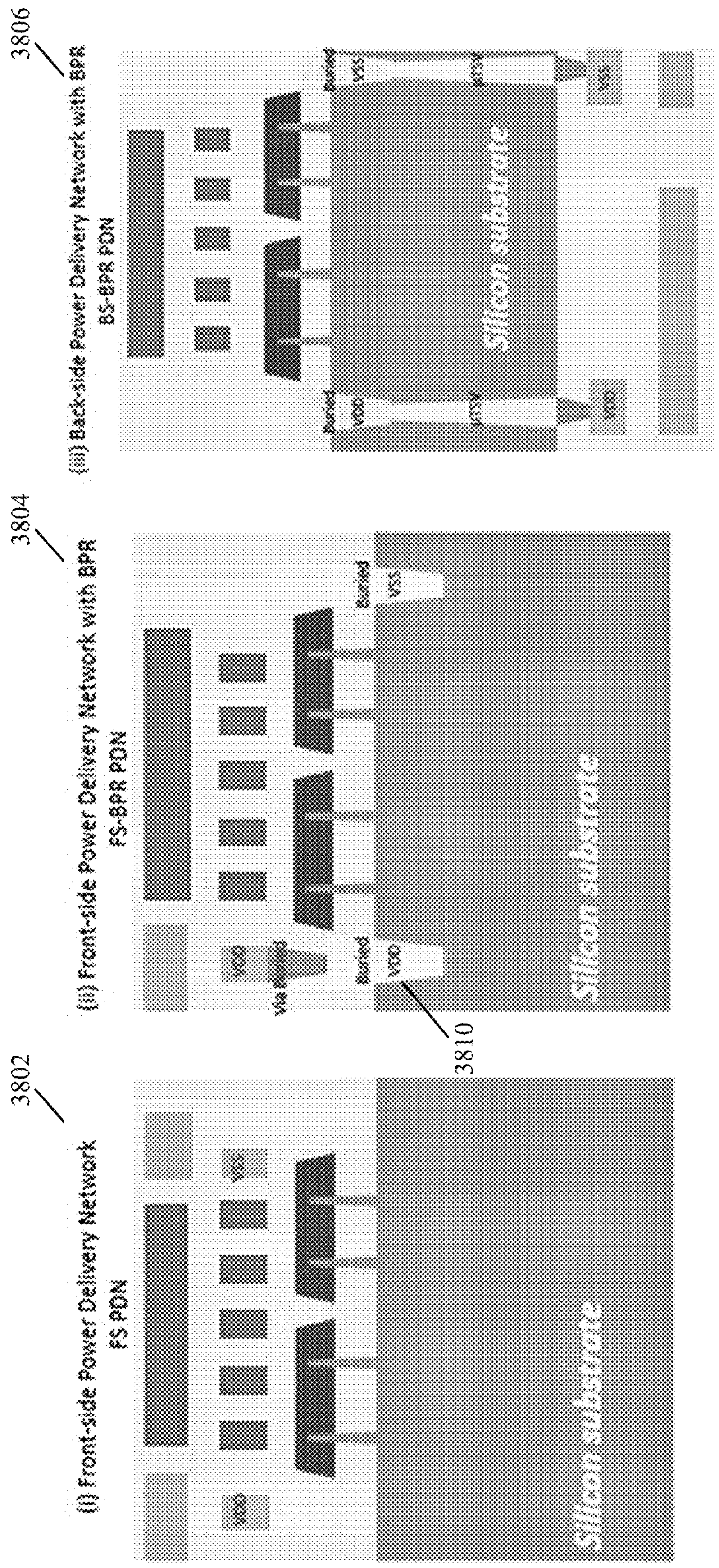
FIG. 38 illustrates examples of a front-side power delivery, a front-side power delivery with buried power rails, and a back-side power delivery.

Newer advances in technology and deep learning bring up even more opportunities for more novel routing approaches leveraging digital twins. FIG. 38 illustrates examples of a front-side power delivery 3802, a front-side power delivery 3804 with buried power rails 3810, and a back-side power delivery 3806. A buried power rail is a power rail found on the semiconductor substrate instead of on a metal layer. The rail itself is constructed to run underneath the active layer where semiconductor components (i.e., transistors and diodes) are found. Back-side delivery delivers power through the 'back-side' of the substrate, via through-silicon vias. Both approaches promise the metal power rails that are typically used to deliver power (e.g., metal 1, metal 2), resulting in new-found freedom for those metal layers for advanced routing techniques.

Instead of using the lower metal layers for power routing, some embodiments re-purpose the lower metal rails (e.g., M1/M2, or M3/M4 etc.) towards another kind of routing. Topological routing is performed on these layers in which 'pins' (device connections) come from below. In some embodiments, these lower layers of metal are allowed to route in more than the horizontal/vertical preferred directions. In some embodiments, the routing angles are not limited to Manhattan directions, but also includes routing at 45 degree angles. In some embodiments, the routing angles are further opened up to allow 30, 60 degree angles, and in some further embodiments, the routing directions are opened up even further, allowing for true any-angle routing. Examples of using the lower wiring layers (e.g., metal layers 3 and 4) for non-preferred direction (NPD) routing is described in U.S. patent application Ser. No. 18/110,332, now published as U.S. Patent Publication 2023/0282635, which is incorporated herein by reference.

As described in this application, the router of some embodiments tries to connect as many nets as possible by just routing on one single layer, in order to minimize via count and overall interconnect resistance. In cases of those nets for which single-layer interconnections (say on metal 1 or 3) are not possible, the router will 'via-up' to the next layer (e.g., metal 2 or 4), and the process is repeated on the next layer, attempting to route as many of the previously un-routed nets as possible on that layer only, using many degrees of freedom in routing directions. In some embodiments, additional layers above the first two are also used. Finally, after performing single-layer NPD routing on some initial number of lower layers (e.g., M1-M3, or M3-M4 etc.), some embodiments use conventional preferred direction (e.g., Manhattan) routers for the remaining metal layers to define routes for the remaining unrouted nets.

In some embodiments, the new router which attempts to route as many pin connections as possible on a single, low layer of interconnect, is free to use multiple degrees of freedom in routing directions, as previously described. In some embodiments, it routes the nets in a 'curvy' or rubber-band like manner to minimize via count, trading off some amount of 'meandering' in a net route to avoid the introduction of a via. The idea is that the additional extra length incurred in such a length increases the resistance and/or capacitance by only a small fraction compared to that of the via that is avoided. In some embodiments, the routing is via the rubber-band routing technique, coupled with the front-to-back digital twin. The rubber-band routing technique finds an approximate solution to the wire route, the results of which are then fine-tuned by the use of the front-to-back digital twin.

In other embodiments, a router exploits eight compass directions (e.g., 0, 45, 90, 135, 180, 225, 270, 315 degree wiring) or a larger number of directions on all layers without the artificial constraint of a preferred direction, providing the benefits of diagonal wiring without the penalty of introducing extra vias. The results of this routing are then fine-tuned by the use of the front-to-back digital twin. The digital twin is used to determine the actual curved manufactured shapes that correspond to the 'ideal' shapes. At this point, in some embodiments, curvilinear design rule checking is run via another digital twin and any remaining manufacturability issues identified. In some embodiments, any routes that remain in violation of the curvilinear design rules are then modified (e.g., by a rip-up and reroute-like process). Should any nets still fail to be routed after this stage, they are considered for routing on the layer above in some embodiments.

In other embodiments, the routes produced via the process above are further refined via an additional novel application of the front-to-back digital twin. The shapes produced by the process above are not just inspected/predicted by the front-to-back digital twin, but in fact the digital-twin-produced curvilinear shapes are then further used to replace (substitute for) one or more of the shapes produced above. The advantage is that unlike the original shapes, the curved shapes are known to be 'more readily manufacturable' by construction (since they have been determined by the digital twin, and are curvilinear).

Curvilinear designs are inherently more manufacturable than designs with 'sharp corners'. In some embodiments, a final curvilinear design rule checking is run via yet another digital twin and identifies any manufacturability issues (e.g., if only some of the routes were 'curvilinear' in the process above, while others (remaining from the rubber band or liquid routers) remain their sharp corners). In some embodiments, any curvilinear routes that remain in violation of the curvilinear design rules are then further modified (e.g., by a rip-up and reroute-like process followed by more front-to-back digital twin processing). Should any nets fail to be cleanly routed after this stage, they are via' d up to the layer above, i.e., deferred to the next layer. The process continues until all available metal layers (assigned to the new flexible routing paradigm described above) are exhausted, or until no nets remain to be routed. From that point upwards, in some embodiments, more conventional routing approaches are deployed. In some embodiments, deep reinforcement learning are used in conjunction with, or to replace, the rubber band routing or liquid routing approach.

Figure 39:
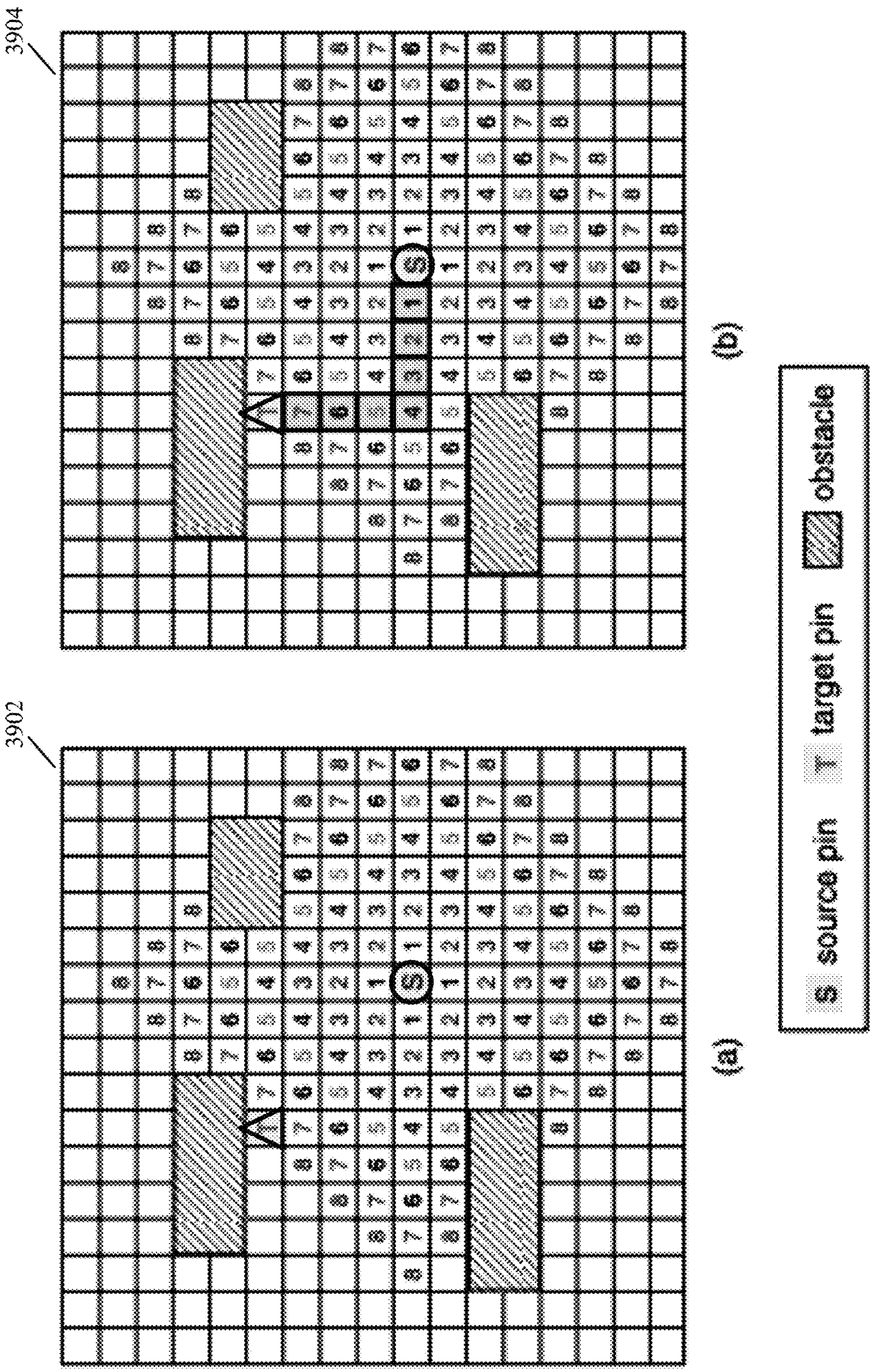
FIG. 39 illustrates an example of a maze-routing process that adopts a two-phase approach to a routing problem.

As mentioned above, graph-based searching techniques are commonly used to identify global or detailed routes. Popular graph-searching techniques include maze processes, line-search processes, and what is known as the A* search process. FIG. 39 illustrates an example of a maze-routing process that adopts a two-phase approach to a routing problem. The first approach (3902) is known as filling, and often employs a 'wave propagation' technique, in which adjacent grid cells, starting from a 'source' cell S (circled in the black-and-white drawings), are progressively labelled one by one until a target node T (displayed within triangles) is reached. Once the target T is reached, a retracing step (3904) is then performed to find the shortest path from T to S, with decreasing labels. If multiple paths are found, the one with the least amount of detours is often chosen in order to minimize the number of bends, or vias. A variety of processes have emerged in terms of the label encoding scheme, the specifics of the search process, and constraining of the search space, in order to improve performance and memory use.

Deep reinforcement learning (deep RL) is a subfield of machine learning that combines reinforcement learning (RL) and deep learning. Reinforcement learning is a process in which an agent learns to make decisions through trial and error. This problem is often modeled mathematically as a Markov decision process (MDP), where an agent at every timestep is in a state, s, takes action, a, receives a scalar reward and transitions to the next state, s', according to environment dynamics p(s'|s,a). The agent attempts to learn a policy π(a|s) or map from observations to actions, in order to maximize its returns (expected sum of rewards). In reinforcement learning (as opposed to optimal control) the process only has access to the dynamics p(s'|s,a) through sampling.

RL considers the problem of a computational agent learning to make decisions by trial and error. Deep RL incorporates deep learning into the solution, allowing agents to make decisions from unstructured input data without manual engineering of the state space. Deep RL processes are able to take in very large inputs (e.g., every pixel rendered to the screen in a video game) and decide what actions to perform to optimize an objective (e.g., maximizing the game score). Deep reinforcement learning has been used for a diverse set of applications including but not limited to robotics, video games, natural language processing, computer vision, education, transportation, finance and healthcare.

In some embodiments, the action space is set to a set of 6 integer valued actions, representing 4 directional changes (N,S,E,W), and two layer changes, i.e., via up (U), via down (D). These correspond to routing decisions, where the 'head' of the net being routed is advanced in order to maximize the expected long term reward. In some embodiments, a deep-Q network is utilized to solve two-pin routing problems in a serial manner. The deep-Q network in some embodiments is a convolutional network.

In some embodiments, the state space for using deep reinforcement learning in the routing area include pixel images representative of the routing problem. In some embodiments, routing is proceeded in a serial manner. The state space images in some embodiments are multichannel images, with one set of channels reserved for the position of the pair of pins which are to be routed, and additional channels reserved for the pins for other nets. In some embodiments, additional channels are assigned for each metal layer in the interconnect stack, reflecting the current routing state. To emulate a grid-based routing scenario, the pixels correspond to routing grid locations. A pixel is either occupied (pixel value of 1), or it is not (pixel value of 0).

A routing grid cell in some embodiments is represented by multiple pixels (e.g., 4 pixels, 16 pixels, etc.). In some embodiments, another set of image channels (one for each metal layer available) are reserved to show the current position/head of the net being routed. Only one of these channels will have a pixel set to 1, indicating the current routing position (encoding the current metal layer, and the current (X,Y) location in terms of grid coordinates within that layer). Initially, all metal layer pixels are set to zero (nothing is routed), except for where there are known routing blockages, in which case the corresponding pixels are set to 1. As the routing/learning proceeds, empty pixels in the state space are 'filled in' on the appropriate layers as the net being routed proceeds from the source pin to the target pin. It will be appreciated by those of ordinary skill in the art that alternative encodings are used in some embodiments.

In some embodiments, the agent is guided to route a net via feedback from a reward function at each step. The reward function is defined as a function of the action, a, selected by the agent, and the next state, s'. In some embodiments, a large reward value is returned if the next state, s', corresponds to the target pin. In some embodiments, a small negative reward is returned otherwise, hence guiding the agent to find the shortest path from the source to the target pin, in order to minimize the pain accumulated via negative rewards. In some embodiments, additional negative reward components are assigned if nets are routed too close to each other for long segments, reflective of the increased capacitance and crosstalk between the nets. By incorporating either or both of front-to-back and capacitance-extraction digital twins into the reward computations for a DRL (deep reinforcement learning) approach to detailed routing, in some embodiments the DRL agent are made extremely crosstalk-aware and guided to produce finely tuned detailed routing solutions that minimize crosstalk.

In some embodiments, further large negative reward components are assigned when layer change actions (via up, via down) are chosen. These strongly guide the agent to minimize the via count, and hence overall resistance. In some embodiments, a maximum number of steps are allowed, after which the environment determines that the routing game is 'done'. The maximum number of steps will relate to the problem size, i.e., the resolution of the routing grid and the size of the routing area.

In other embodiments, the reward function and/or state space images are made manufacturing-aware. In some embodiments, a front-to-back digital twin is employed to take the images corresponding to the 'ideal' (rectilinear) nets produced by the agent, from which the as-manufactured curvilinear images are then predicted. In some embodiments, the curvilinear 'as manufactured' images for each metal layer are included in the state space images as additional channels. This increases the dimensionality of the state space somewhat, but also allows the agent to learn to route in a manufacturing-aware fashion by being aware of the impact that manufacturing has on nets and how neighboring nets affect each other. In some embodiments, the reward function are further enriched in a negative manner to 'punish' actions that result in excessive pinching (inner contours of manufactured nets are two narrow) or excessive bridging likelihood (outer contours of manufactured nets are too close). In some embodiments, the speed with which such 'as manufactured' images are produced is therefore crucial to the operation of the deep reinforcement learning scheme, hence the approach is tractable when convolutional neural networks are used to rapidly inference the manufactured contours.

The above sequential net routing via RL description was with respect to a single-agent, or 'vanilla' reinforcement learning approach. In this context, a single agent seeks to accomplish a goal through maximizing total rewards. This can still suffer from the net ordering problems described above. In other embodiments, a multi-agent reinforcement learning approach is used. Multi-agent reinforcement learning allows multiple agents to interact in a common environment. That is, when these agents interact with the environment and one another, depending on the specific process, they are observed to collaborate, coordinate, compete, or collectively learn to accomplish a particular task. When applied to the task of routing, the MARL approach provides a concurrent routing solution, which is less sensitive to the net ordering problems. In some embodiments, the agents are programmed to act in a purely cooperative manner, with all agents working toward the same collective goal of finishing the routing with minimum overall wire length, minimum DRCs, etc. In other embodiments, the agents are programmed to act in a more competitive manner, but still seeking to complete the same overall goal. In some embodiments, a hybrid scheme is used, for example, agents working in teams, where the agents in a team seek to collaborate, and multiple teams act in a competitive manner against other teams.

In some embodiments taking the MARL approach, multiple DQN's are used (for example, one for each agent). In other embodiments, each agent is using the same policy, so a single DQN is shared across the various agents. Each agent however makes its own decisions, independent of the others. This approach is known as independent Q-learning (IL-Q), and works reasonably well in some scenarios. However, this IL-Q approach misses the fact that interactions between agents affect the decision making of each agent. For example, two agents in some embodiments make independent decisions that result in the routing of two nets too close to each other, increasing the capacitance between the nets, or the likelihood of a bridging fault, for example, depending to a degree on the surrounding context.

In a single-agent setting, the environment is stationary, meaning that the distribution of the rewards in a given state is always essentially the same. This stationarity is violated in the multi-agent setting however, since the rewards received by an individual agent will vary not only based on its own actions, but also on those of the other agents. The use of IL-Q in such nonstationary environments will significantly impair convergence. This could be improved upon by encoding a joint-action space across multiple agents. In other words, instead of returning a one-hot action vector of size 6 (N,W,E,W,U,D) for each agent, a 6^N (6 to the power of N) length vector is constructed, where N is the number of agents participating in the MARL scheme. Unfortunately, this vector grows exponentially in the number of agents, i.e., the number of nets being concurrently routed. For example, if there are 100 nets being routed, the vector would be of length 6^20, which is a large number.

In some embodiments therefore, the full joint-action space is approximated, by recognizing that only agents in close proximity to each other will affect each other. (Nets routed close together affect capacitance far more than nets routed far from each other. Likewise, nets routed close to each other will suffer more from pinching or bridging effects than nets routed far from each other). Hence, in some embodiments, neighborhood effects is approximated by only modeling the joining actions of agents (nets) that are within the same optical neighborhood. The full joint-action space is divided into a set of overlapping sub-spaces, and only the Q-values are computed for these much smaller subspaces. For example, in some embodiments, if only the immediate left and right lateral neighbors for a net being routed in the vertical preferred direction is considered, the approximated joint action space is of length 6^3=216, which is tractable, rather than of length 6^100 (intractable).

For capacitance calculations in particular, it is known in some embodiments that nets beyond the immediate east and west neighbors (for vertically routed layers) are essentially ignored. Likewise, nets whose routing heads are beyond the immediate north and south neighbors for horizontally routed layers are ignored in some embodiments. Hence, when computing the joint-action space for agent 1 (i.e., the agent routing net 1), the 2 same-layer agents (nets) whose routing heads are currently closest to those of agent 1 are found and build a joint-action one-hot vector for these three agents in total. For each of the 100 agents (one per net being concurrently routed), the subspace for these joint-action vectors is built and use them to compute the Q-values for each agent. Since coupling capacitances are far more dominant than crossover/crossunder capacitances in nanometer-geometry processes, agents whose routing heads are currently on metal layers different from the head of the net under consideration are also ignored in some embodiments. Further, routes on metal layers higher or lower than the layer being manufactured have no lithographic impact, due to being manufactured during different process steps. Finally, the agents use those Q-values computed from the reduced-space joint-action vectors as for those Q-values computed in the single-agent case.

Figure 40:
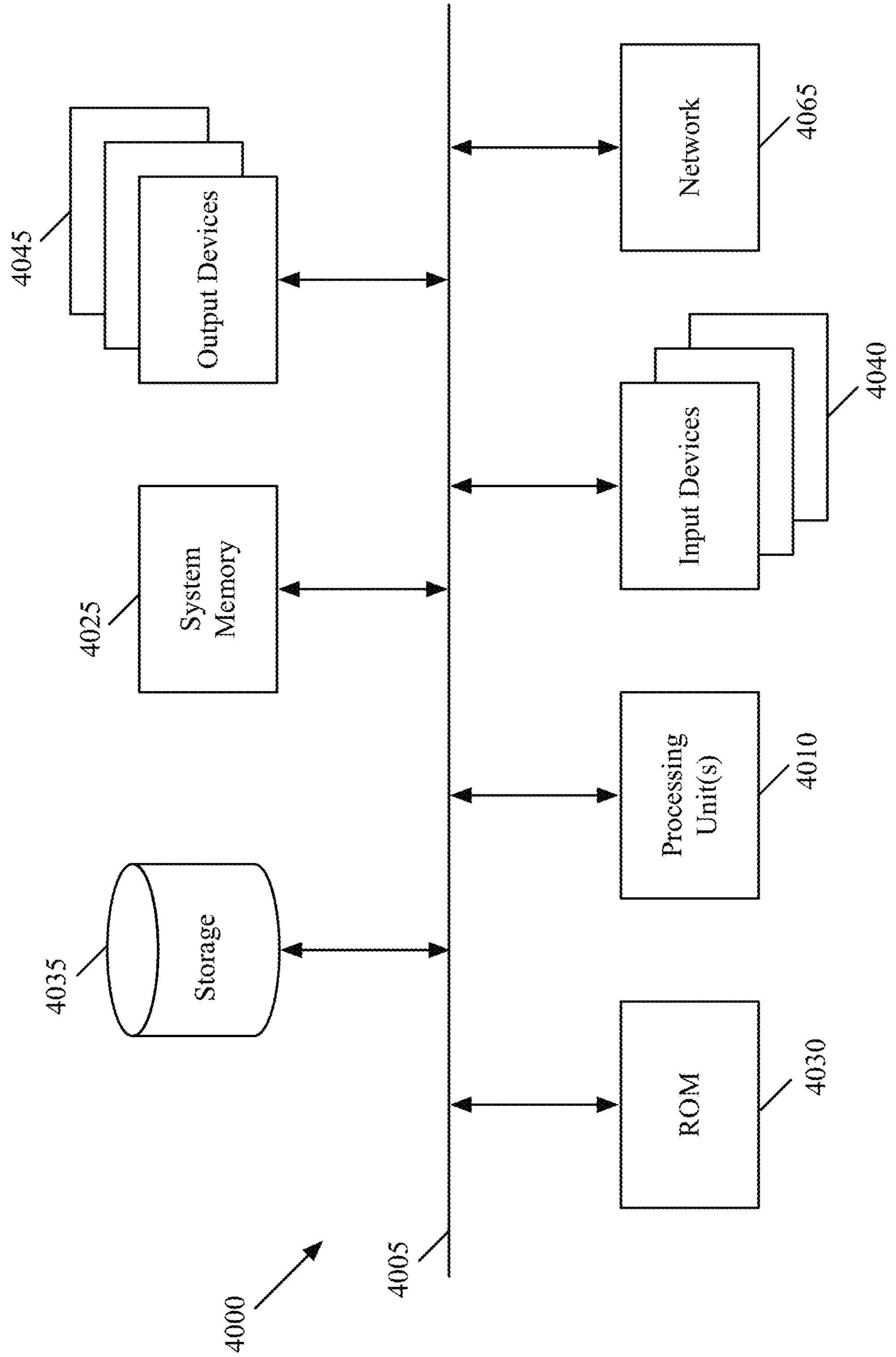
FIG. 40 conceptually illustrates an electronic system with which some embodiments of the invention are implemented.

FIG. 40 conceptually illustrates an electronic system 4000 with which some embodiments of the invention are implemented. The electronic system 4000 may be a computer (e.g., a desktop computer, personal computer, tablet computer, server computer, mainframe, a blade computer etc.), phone, PDA, or any other sort of electronic device. As shown, the electronic system includes various types of computer readable media and interfaces for various other types of computer readable media. Specifically, the electronic system 4000 includes a bus 4005, processing unit(s) 4010, a system memory 4025, a read-only memory 4030, a permanent storage device 4035, input devices 4040, and output devices 4045.

The bus 4005 collectively represents all system, peripheral, and chipset buses that communicatively connect the numerous internal devices of the electronic system 4000. For instance, the bus 4005 communicatively connects the processing unit(s) 4010 with the read-only memory (ROM) 4030, the system memory 4025, and the permanent storage device 4035. From these various memory units, the processing unit(s) 4010 retrieve instructions to execute and data to process in order to execute the processes of the invention. The processing unit(s) may be a single processor or a multi-core processor in different embodiments.

The ROM 4030 stores static data and instructions that are needed by the processing unit(s) 4010 and other modules of the electronic system. The permanent storage device 4035, on the other hand, is a read-and-write memory device. This device is a non-volatile memory unit that stores instructions and data even when the electronic system 4000 is off. Some embodiments of the invention use a mass-storage device (such as a magnetic or optical disk and its corresponding disk drive) as the permanent storage device 4035.

Other embodiments use a removable storage device (such as a floppy disk, flash drive, etc.) as the permanent storage device. Like the permanent storage device 4035, the system memory 4025 is a read-and-write memory device. However, unlike storage device 4035, the system memory is a volatile read-and-write memory, such a random access memory. The system memory stores some of the instructions and data that the processor needs at runtime. In some embodiments, the invention's processes are stored in the system memory 4025, the permanent storage device 4035, and/or the read-only memory 4030. From these various memory units, the processing unit(s) 4010 retrieve instructions to execute and data to process in order to execute the processes of some embodiments.

The bus 4005 also connects to the input and output devices 4040 and 4045. The input devices enable the user to communicate information and select commands to the electronic system. The input devices 4040 include alphanumeric keyboards and pointing devices (also called "cursor control devices"). The output devices 4045 display images generated by the electronic system. The output devices include printers and display devices, such as cathode ray tubes (CRT) or liquid crystal displays (LCD). Some embodiments include devices such as a touchscreen that function as both input and output devices.

Finally, as shown in FIG. 40, bus 4005 also couples electronic system 4000 to a network 4065 through a network adapter (not shown). In this manner, the computer can be a part of a network of computers (such as a local area network ("LAN"), a wide area network ("WAN"), or an Intranet, or a network of networks, such as the Internet. Any or all components of electronic system 4000 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself.

As used in this specification, the terms "computer", "server", "processor", and "memory" all refer to electronic or other technological devices. These terms exclude people or groups of people. For the purposes of the specification, the terms display or displaying means displaying on an electronic device. As used in this specification, the terms "computer readable medium," "computer readable media," and "machine readable medium" are entirely restricted to tangible, physical objects that store information in a form that is readable by a computer. These terms exclude any wireless signals, wired download signals, and any other ephemeral or transitory signals.

While the invention has been described with reference to numerous specific details, one of ordinary skill in the art will recognize that the invention can be embodied in other specific forms without departing from the spirit of the invention. For instance, a number of the figures conceptually illustrate processes. The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process. Therefore, one of ordinary skill in the art would understand that the invention is not to be limited by the foregoing illustrative details, but rather is to be defined by the appended claims.

The invention claimed is:

1. A method of performing routing to define a plurality of routes for a plurality of nets in an integrated circuit (IC) design layout, the method comprising:

performing a first routing operation to define a first set of one or more routes for a first set of one or more nets in a portion of the IC design layout, the first set of routes comprising at least a multi-layer particular route that uses at least one particular via to traverse two different layers of the IC design layout;

supplying the IC design layout to a machine-trained network (MTN) to produce a modified IC design layout portion comprising predicted manufactured shapes for the first set of routes including the particular via;

analyzing a predicted manufactured shape of the particular via to determine that a set of one or more additional redundant vias need to be inserted in the IC design layout for the particular via, said analyzing comprising (i) using a plurality of predicted manufactured shapes of a plurality of components that form the particular via to generate the predicted manufactured shape for the particular via and (ii) determining to insert the set of redundant vias based on a size of the predicted manufactured shape of the particular via; and inserting the set of redundant vias in the IC design layout.

2. The method of claim 1, wherein said determining comprises determining that the size of the predicted manufactured shape of the particular via is larger than a first threshold but is smaller than a second threshold.

3. The method of claim 2, wherein a first via is discarded from the IC design layout when a predicted manufactured shape of the first via is smaller than the first threshold.

4. The method of claim 1, wherein the MTN is a first MTN and analyzing the predicted manufactured shape of the particular via further comprises supplying the modified IC design layout portion to a second MTN to identify any set of redundant vias that need to be inserted in the IC design layout.

5. The method of claim 4, wherein said inserting comprises using the second MTN to insert any set of redundant vias identified by the second MTN.

6. The method of claim 4, wherein said inserting comprises using a via-insertion process to select any specific redundant via in the identified set of redundant vias and to insert in the IC design layout any selected redundant via.

7. The method of claim 1, wherein the particular via is a first via, the method further comprising analyzing a predicted manufactured shape of a second via to determine that the second via has to be moved to another location on a route in the IC design layout.

8. The method of claim 7, wherein the second via is moved to another location by discarding the second via and inserting a third via at the other location on the route in the IC design layout.

9. A method of performing routing to define a plurality of routes for a plurality of nets in an integrated circuit (IC) design layout, the method comprising:

performing a first routing operation to define a first set of one or more routes for a first set of one or more nets in a portion of the IC design layout, the first set of routes comprising at least a multi-layer particular route that uses at least one particular via to traverse two different layers of the IC design layout;

supplying the IC design layout to a machine-trained network (MTN) to produce a modified IC design layout portion comprising predicted manufactured shapes for the first set of routes including the particular via;

analyzing a predicted manufactured shape of the particular via to determine that a set of one or more additional redundant vias need to be inserted in the IC design layout for the particular via; and inserting the set of redundant vias in the IC design layout, wherein:

the MTN is trained in a training process that uses a first plurality of known input design layouts with a first plurality of corresponding known output design layouts comprising manufactured shapes of components in the corresponding input design layout, said known input design layouts are fed through the MTN during training to produce a second plurality of corresponding output design layouts comprising predicted manufactured shapes of components in the corresponding input design layouts; and the second plurality of output design layouts are used in conjunction with the first plurality of known output design layouts to generate a loss function value, which is used to adjust a set of trainable parameters of the MTN.

10. A non-transitory machine readable medium storing a program which when executed by at least one processing unit performs routing to define a plurality of routes for a plurality of nets in an integrated circuit (IC) design layout, the program comprising sets of instructions for:

performing a first routing operation to define a first set of one or more routes for a first set of one or more nets in a portion of the IC design layout, the first set of routes comprises at least a multi-layer particular route that uses at least one particular via to traverse two different layers of the IC design layout;

supplying the IC design layout to a machine-trained network (MTN) to produce a modified IC design layout portion comprising predicted manufactured shapes for the first set of routes including the particular via;

analyzing a predicted manufactured shape of the particular via to determine that a set of one or more additional redundant vias need to be inserted in the IC design layout for the particular via, said analyzing comprising (i) using a plurality of predicted manufactured shapes of a plurality of components that form the particular via to generate the predicted manufactured shape for the particular via and (ii) determining to insert the set of redundant vias based on a size of the predicted manufactured shape of the particular via; and inserting the set of redundant vias in the IC design layout.

11. The non-transitory machine readable medium of claim 10, wherein the set of instructions for said determining comprises a set of instructions for determining that the size of the predicted manufactured shape of the particular via is larger than a first threshold but is smaller than a second threshold.

12. The non-transitory machine readable medium of claim 11, wherein a first via is discarded from the IC design layout when a predicted manufactured shape of the first via is smaller than the first threshold.

13. The non-transitory machine readable medium of claim 10, wherein the MTN is a first MTN and the set of instructions for analyzing the predicted manufactured shape of the particular via further comprises a set of instructions for supplying the modified IC design layout portion to a second MTN to identify any set of redundant vias that need to be inserted in the IC design layout.

14. The non-transitory machine readable medium of claim 13, wherein the set of instructions for said inserting comprises a set of instructions for using the second MTN to insert any set of redundant vias identified by the second MTN.

15. The non-transitory machine readable medium of claim 13, wherein the set of instructions for said inserting comprises a set of instructions for using a via-insertion process to select any specific redundant via in the identified set of redundant vias and to insert in the IC design layout any selected redundant via.

16. The non-transitory machine readable medium of claim 10, wherein the particular via is a first via, the program further comprising a set of instructions for analyzing predicted manufactured shape of a second via to determine that the second via has to be moved to another location on a route in the IC design layout.

17. The non-transitory machine readable medium of claim 16, wherein the second via is moved to another location by discarding the second via and inserting a third via at the other location on the route in the IC design layout.

18. A non-transitory machine readable medium storing a program which when executed by at least one processing unit performs routing to define a plurality of routes for a plurality of nets in an integrated circuit (IC) design layout, the program comprising sets of instructions for:

performing a first routing operation to define a first set of one or more routes for a first set of one or more nets in a portion of the IC design layout, the first set of routes comprising at least a multi-layer particular route that uses at least one particular via to traverse two different layers of the IC design layout;

supplying the IC design layout to a machine-trained network (MTN) to produce a modified IC design layout portion comprising predicted manufactured shapes for the first set of routes including the particular via;

analyzing a predicted manufactured shape of the particular via to determine that a set of one or more additional redundant vias need to be inserted in the IC design layout for the particular via; and inserting the set of redundant vias in the IC design layout, wherein:

the MTN is trained in a training process that uses a first plurality of known input design layouts with a first plurality of corresponding known output design layouts comprising the manufactured shapes of components in the corresponding input design layout;

said known input design layouts are fed through the MTN during training to produce a second plurality of corresponding output design layouts comprising predicted manufactured shapes of components in the corresponding input design layouts; and the second plurality of output design layouts are used in conjunction with the first plurality of known output design layouts to generate a loss function value, which is used to adjust a set of trainable parameters of the MTN.

* * * * *